United States Patent [19]

Landau, Jr. et al.

[11] 4,108,090
[45] Aug. 22, 1978

[54] PROGRAMMABLE VARIABLE SPEED FOR SEWING MACHINE

[75] Inventors: John Vernon Landau, Jr., Mt. Lakes; Frederick Alexander Rupinski, Lyndhurst, both of N.J.

[73] Assignee: The Singer Company, New York, N.Y.

[21] Appl. No.: 779,887

[22] Filed: Mar. 21, 1977

[51] Int. Cl.[2] ............................................. D05B 19/00
[52] U.S. Cl. ................................ 112/121.11; 318/568
[58] Field of Search ..................... 112/121.11, 121.12, 112/275, 277; 318/568

[56] References Cited

U.S. PATENT DOCUMENTS

| 3,074,632 | 1/1963 | Braun et al. | 112/121.11 X |
| 3,613,610 | 10/1971 | Hinerfeld et al. | 318/568 X |
| 3,750,186 | 7/1973 | Sakamoto | 318/568 |
| 3,761,790 | 9/1973 | Daab | 112/275 X |

Primary Examiner—Werner H. Schroeder
Assistant Examiner—Peter Nerbun
Attorney, Agent, or Firm—Edward P. Schmidt; Edward L. Bell; Charles R. Lewis

[57] ABSTRACT

A programmable sewing machine adapted to learn and store, in Automatic Learn or Key Learn Modes of operation, a series of sewing machine operations for later automatic duplication, in an Automatic Sew Mode of operation, at the same sewing rate as the initial operation, or at the peak sewing rate achieved during each operation; or, in a Control Sew Mode of operation at a controlled lower speed. A software program enables the speed profile of an initial sewing operation to be stored in memory as a number (at least one) of pseudo segments of variable time duration. Each pseudo segment has a fixed sewing speed associated therewith. By applying these stored speed values to a digital to analog converter and applying the resulting voltage to the sewing machine drive motor, the speed profile recorded can be substantially faithfully duplicated. The automatic operation of the sewing machine may be interrupted to go into a Repair Mode during which the sewing machine may be operated manually, and, on proper command, to revert back to the Automatic Sew Mode at the particular operation which was interrupted. A Quit control is provided which permits reversion to an Initialization Mode from which a specific mode of operation may be selected. Provision is made to Erase specific learned and stored series of sewing machine operations, and to warn when the storage capacity may be exceeded.

22 Claims, 34 Drawing Figures

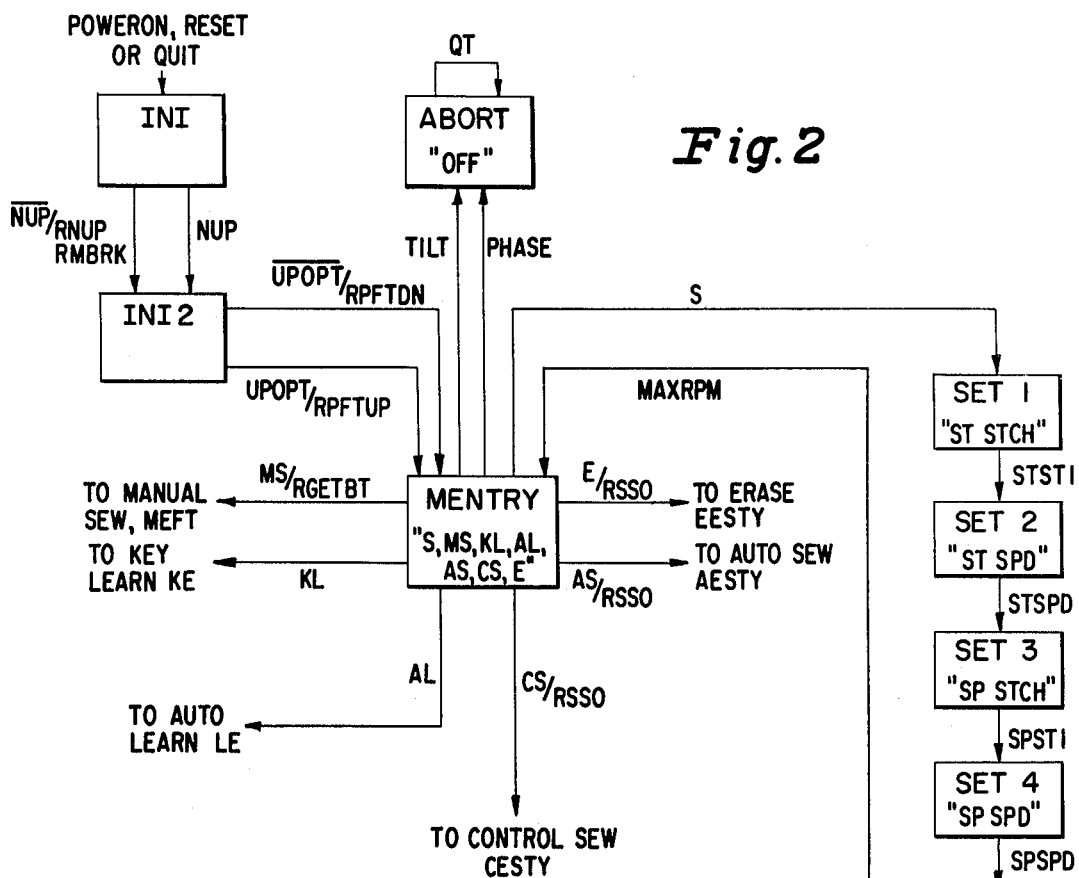
*Fig. 2*
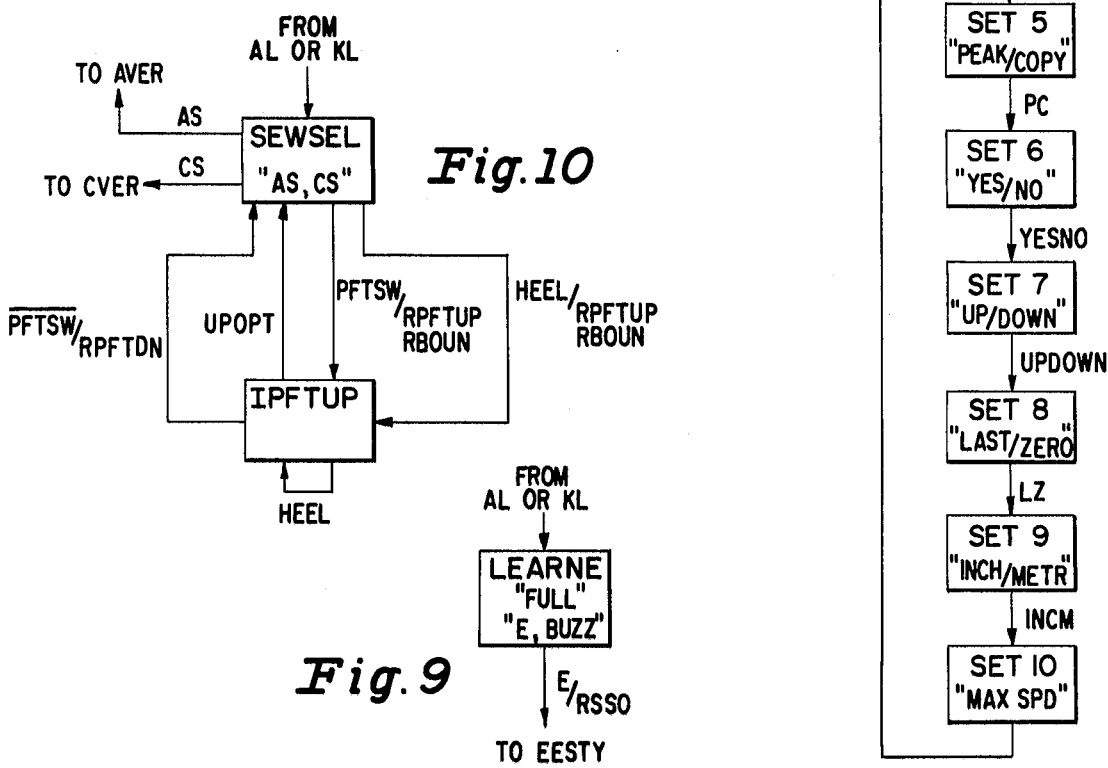
*Fig. 10*
*Fig. 9*

PROGRAMMABLE VARIABLE SPEED FOR SEWING MACHINE

BACKGROUND OF THE INVENTION

This invention is in the field of Industrial Sewing Machines, more particularly, an industrial sewing machine adapted to have the components thereof operated by a computer which may be programmed by an initial manual operation by an operator.

There exist in the prior art, industrial sewing machines adapted to be automatically operated by edge guidance systems for automatically guiding a work material beneath a sewing needle, and, industrial sewing machines wherein component operation may be automatically effected with guidance of work material performed by an operator. The instant invention relates to the latter variety of industrial sewing machines.

In the prior art there are many examples of sewing machines having the capability for automatically performing back tacks; for automatically performing a thread trimming operation, needle positioning and presser foot elevation; for automatically implementing a stitch count; for automatically starting and stopping a sewing machine; for program control of feed, presser foot elevation and speed of operation; for automatic operation of thread trimming, presser foot elevation and time delay; for recording of feed motion and playback thereof; and, a machine combining many of the above features and including a stepwise recording capability also exists. Thus, an industrial sewing machine is disclosed in the prior art which has the capability stepwise to record in one of two fixed speeds for each of forward and reverse work material feed, an exact stitch count; and for stopping with the sewing needle in an up position to facilitate removal of work material, or in a down position from which to initiate a thread trim operation or to effect a pivot delay of measured duration. This prior art industrial sewing machine admittedly required a relatively highly skilled and trained operator for recording of a complete sewing cycle, in part due to the complexity of the controls; and lacked the flexibility required to enable use thereof by relatively unskilled operators for varying degree in both initial recording and later operation.

What is required is an industrial sewing machine adapted to the use of any sewing machine operator, which includes the capability to record an initial operation of the sewing machine and the several components thereof, and is operable in several modes to increase the flexibility and usefulness thereof.

SUMMARY OF THE INVENTION

The above requirements are obtained in an industrial sewing machine system wherein a record of component operation of a sewing machine thereof is retained in a memory of a computer thereof in one mode of operation wherein all parameters of sewing machine operation are recorded including stitch count, variable sewing speed, pivot delay times, first and last backtacks, and final thread trim; or in another mode of operation wherein operating speed and pivot delay times may be predetermined without regard to actual "learned" operation, to permit a careful initial operation to take place or to permit a skilled operator to make a rapid record for slower automatic operation with relatively unskilled operators.

The record retained in the memory of the computer in any of the above modes of operation will be utilized to automatically operate the sewing machine in another mode of operation, with the foot treadle as an on-off control, substantially exactly as recorded with a copy of the variable sewing speed, or at the highest sewing speed attained for each stitch segment. In yet another mode of operation, the record retained will be utilized to automatically operate the sewing machine under operator control of speed to the maximum "learned" in every stitch segment, with cessation of operation at every pivot delay, the operation thereof continuing on a specific manipulation of the foot treadle by an operator.

In the automatic operation of the sewing system set forth in the last two modes of operation described above, provision is made to permit adjustment of the record in the memory of the computer, if permitted and if required, after a stitch segment is completed or even if required during performance of a stitch segment. A Repair Mode of operation is provided, which may be attained whenever the foot treadle is in a neutral position in the Automatic Modes of operation. If the Repair Mode is selected, automatic operation of the sewing system is held in abeyance pending completion of repair operations wherein the sewing machine may be manually operated in all respects. At the completion of the repair operations, reentry to the specific one of the two automatic modes from which entry was achieved, is attained at the point from which held in abeyance.

A further mode of operation of the sewing system is provided wherein a variety of sewing parameters may be impressed in the memory of the computer which will be effective in all recording modes of operation and automatic modes of operation. Thus, for example, maximum machine speed may be specified and the number of start and stop stitches and speeds at which accomplished may also be specified.

BRIEF DESCRIPTION OF THE DRAWINGS

In order that the invention may be more fully understood it will now be described, by way of example, with reference to the accompanying drawings in which:

FIG. 2 is an Initilization mode entry (MENTRY) and Set Up state chart indicating the various states of the sewing machine on start-up;

FIG. 9 is a state chart indicating the state of the sewing system after Auto Learn or Key Learn has been selected but the memory of the computer is unable to store any further information;

FIG. 10 is a state chart of the SEWSEL state from which entry to Auto Sew or Control Sew Modes of operation may be made;

Referring to FIG. 1, there is shown an industrial sewing system 40, including a sewing machine 50 supported in a work table 55. A work supporting bed 51 of the sewing machine 50 is supported substantially co-planar with the work supporting top 56 of the work table 55. The sewing machine 50 includes a drive system (not shown), and may be pivotably supported in the work table 55 in a manner similar to that shown in the U.S. Pat. No. 3,924,552, of Wendel, which is hereby incorporated by reference and made a part of this application. As is shown in the above noted patent, the drive system for the sewing machine 50 is supported beneath the sewing machine behind a fixed front panel 57 thereof and, therefore, concealed from view. Pivotably supported in the base of the work table 55, is a foot treadle 65, connected by linkage 66 to electrical devices mounted on a sewing machine control box 63, which is supported within the work table behind a hinged front panel 59, itself supported on hinges 60 affixed to crossmember 61 of the work table. The hinged front panel 59 is retained in a closed state by latches 62, which may be disengaged to rotate the front panel downwardly, exposing the sewing machine control box 63 and a computer 72 also there supported by the work table 55. Supported on either side of the foot treadle 65, for selective actuation by lateral motion of an operators foot, is a jog switch 68 for placement of a single stitch, and a needle-up positioning switch 70 in order to obtain operator determined up positioning of a sewing needle 52.

Figure 1:
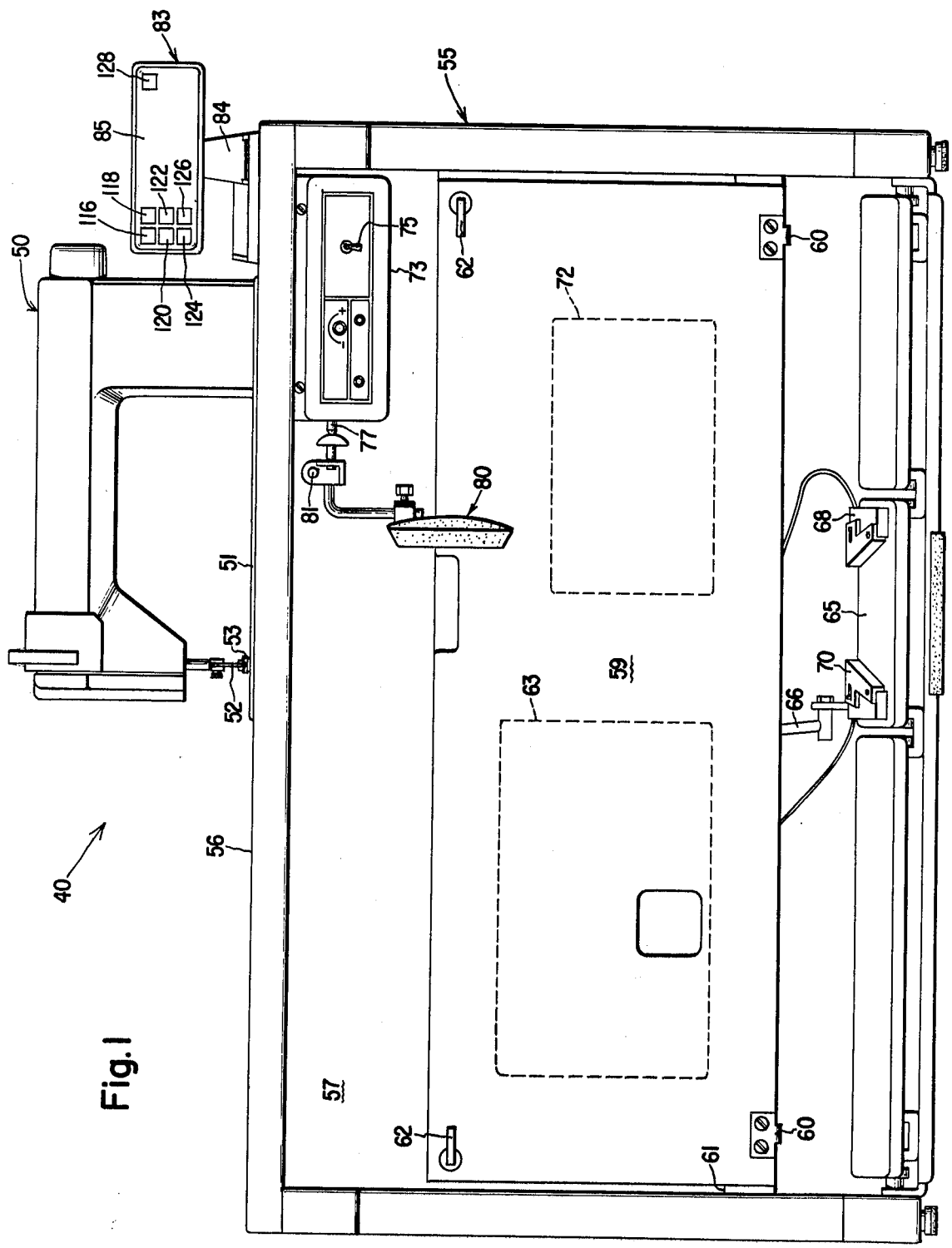
FIG. 1 is a front elevational view of a sewing machine and work table supporting the sewing machine, components and control systems for implementing the programming and operation of the sewing machine.

Supported on the right side of the work table 55, beneath the work supporting top 56, is a small box 73 in which are mounted a main power switch 75 and a presser foot elevating switch 77. A knee shift device 80 is pivotably supported on a pivot bar 81 affixed to the fixed front panel 57. An abutment member 82 of the knee shift device 80 cooperates with the presser foot elevating switch 77 in order to effect elevation of a presser foot 53 of the sewing machine 50. Raising and lowering of the presser foot 53 may be accomplished by a modification of the system disclosed in the U.S. Pat. No. 3,224,393, of Adams et al, assigned to the same assignee as the instant invention, which is hereby incorporated by reference and made a part of this application. Thus, motion of the presser foot 53 may be pneumatically accomplished and controlled by a solenoid actuated valve which is activated by the presser foot elevating switch 77.

Supported on the upper right front corner of the work supporting top 56 of the work table 55 on a pedestal 84, is a control module 83 having a control panel 85. The control module 83 is in electrical communication with the computer 72 by means of electrical wires passing though the pedestal 84 to the computer.

The sewing machine drive system referred to above, may be of a known variety, or any modification thereof, suitable for operation by the computer 72 through the sewing machine control box 63 which is considered a part of the sewing machine 50. Such a drive system is shown in U.S. Pat. No. 3,573,581, issued Apr. 6, 1971 to Dutko et al, which is hereby incorporated by reference and made a part of this application. This patent discloses a continuously coupled DC motor for an industrial sewing machine, having the circuitry to sense the speed thereof, to initiate dynamic braking thereof to a selected needle-up or needle-down position and to initiate a thread trimming operation. The drive system disclosed in the patent of Dutko et al may be modified to a belt drive arrangement as is shown in the above referenced patent of Wendel, and may have a mechanical brake attached thereto, as disclosed in the U.S. Pat. No. 3,667,413 of Kleinschmidt et al, which is hereby incorporated by reference and made a part of this application. The above referenced patent of Dutko et al, discloses sensors to indicate an up position of the sewing needle 52 out of a work material and to indicate a down position thereof. There are also disclosed speed sensors from which may be obtained a determination of rotational speed of the sewing machine 50. The information obtained from these sensors may be transferred to the computer 72, and will be used by the computer as conditions for initiating other actions of components parts of the sewing system 40. For example, the drive system disclosed in the referenced patent of Dutko et al, is operated by the foot treadle 65 for variable speed by variable forward depression thereof from a neutral position; and, as disclosed in the patent of Dutko et al, may be heeled or rotated in a reverse direction to effect a thread trimming function, the neutral condition causing the computer 72 to initiate commands to dynamically brake the drive system to a speed of approximately 400 RPM followed by mechanical braking to a needle-down position, and the heel position causing the computer to initiate commands serially to perform a last tack, to drive and mechanically brake to a needle-up position while performing the thread trimming operation. The computer 72 may also be used to control the speed of the sewing machine 50 by utilizing the speed sensing device disclosed in the Dutko et al patent as will be explained below.

Further reference may also be had to the U.S. Pat. No. 3,715,642, of Walter, which is hereby incorporated by reference and made a part of this application. This patent of Walter is a further reference disclosing a DC motor having speed sensors, position sensors, variable speed drive and capability to include thread trimming functions. Imposition of a stable reference voltage in place of the variable reference voltage of the Walter patent provides a fixed sewing machine speed, and the computer 72 may be utilized to implement the required stable voltages for the required periods.

Any of a number of thread trimming devices may be incorporated in this machine, one such device being that disclosed in U.S. Pat. No. 3,776,161, issued Dec. 4, 1973 to Papajewski et al, which is hereby incorporated by reference and made a part of this application.

Figure 3:
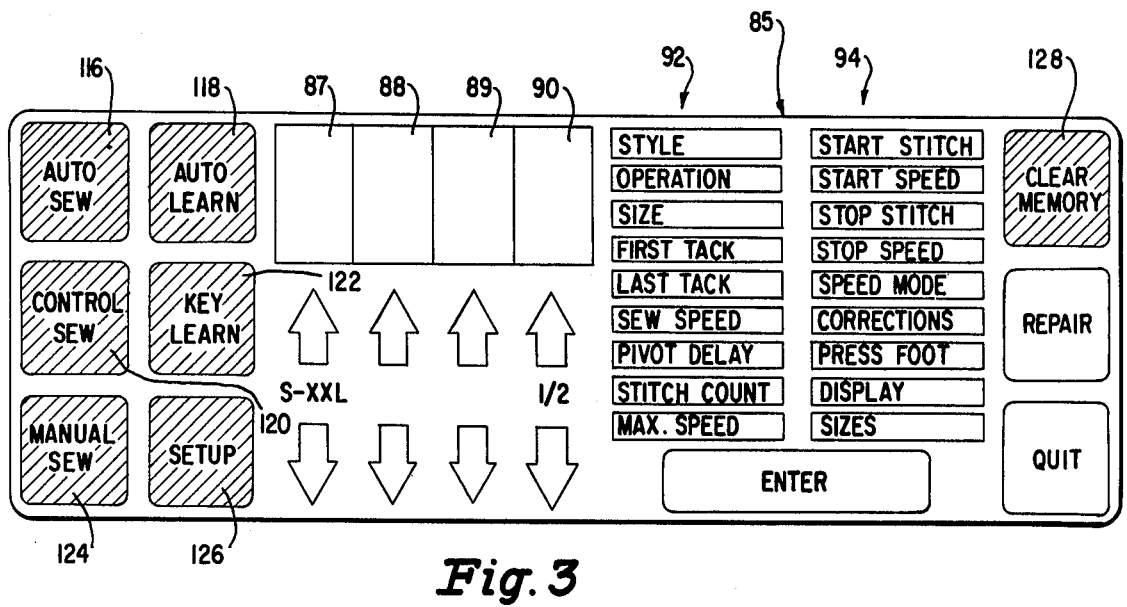
FIG. 3 is an elevational view of only the control panel shown in FIG. 1, indicating those portions which are active for the MENTRY state of FIG. 2.

The control module 83 and control panel 85 is, as stated above, electrically connected with the computer 72 supported behind the front hinged panel 59. The control panel 85 is, preferably, of a "dead front" form, that is, only those displays of instant concern to an operator are visible. In FIG. 3, is shown an elevation of the control panel 85, indicating by cross-hatching the displays which may become visible to a sewing machine operator by lighting devices within the control panel as determined by the computer 72 supported behind the front hinged panel 59. The windows 87-90 in the control panel 85 are used to display numerical digits, or alphabetic instructions, such as the word "SEW", as directed by the computer 72. Adjacent the windows 87-90, a "menu" is displayed in two columns of nine items each. In column 1, 92 and in column 2, 94 a single item at a time is lit, and represents a request from the computer 72 for instructions from a sewing operator. In this arrangement of a "dead front" panel in which a single operator instruction is requested at one time, the machine operator is led through a programming sequence without the complexities normally inherent in such an operation. Further particulars on each item in the "menu" will be explained below, from which it may be seen how an operator may be led readily and naturally through a programming operation.

All of the displays on the control panel 85, with the exception of the windows 87-90 and the "menu" column 1, 92 and column 2, 94, receive information from the operator to be acted on by the computer 72. These displays are, generally, switches which place the sewing system in the various modes of operation, or modify the displays in the windows 87-90, and/or call on the computer 72 to perform certain acts. These switches in the displays are, ideally, activated by a proximity detector responsive to the presence of an operator's finger. Thus, those displays which are placed in the active mode and made visible to an operator by the computer 72, will respond to the presence of an operators finger to convey to the computer the selected action desired. Once again it is apparent that the various functions may be as readily implemented by slide or toggle switches, however, by use of a "dead front" panel, operator direction and guidance may be most effectively implemented.

Referring to FIG. 1, the control panel 85 is shown as it would appear after the main power switch 75 has been turned on. The control panel 85 in FIG. 1 is shown in the Initilization Mode Entry. In this Initilization Mode Entry, the operator is required to select one of the seven entry modes by touching the appropriate display pad with a finger. By reference to FIG. 3, it can be seen that the entry display pads illuminated by the computer 72 are Automatic Sew (AS) 116, Automatic Learn (AL) 118, Control Sew (CS) 120, Key Learn (KL) 122, Manual Sew (MS) 124, Set Up (S) 126, and Clear Memory (Erase) (E) 128. In FIG. 2, is shown a state chart for the Initilization Mode Entry and Set Up Mode, indicating the condition which causes the computer 72 to initiate the action(s) required to obtain the various states (condition/action(s)). In some cases, in the state charts discussed below, no action is shown because none is required, or the action is a very common one and is not there repeated for the sake of simplicity. Thus, when the main power switch 75 is turned on, the sewing system 40 is in the INI state. If the sewing machine 50 has the sewing needle 52 thereof in an up position (NUP condition) the sewing system 40 reverts to the INI 2 state. If the sewing needle 52 is not in an up position ($\overline{\text{NUP}}$ condition), this information is conveyed by the sensors in the drive system, disclosed in the above referenced U.S. Pat. No. 3,573,581, to the computer 72 which initiates commands to the drive system to bring the needle to an up position (RNUP Action). Thus, as disclosed in the above referenced patent, the motor may be driven in a soft start, or in a high speed inhibit mode, until a needle-up position sensor determines that the sewing needle 52 is in an up position, the conveying of this information to the computer 72 causing the computer to output a second signal activating the mechanical brake (RMBRK Action). At the completion of this operation the sewing system 40 is in the INI 2 state.

The MENTRY state is achieved after a determination of the Up option state, relative to the condition of the presser foot 53, which will be more fully explained in a discussion of the Set Up Mode of operation below. The control panel 85 in FIG. 1, which is shown more clearly in FIG. 3, is in the MENTRY state wherein the illumination of the display pads is indicated by cross-hatching. As was explained above, those display pads shown cross-hatched in FIG. 3 are touch control pads sensitive to the presence of an operators finger by any of many well known techniques, serving thereby to signal the computer 72 that a specific one of the display pads placed in the active state by the computer has been selected. The discussion below will proceed assuming that an operator has selected the Set Up display pad 126.

The Code to the Mode Select Keys, appearing as conditions in the state charts, is given in the table below:

| S | SET UP | MS | MANUAL SEW | KL | KEY LEARN |
|---|--------|----|-----------|----|-----------|
| AL | AUTO LEARN | CS | CONTROL SEW | AS | AUTO SEW |

| | | | |
|---|---|---|---|
| -continued | | | |
| E | CLEAR MEM | QT QUIT | REPAIR REPAIR |

In the Set Up Mode of operation, a variety of instructions may be impressed upon a memory of the computer 72, which are common to and will facilitate operation of the sewing system 40 in the other modes of operation. Thus, for example, at the end of a complete sewing cycle there may be a command from the computer 72 to raise the presser foot 53 of the sewing machine 50 to facilitate work removal therefrom. If an Up option of the presser foot 53 had been selected, symbolized by the condition UPOPT in the Initilization Mode state chart of FIG. 2, the sewing system 40 would terminate a sewing cycle or enter the MENTRY state with the presser foot elevated. Maximum speed of operation of the sewing machine 50 may also be selected. A complete discussion of the Set Up Mode of operation is given below with reference to FIG. 5 and as shown in the state chart of FIG. 2.

With the selection of the Set Up Mode of operation, the computer 72 will deactivate the other display touch pads illustrated in FIG. 3 except for the Set Up touch pad 126, and will begin requesting a series of instructions of the operator from columns 92 and 94, by illuminating one selected item at a time from the "menu". Simultaneously, the computer 72 will activate and illuminate Enter display touch pad 130, and selected Slew touch pads 132-139 depending on the item of the "menu" selected (see FIG. 5).

Figure 4A:
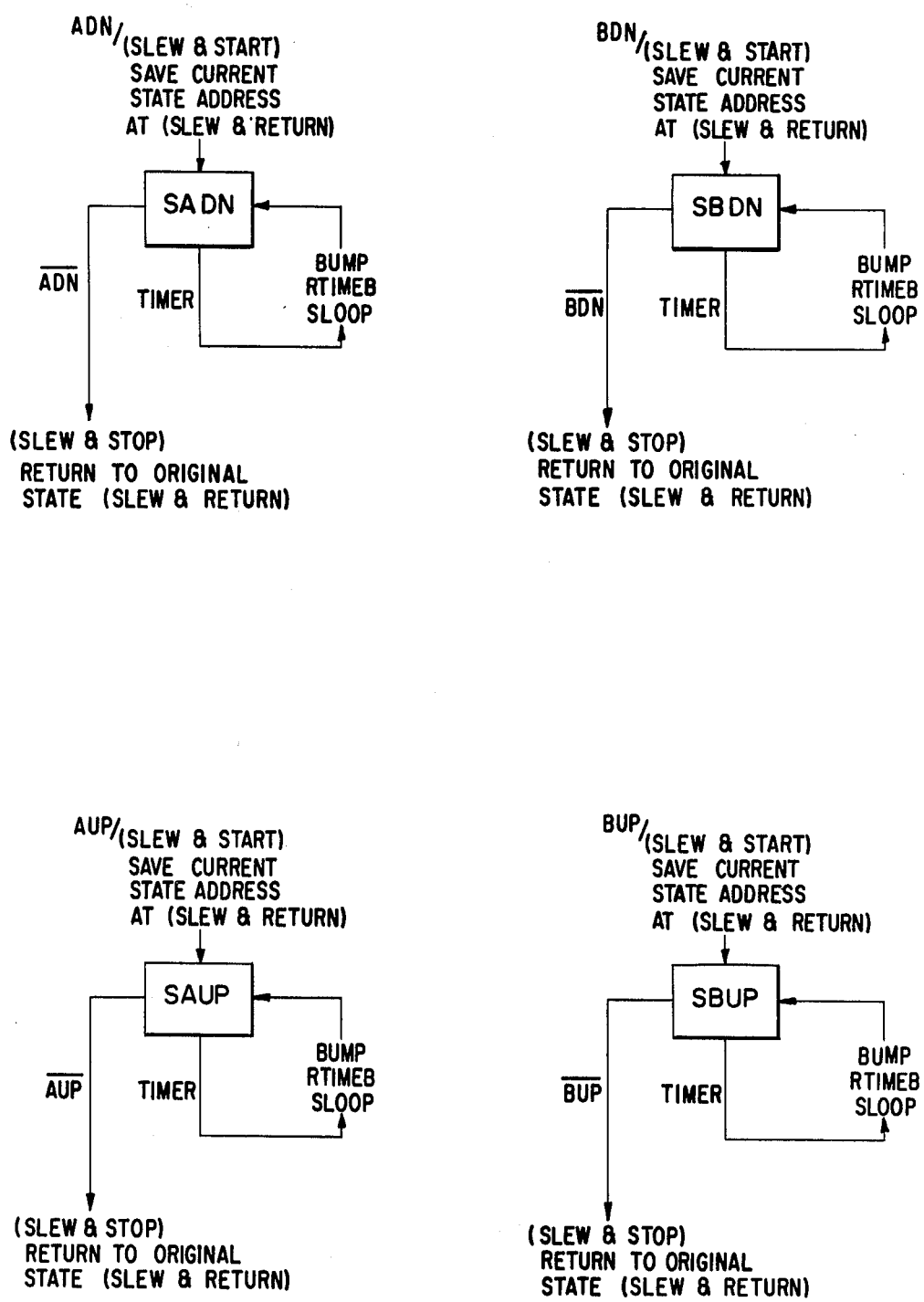
FIGS. 4a, 4b are Slew state charts indicating slewing operation.
Figure 4B:
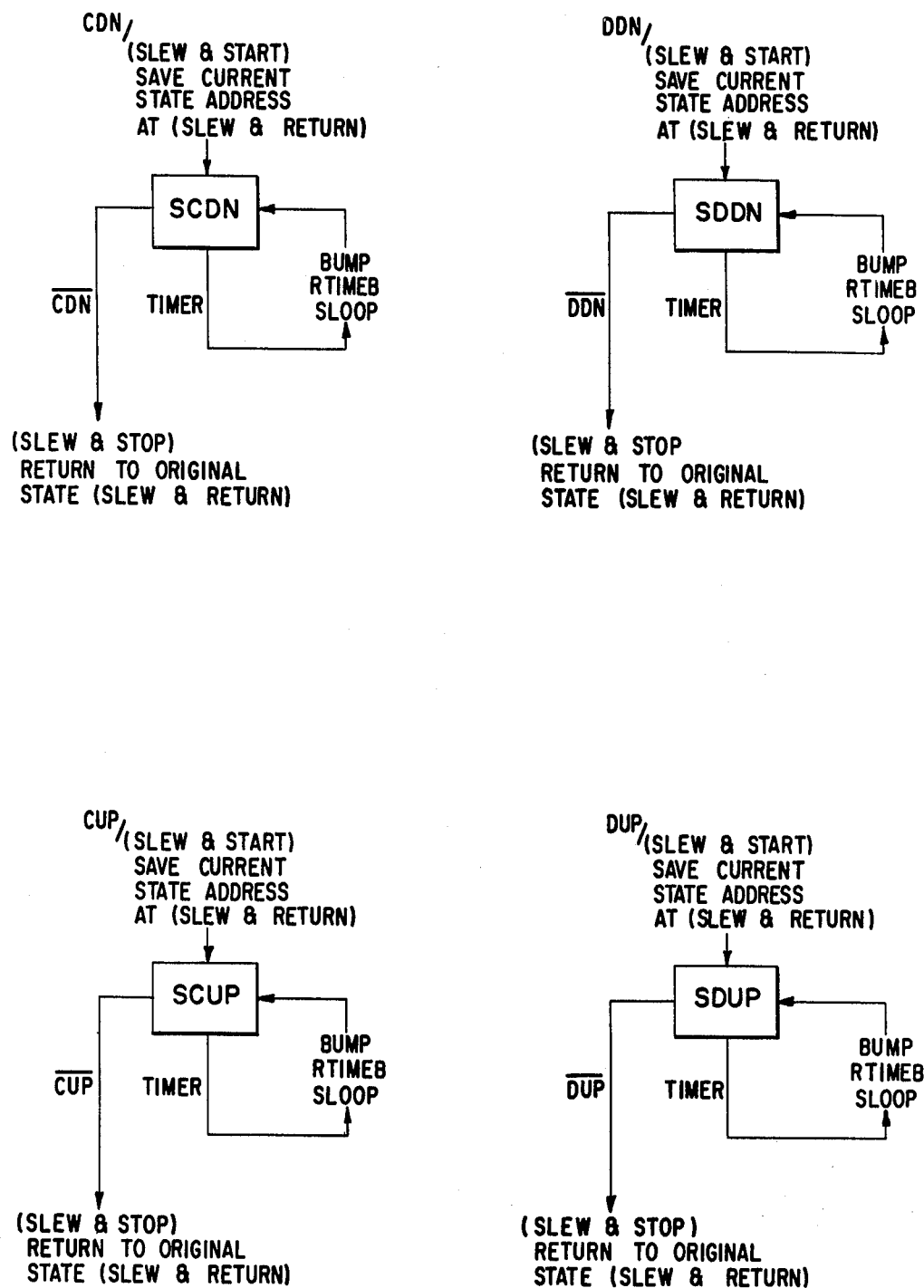

The operation of the Slew touch pads 132-139 is indicated in the Slew state charts of FIGS. 4A and 4B. The "A" Slew touch pads 132, 133 are effective, when illuminated and made active by the computer 72, to increment or decrement a digit displayed in the window 87 of the control panel 85, or to change a word, such as PEAK or COPY, displayed in the windows 87-90. The digit displayed is incremented upwardly by touching the "A" Slew touch pad 132, and is decremented downwardly by touching the "A" Slew touch pad 133. Digits displayed in the windows 88, 89, 90 of the control panel 85 are similarly varied by the "B" Slew touch pads 134, 135, "C" Slew touch pads 136, 137, and "D" Slew touch pads 138, 139, respectively.

If the sewing system 40 is in a particular state where slewing may be required, and a Slew touch pad has been touched which has been illuminated and made active by the computer 72, the current state address is saved, and routines are initiated by the computer to increment or decrement the displayed digit in one-half second intervals in a slew loop (SLOOP). On removal of the touch from the Slew touch pad, the current state address is retreived and used as a return address to return the sewing system 40 to the current state in its original mode of operation.

Figure 5:
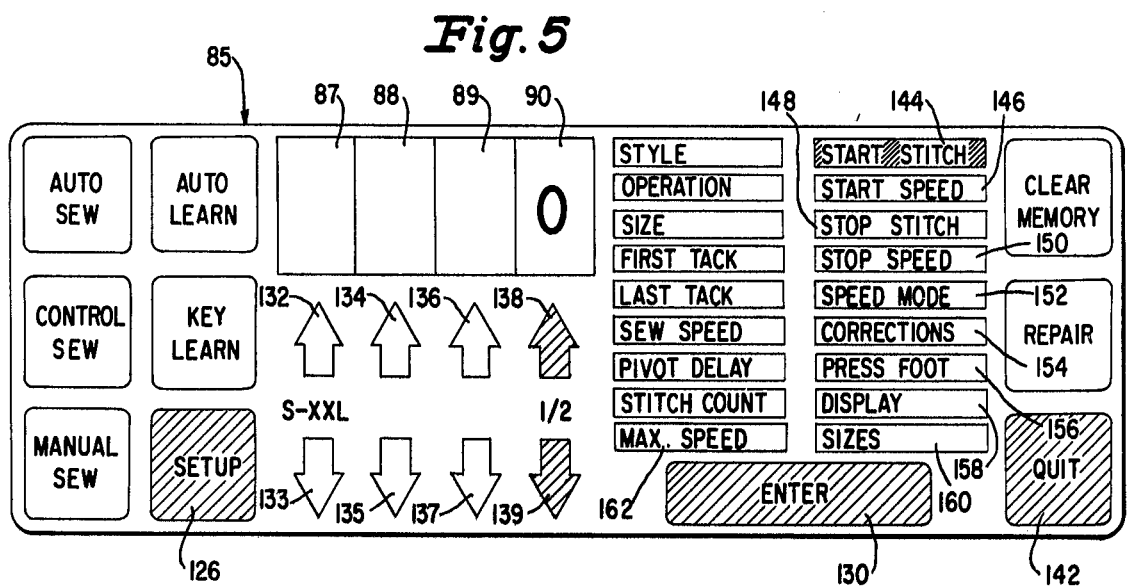
FIG. 5 is an elevation of the control panel in the Set Up mode indicating the slew controls in the active condition for max speed.

As seen in FIG. 5, Quit touch pad 142 is also activated and caused to be displayed by the computer 72, and may be touched by an operator at any time during the Set Up Mode of operation to revert the sewing system 40 to the MENTRY state shown in FIG. 3. It will be understood that the Quit touch pad 142 is illuminated and made active by the computer 72 in any state of any mode of operation from which an operator may desire to revert to the MENTRY state. In this way, an operator retains ultimate control over the sewing system 40 and is not required to complete unnecessary or undesired operations.

Thus, when the Set Up Mode of operation is selected by an operator's touching of the Set Up touch pad 126 when the sewing system 40 is in the MENTRY state shown in FIG. 3, the computer 72 will display the Set Up touch pad 126, and will activate and display the Enter touch pad 130, the Quit touch pad 142, the "D" Slew touch pads 138, 139; and will illuminate a Start Stitch request 144 in the column 94 along with a digital display in the window 90. An operator is requested to select the number of stitches at the start of the sewing cycle where the sewing machine 50 will sew at a reduced speed for greater control. The number of start stitches displayed in the window 90 of the control panel 85 may be incremented by an operator's touching of the "D" Slew touch pad 138, and may be decremented by an operator's touching of the "D" Slew touch pad 139. When the desired digit is displayed in the window 90 of the control panel 85, an operator's touching of the Enter touch pad 130 will cause the digit then displayed in the window 90 to be entered in a memory of the computer 72, and the computer will remove the illumination from the Start Stitch request 144, and illuminate a Start Speed request 146 in the column 94, along with a digital display in the window 90. The "D" Slew touch pads 138, 139 will be illuminated and made active by the computer 72 along with digital display in window 90.

The digits thus displayed in the window 90 of the control panel 85 will be representative of speeds in the high speed inhibit or soft start mode of operation disclosed in the above referenced U.S. Patents relative to drive systems. An operator may increment up to a desired start speed by continued touching of the "D" Slew touch pad 138 until the desired digit is displayed. Decrementing the displayed speed may be implemented by the operator's touching the "D" Slew touch pad 139. The selected digit in window 90 may be entered into the memory of the computer 72 by the operator touching the Enter touch pad 130. The computer 72 will thereupon remove the illumination from the Start Speed request 146 and illuminate a Stop Stitch request 148.

At this point an operator determines the number of stitches desired before the end of a segment, where the machine slows down to a preselected speed and is under the control of the operator in order to end the segment at a precise point. A segment is defined to end whenever the presser foot 53 of the sewing machine 50 is raised, as, for example, when a corner of the fabric to be stitched upon is reached and the fabric must be pivoted to stitch in a new direction, or, at the termination of stitching operation. An operator may compensate for the variability in how the sewing machine 50 feeds the fabric by placing the foot treadle 65 in a neutral position to terminate stitching of the sewing machine 50 when the end of the stitching line is reached, regardless of the number of stop stitches called for by the computer 72.

The entry of the number of stop stitches desired and the stop speed requested by illumination of a Stop Speed request 150 after the number of stop stitches has been entered, is identical to the entry of start stitches and start speed described above and need not be described further. After the desired stop speed has been entered into the memory of the computer 72 by touching of the Enter touch pad 130, the computer 72 illuminates the Speed Mode request 152. Concurrent with illumination of the Speed Mode request 152, the windows 87-90 in the control panel 85 display either the word "PEAK", or the word "COPY". The "A" Slew touch pads 132, 133 are also illuminated and placed in an active state by the computer 72, to permit an operator to touch either pad to change to the desired word. If the word "COPY" is selected, the computer 72 will operate the drive system for the sewing machine 50 in the Automatic Sew Mode (Auto Sew) at the speed at which learned in the Automatic Learning Mode (Auto Learn) with a copy of the speed variations introduced by an operator in selective depression of the foot treadle 65. Where the word "PEAK" is selected, the sewing system 40, in the Auto Sew Mode, will sew at a uniform speed which is the highest recorded in each segment. The selected mode is entered into the memory of the computer 72 by a touching of the Enter touch pad 130.

Thereupon, illumination will be removed from the Speed Mode request 152 and a Corrections request 154 will be illuminated by the computer 72. Concurrently "A" Slew touch pads 132, 133 will be illuminated and placed in the active state by the computer 72, which will also place the word "YES" in the windows 88-90 of the control panel 85 or the word "NO" in the windows 89-90 thereof. If the word "YES" is selected, then when the sewing system 40 is in the Auto Sew Mode of operation, an operator will be requested by the computer 72, through the control panel 85, whether she wishes to make an alteration to the sew speed, pivot delay time or to the stitch count. Where no corrections are authorized, the sewing machine 50 will be operated precisely as first programmed. A change from a "YES" to "NO" may be accomplished by touching either of the "A" Slew touch pads 132, 133. When the correct display is observed in the windows 88-90 of the control panel 85, this information may be entered into the memory of the computer 72 by touching the Enter touch pad 130.

Thereupon, the Corrections request 154 will have the illumination removed therefrom, and a Press Foot request 156 will be illuminated. Concurrently, the "A" Slew touch pads 132, 133 will be illuminated and made active by the computer 72, and the windows 87-90 in the control panel will display the word "DOWN", or the word "UP". At this point, an operator of the sewing system 40 may specify if the presser foot 53 is to be elevated or left lowered at the termination of the sewing cycle, symbolically indicated by UPOPT or $\overline{\text{UPOPT}}$, respectively, in FIG. 2 and in the other state charts. The display in windows 87-90 of the control panel 85 may be changed by touching either of the "A" Slew touch pads 132, 133, and the desired information entered into the memory of the computer 72 by touching the Enter touch pad 130.

Thereupon, the computer 72 will remove the illumination from the Press Foot request 156 and illuminate a Display request 158. The words "LAST" or "ZERO" will be displayed in the windows 87-90 of the control panel 85. The "A" Slew touch pads 132, 133 will also be illuminated and made active by the computer 72. A selection here permits either the last item entered, such as a style, operation or size, to come up in the windows 87-90 of the control panel 85; or instructs the computer 72 that the digits to be displayed in those windows should be all zeros, with operator selection to be made by use of the Slew touch pads 132-139 which are applicable in any given case. When the desired word is visible in the windows 87-90 of the control panel 85, this information may be entered into the memory of the computer 72 by touching of the Enter touch pad 130.

Thereupon, the illumination will be removed from the Display request 158, the Size request 160 will be illuminated and the "A" Slew touch pads 132, 133 will be illuminated and made active by the computer 72. The windows 87-90 of the control panel 85 will display the word "INCH", or, the abbreviation "CM". The word displayed in the windows 87-90 of the control panel 85 may be changed by touching of either "A" Slew touch pads 132, 133. This selection permits using metric sizes or inch (including half sizes) and small, medium, large, extra large, and extra extra large. The selected word may be entered into the memory of the computer 72 by touching the Enter touch pad 130.

Simultaneously, the computer 72 removes the illumination from the Size request 160 and illuminates a Max Speed request 162. The "B" Slew touch pads 134, 135, "C" Slew touch pads 136, 137, and "D" Slew touch pads 138, 139 are illuminated and made active by the computer 72; and the windows 88-90 of the control panel 85 will display digits representative of the maximum speed of the sewing machine 50 to which full forward depression of the foot treadle 65 will be effective. The digits displayed in the windows 88-90 of the control panel 85 may be incremented or decremented by an operator's touching of the respective "B", "C" or "D" Slew touch pads 134-139. When the desired digits are displayed in the windows 88-90 of the control panel 85, this information may be entered into the memory of the computer 72 by touching of the Enter touch pad 130.

Thereupon, the computer 72 having the various instructions impressed upon its memory, will automatically revert the sewing system 40 to the MENTRY state from which any other mode of operation of the sewing system may be selected to be controlled by the parameters introduced in this Set Up Mode. The control panel 85 once again appears as is shown in FIG. 3, with only those touch pads visible, which are illuminated and made active by the computer 72. The process just described is shown in the state chart of the Initialization Mode, FIG. 2, wherein the Set Up Mode of operation is selected from the MENTRY state by an operator touching the Set Up touch pad 126 (condition S). The progression through the Set Up Mode is shown in the column beginning with Set 1 and ending with Set 10 where, on entry of maximum speed, the sewing system 40 reverts to the MENTRY state. From the MENTRY state any mode of operation of the sewing system 40 may be selected including the Set Up Mode just described. All the parameters introduced in the Set Up Mode may be updated at any time without requiring changes to the sewing cycles impressed in the memory of the computer 72. In FIG. 2, there is also shown the ABORT state, to which the sewing system 40 reverts whenever there is a loss of a power phase, or whenever the sewing machine 50 is tilted back for service as determined by a mercury switch.

The Code to Conditions in the state charts to be described is given in the table below.

| | |
|---|---|
| UPOPT | IF PRESSER FOOT UP/DOWN OPTION = 'UP' |
| TIMER | IF TIMER HAS EXPIRED |
| MEMFUL | IF PATTERN MEMORY IS SUFFICIENTLY FULL THAT IT IS UNLIKELY A NEW PATTERN WILL FIT |
| TOOFUL | PATTERN MEMORY IS ABSOLUTELY FULL |
| NOSTY | IF NO PATTERN IS PRESENT IN THE LIBRARY |

-continued

| | |
|---|---|
| NOOPR | HAVING THE SPECIFIED STYLE IF NO PATTERN IS PRESENT IN THE LIBRARY HAVING THE SPECIFIED STYLE AND OPERATION |
| NOSIZ | IF NO PATTERN IS PRESENT IN THE LIBRARY HAVING THE SPECIFIED STYLE, OPERATION, AND SIZE |
| SEGCNT | IF THE # OF STITCHES IN THE CURRENT SEGMENT HAS BEEN SEWN |
| STST | IF THE # OF START STITCHES IN THE CURRENT SEGMENT HAS BEEN SEWN |
| SPST | IF THE # OF STITCHES IS WITHIN THE END OF SEGMENT STOPPING RANGE |
| SLOWST | IF THE # OF STITCHES IS WITHIN THE END OF SEGMENT SLOWDOWN RANGE |
| LSEG | IF THE CURRENT SEGMENT IS THE LAST SEGMENT FOR THE CURRENT LIBRARY ENTRY |
| FSEG | IF THE CURRENT SEGMENT IS THE FIRST SEGMENT FOR THE CURRENT LIBRARY ENTRY |
| NOCOR | IF THE CORRECTIONS OPTION IS SET TO 'NO' |
| PSEUDO | IF THE CURRENT SEGMENT IS A PSEUDO SEGMENT |

SENSORS

| | |
|---|---|
| TRD | IF THE TREADLE IS PRESSED IN THE SEW POSITION |
| NTL | IF THE TREADLE IS IN THE NEUTRAL POSITION |
| HEEL | IF THE TREADLE IS IN THE HEEL POSITION |
| PFTSW | IF THE PRESSER FOOT LIFT SWITCH IS ACTIVATED |
| NUPSW | IF THE NEEDLE UP REQUEST SWITCH IS ACTIVATED |
| JOGSW | IF THE JOG REQUEST (SINGLE STITCH) SWITCH IS ACTIVATED |
| NDN | IF THE NEEDLE IS IN THE DOWN POSITION (IN THE FABRIC) |
| NUP | IF THE NEEDLE IS IN THE UP POSITION |
| (SYMBOL) | (SYMBOL) IS NOT IN THE DESIGNATED POSITION |

The Code to Actions (routines) initiated in the computer 72 in response to the conditions set forth above, is given in the table below.

| | |
|---|---|
| RPFTUP | RAISE PRESSER FOOT |
| RLOPN | BEGIN A LIBRARY ENTRY: SET STITCHES AND SEGMENT COUNT = 0 |
| RLADD | ADD ONE SPEED SEGMENT TO THE LIBRARY AND CREATE PSEUDO SEGMENTS IF NECESSARY |
| RLCLO | TERMINATE A LIBRARY ENTER, DELETE PREVIOUS ENTRY IF NECESSARY AND ADJUST FOR PEAK OR COPY SPEED MODE |
| RLSRCH | SEARCH THE LIBRARY FOR THE SPECIFIED STYLE, OPERATION, AND SIZE: IF FOUND, SET FIRST TACK, LAST TACK, AND START STITCH VALUE TO THOSE IN THE LIBRARY |
| RSEWST | SEW AT START SPEED LIMITED BY MAX SPEED VALUE |
| RSEWA | SEW AT SPECIFIED SEW SPEED LIMITED BY MAX SPEED VALUE |
| RNSEG | ADVANCE TO THE NEXT SEGMENT IN THE LIBRARY: GET THE NEW SPEED AND STITCH COUNT VALUES. SEGMENT COUNT + 1 |
| RSEWSP | SEW AT STOP SPEED LIMITED BY MAX SPEED VALUE |
| RNDLY | SET THE TIMER FOR THE CORRESPONDING LIBRARY PIVOT DELAY |
| RMDLY | COPY CURRENT PIVOT DELAY VALUE INTO THE CURRENT LIBRARY SEGMENT |
| RMCNT | COPY STITCH AMOUNT INTO THE CURRENT LIBRARY SEGMENT |
| RMSPD | COPY SEW SPEED INTO THE CURRENT LIBRARY SEGMENT |
| RERSIZ | ERASE LIBRARY ENTRY HAVING THE SPECIFIED STYLE, OPERATION, SIZE |
| RSPMON | MONITOR SEW SPEED AND MAKE LIBRARY ENTRIES AS REQUIRED |
| RTIMEZ | SET THE TIMER WITH VALUE 0 |
| RDLY | COMPUTE ELAPSED PIVOT DELAY TIME AND CONVERT TO SCALE OF 1 - 7 |
| RNUP | DRIVE AT POSITION SPEED UNTIL NEEDLE IN UP POSITION |
| RGETBT | INITIALIZE FIRST TACK, LAST TACK AND START STITCH VALUES TO THOSE LAST USED IN MANUAL SEW MODE |
| RSTOBT | SAVE FIRST TACK, LAST TACK, AND START STITCH VALUE FOR MANUAL SEW MODE |
| RPFTDN | LOWER PRESSER FOOT AND WAIT 150 MS. |
| RFT | PERFORM THE FIRST TACK USING THE SPECIFIED NUMBER OF STITCHES |
| RSEWM | SEW MANUALLY UNDER TREADLE CONTROL AND LIMIT THE SPEED TO THE MAXIMUM SPEED VALUE |
| RDYNB | APPLY THE DYNAMIC BRAKE UNTIL RPM=400 OR LESS |
| RNDN | DRIVE TO NEEDLE DOWN |
| RBOUN | WAIT 50 MS TO PROVIDE SWITCH DE-BOUNCE |
| RMBRK | APPLY THE MECHANICAL BRAKE FOR 64 MS |

| | -continued |
|---|---|
| RLT | PERFORM THE LAST TACK USING THE SPECIFIED NUMBER OF STITCHES |
| RTRIM | PERFORM THE TRIM AND WIPE SEQUENCE |
| RSSC | INITIALIZE THE LIBRARY SEARCH VALUES |
| RTIMEA | SET THE TIMER FOR 1 SECOND |
| RNSTY | SEARCH THE LIBRARY FOR THE NEXT LARGEST STYLE |
| RITMEB | SET THE TIMER FOR .5 SECOND |
| RNOPR | SEARCH THE LIBRARY FOR THE NEXT LARGEST OPERATION HAVING THE SAME STYLE |
| RNSIZ | SEARCH THE LIBRARY FOR THE NEXT LARGEST SIZE HAVING THE SAME STYLE AND OPERATION |
| RLIBBT | SEARCH THE LIBRARY FOR THE SPECIFIED STYLE, OPERATION AND SIZE: IF FOUND, SET FIRST TACK, LAST TACK AND START STITCH VALUES TO THOSE IN THE LIBRARY |
| RPSSLZ | SET SEW SPEED = 1 PIVOT DELAY = 0, STITCHES = 0 |
| RSEWC | SEW USING THE TREADLE LIMITED BY MAX SPEED AND THE SELECTED SEW SPEED |

Referring to FIG. 2, it may be seen that the Manual Sew Mode of operation may be selected by specifying to the computer 72 in the MENTRY state the condition, Manual Sew (MS). This is accomplished by an operator touching the Manual Sew touch pad 124 of the control panel as shown in FIG. 3. The condition of an operator's touching the Manual Sew touch pad 124 calls upon the computer 72 to initiate the action of requesting backtack information of an operator.

Figure 6:
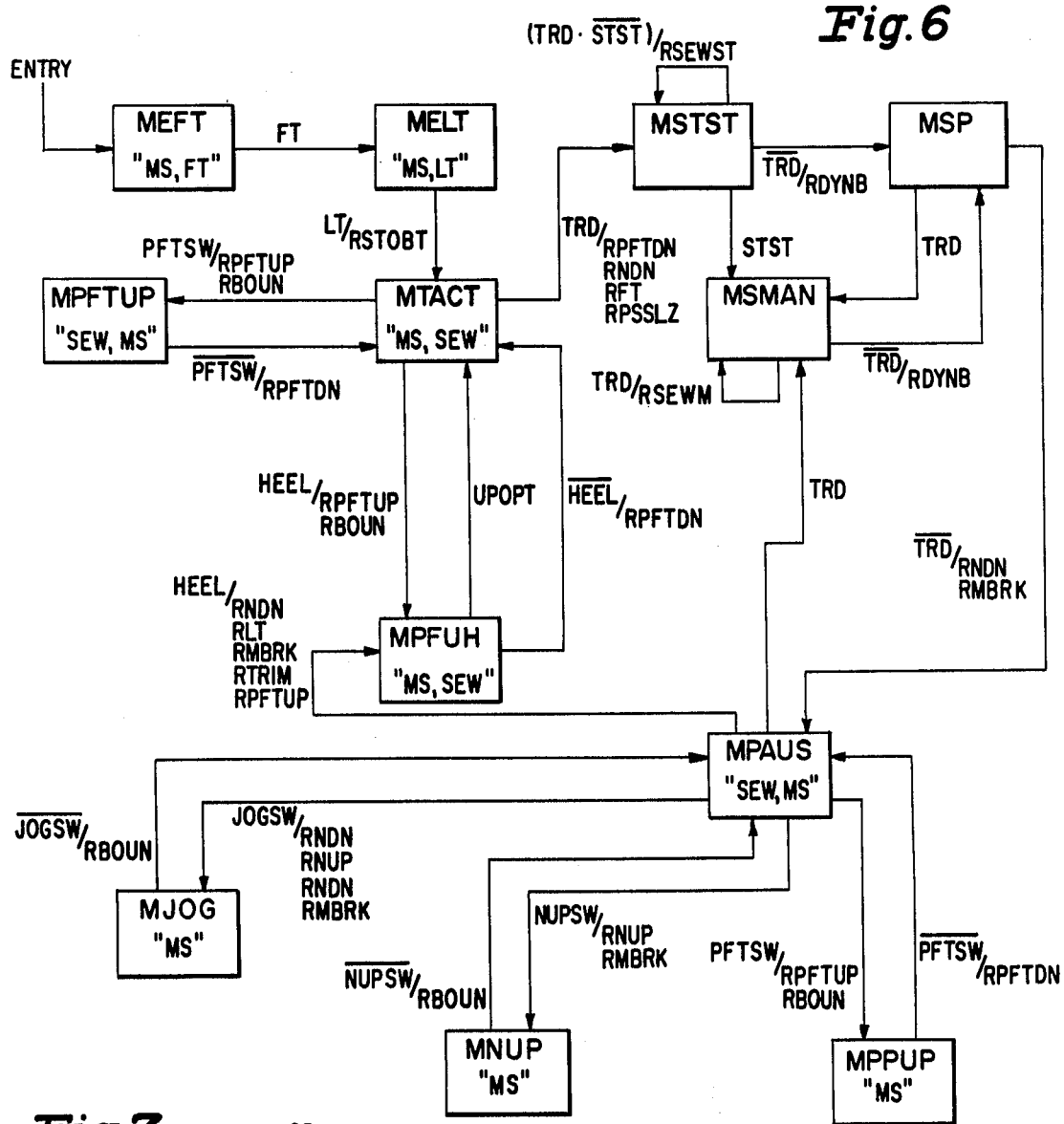
FIG. 6 is a Manual Sew state chart indicating the various states attainable during manual sewing.
Figure 7:
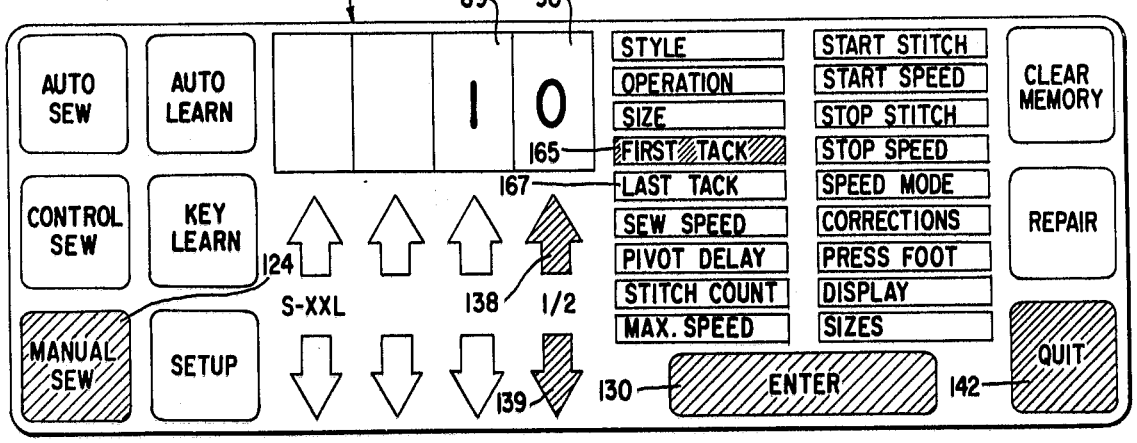
FIG. 7 is an elevation of the control panel while in the Manual Sew mode indicating the active portion thereof during the first tack determination.

MANUAL SEW MODE OF OPERATION:

In FIG. 6, the Manual Sew state chart is shown. From the MENTRY state, the sewing system 40 goes into the MEFT state, the control panel 85 appearing as is shown in FIG. 7. As indicated in the MEFT balloon, the Manual Sew touch pad 124 and a First Tack request 165 are illuminated by the computer 72. In addition, the Enter touch pad 130 and the "D" Slew touch pads 138, 139 are illuminated and made active by the computer 72, so that digits displayed in the windows 89–90 of the control panel 85, indicative of the number of first tack locking stitches desired, may be varied and entered into the memory of the computer. The first tack and last tack described below, are backtacks wherein a selected number of stitches are made with the sewing machine 50 feeding in the one direction, and an equal number of stitches are made in the other direction to return to the starting point. They are used as locking stitches, and to strengthen the beginning and the end of a seam. The Quit touch pad 142 is also illuminated and made active by the computer 72, as it is in all states for every mode of machine operation, so that an operator may at any time revert to the MENTRY state of the sewing system 40, from which a selection of any other mode of operation may be made. After a selection of the number of stitches in the first tack is made by an operator and entered into the memory of the computer 72 by touching of the Enter touch pad 130, this condition (FT) places the sewing system 40 in the MELT state wherein illumination is removed from the First Tack request 165 and a Last Tack request 167 is illuminated, requesting from an operator the number of locking stitches desired at the end of a sewing cycle. The control panel 85 appears as it does in FIG. 7 except for illumination of the Last Tack request 167 in place of the First Tack request 165.

After the desired number of locking stitches for the last tack is selected by an operator and entered into the memory of the computer 72 by touching of the Enter touch pad 130 (condition LT), the sewing system 40 is in the MTACT state, wherein all the controls of the sewing machine 50, including the foot treadle 65, are responsive to the actions of an operator. The condition of actuation of the presser foot elevating switch 77 (PFTSW), by way of the knee shift device 80, calls upon the computer 72 to initiate a routine raising the pressure foot and, to prevent a false reading thereof, to not read the switch until after bounce of the switch contacts ceases. The sewing system 40 is then in the MPFTUP state shown in FIG. 6. The condition of nonactuation of the presser foot switch 77, indicated in FIG. 6 by $\overline{\text{PFTSW}}$, calls upon the computer 72 to initiate a routine lowering the presser foot 53. A heel depression condition of the foot treadle 65 by an operator calls upon the computer 72 to initiate a routine to raise the presser foot 53 and, as described above, debounce the switch to prevent a false reading thereof. The sewing system 40 is then in the MPFUH state shown in FIG. 6. If the Up option for the presser foot 53 had been selected in the Set Up Mode when requested by the Press Foot request 156, the MPFUH state will revert to the MTACT state. If the Up option for the presser foot 53 was not selected, the removal of the heel condition of the foot treadle 65, indicated by $\overline{\text{HEEL}}$ in FIG. 6, will initiate a routine in the computer 72 to return the presser foot to a down position, returning the sewing system 40 to the MTACT state.

Where the foot treadle 65 is depressed forwardly, a condition indicated by TRD in the state chart of FIG. 6, the computer 72 serially initiates routines to lower the presser foot 53, to lower the sewing needle 52 to a position to start the first stitch, to accomplish the first tack from the information previously entered in the memory of the computer and to establish nominal values for pivot delay and sew speed and to initialize (at zero) the number of stitches sewn. Each routine follows the completion of the prior routine as sensed or determined by the computer 72.

The sewing system 40 is in the MSTST state where the number of start stitches specified in the Set Up Mode described above, are stitched and counted by the computer 72. The condition of the foot treadle 65 being depressed but the number of start stitches specified not having been completed, symbolized by TRD. $\overline{\text{STST}}$ in FIG. 6, continues to call upon the computer 72 to initiate the routine for sewing start stitches. This is indicated by the loop leaving the MSTST state and reentering that state. When a number of start stitches requested by the computer 72 have been completed, symbolized by STST, continued actuation of the foot treadle 65 places the sewing system 40 in the MSMAN state; and further stitching takes place in that state as indicated by the loop coming back on the MSMAN state having the TRD condition. Discontinuing forward depression of the foot treadle 65, symbolized by $\overline{\text{TRD}}$ in the state charts, initiates a routine in the computer 72 calling for the application of dynamic braking by the drive system of the sewing machine 50 to a speed of approximately 400 RPM. The sewing system 40 is in the MSP state in the diagram of FIG. 6. Maintaining the foot treadle 65 in a neutral position after the speed of the drive system has been reduced to about 400 RPM, will cause the computer 72 to initiate a routine to sense when the sewing needle 52 is in the down position and to initiate a routine to activate the mechanical brake stopping the drive system with the sewing needle in that position. At this point the sewing system 40 is in the MPAUS state shown in FIG. 6. Where the foot treadle 65 is depressed forwardly by the toe of an operator, the condition TRD, the sewing system 40 will revert to the MSMAN state. Where the foot treadle 65 is thrown into a heel condition by pressure from the heel of an operator, the computer 72 serially initiates routines placing the sewing needle 52 in a down position, implementing the last tack previously requested by an operator, mechanically braking the drive system of the sewing machine 50 with the sewing needle down, effecting a trimming operation of the sewing threads while driving the sewing needle to an up position, and raising the presser foot 53 to an elevated position to facilitate removal of the fabric. The sewing system 40 is then in the MPFUH state, and will return to the MTACT state when the foot treadle 65 is removed from the heel position, or if the Up option for the presser foot 53 has been selected as has been described above. From the MPAUS state shown in FIG. 6, operation of the presser foot elevating switch 77, through actuation of the knee shift device 80 by an operator, will call upon the computer 72 to initiate a routine to raise the presser foot 53 of the sewing machine 50 and a routine to debounce the switch. The sewing system 40 will then be in the MPPUP state shown in FIG. 6. Release by the operator of the knee shift device 80, represented by the condition $\overline{\text{PFTSW}}$, causes the computer 72 to initiate a routine to lower the presser foot 53 of the sewing machine 50, and the sewing system 40 will revert to the MPAUS state. Where an operator actuates the needle-up positioning switch 70 by a lateral toe motion, this condition requests the computer 72 to initiate routines to drive the sewing needle 52 in an up position and to mechanically brake the drive system of the sewing machine 50 when the needle 52 is in an up position. The sewing system 40 is then in the MNUP state of FIG. 6. On removal of pressure from the needle-up positioning switch 70, symbolically indicated by $\overline{\text{NUPSW}}$, the computer 72 initiates a routine to debounce the switch to forestall a false actuation reading. If an operator actuates the jog switch 68, mounted on the foot treadle 65, by a lateral toe motion, this condition requests the computer 72 to serially initiate routines directing the sewing machine 50 to make one stitch and stop. When the jog switch 68 is actuated by an operator, the sewing system 40 is in the MJOG state of FIG. 6. On removal of pressure from the jog switch 68, a condition indicated in FIG. 6 by $\overline{\text{JOGSW}}$, the computer 72 initiates a debounce routine to forestall any false reading of jog switch actuation.

In the above description of the Manual Sew Mode of operation, it is apparent that the computer 72 may initiate routines that are not necessary. As an example, when coming out of the MTACT state to the MSTST state, the condition of forward treadle depression calls upon the computer 72 to initiate a routine for lowering the presser foot 53. If in the Set Up Mode of operation, the down position had been requested, the presser foot 53 will already be in the down position when the sewing system 40 is in the MTACT state. The routine initiated by the computer 72 to lower the presser foot will, in this event, be surplusage, but is included to insure that the presser foot 53 is in a lowered condition when in the MSTST state. Where the Up option had been selected in the Set Up Mode, however, the routine initiated by the computer 72 to lower the presser foot is required as a first step in operation of the sewing machine 50. It is also apparent that a heel condition of the foot treadle 65 can take place from the MTACT state without having the computer 72 initiate routines for having the sewing machine 50 perform a last tack, activate mechanical brake, trim the sewing thread and raise the presser foot. The computer 72 is programmed not to initiate those routines unless at least one stitch has been sewn. Thereby, if no stitching has been accomplished, an operator retains flexibility for raising the presser foot 53 of the sewing machine 50, either by way of knee shift device 80 or by a heel condition of the foot treadle 65.

After a stitching cycle of at least one stitch has been completed by imposition of a heel condition of the foot treadle 65, the sewing machine 50 returns to the MTACT state immediately if the Up option has been selected in the Set Up Mode of operation, or, if the Up option has not been selected, whenever the foot treadle 65 is returned from a heel condition, as is indicated symbolically in FIG. 6 by $\overline{\text{HEEL}}$. From the MTACT state, another manual sewing cycle may be initiated, or, by an operator's touching the Quit touch pad 142, the sewing system 40 is reverted to the MENTRY state from which any other mode of operation may be selected. In the latter case the control panel 85 will appear as is shown in FIG. 3, wherein the touch pads 116, 118, 120, 122, 124, 126, and 128 for the seven modes of operation are illuminated and made active by the computer 72.

AUTO LEARN MODE OF OPERATION

Figure 8:
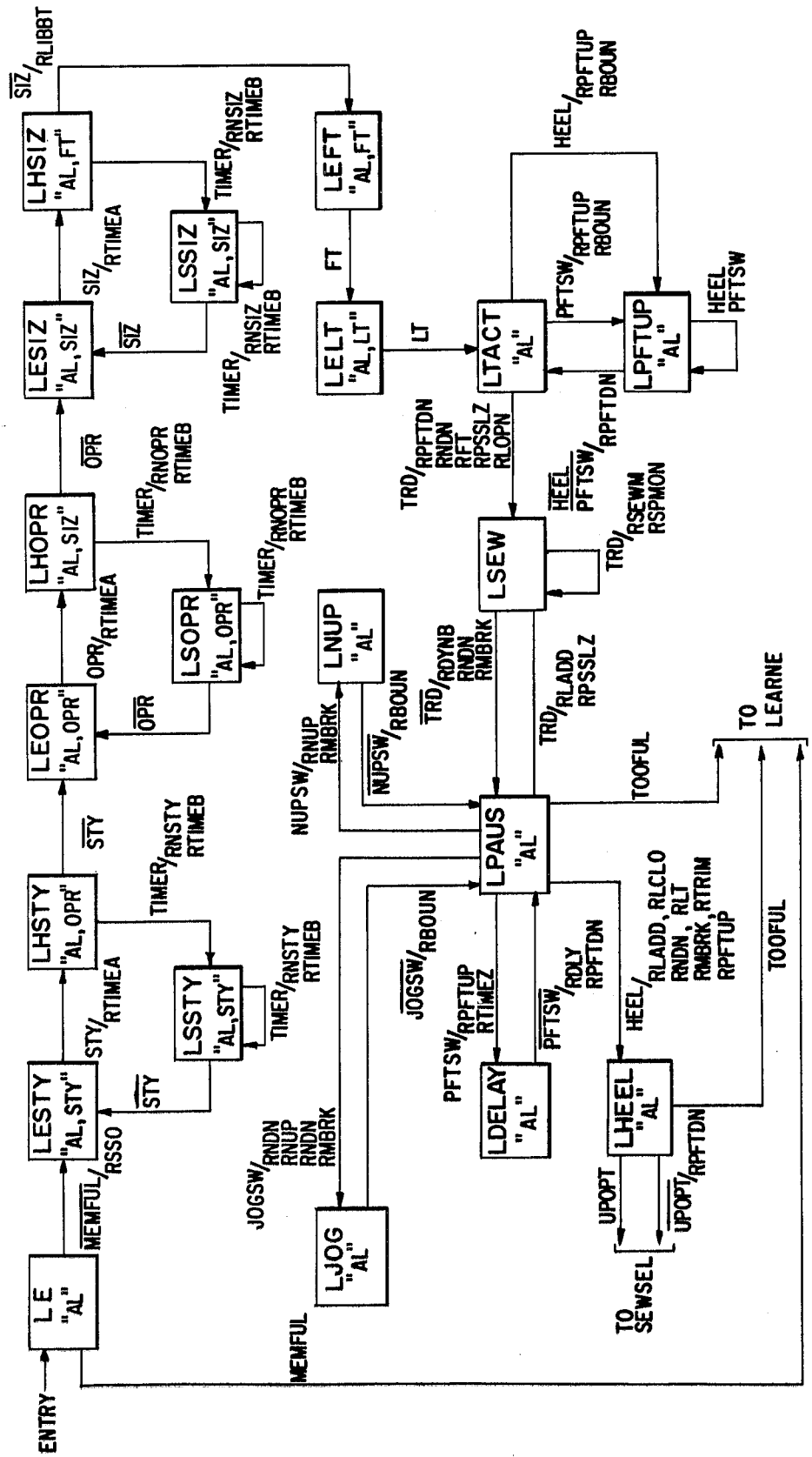
FIG. 8 is a state chart of the sewing machine in the Auto Learn mode.

By an operators placing her finger on the Auto Learn touch pad 118, the sewing system 40 passes from the MENTRY state shown in FIG. 2, to the LE state shown in FIG. 8. If the memory in the computer 72 is full and unable to store another program, a condition indicated symbolically by MEMFUL, the sewing system reverts immediately to the LEARNE state shown in FIG. 9, where the word FULL is displayed in the windows 87–90 of the control panel 85, the Clear Memory (Erase) touch pad 128 is illuminated and a buzzer is actuated. This serves to signal an operator that the memory of the computer 72 is full, and that she must go to a Clear Memory (Erase) Mode of operation in order to remove information from the memory so as to provide room for the new information. An operator may proceed from the LEARNE state to an Erase Mode, which will be described below, by touching the Clear Memory (Erase) touch pad 128.

Where the memory of the computer 72 is not full and is able to store additional information, a condition indicated symbolically by $\overline{\text{MEMFUL}}$, the computer initiates a routine to initialize search values. It will be recalled that during the Set Up Mode of operation, a Display request 158 requested, by way of the words "LAST" or "ZERO" in the windows 87–90 of the control panel 85, whether the operator wished the last item entered to be displayed or wished the display to come up all zeros. A routine to initialize search values, originating in the computer 72, is responsive to that selection in the Set Up Mode of operation.

Figure 11:
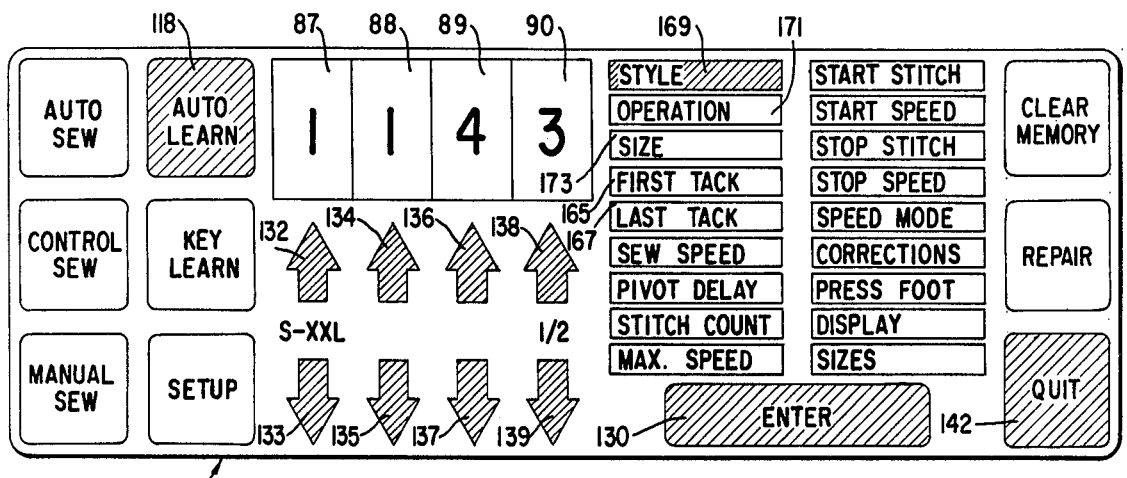
FIG. 11 is an elevation of the control panel while in the Auto Learn mode indicating the active portions thereof prior to selection and entry of Style.

The sewing system 40 is now in the LESTY state, with the control panel 85 appearing as shown in FIG. 11. The display in the control panel 85 shown in FIG. 11, assumes that the LAST option was chosen for the display selected in the Set Up Mode of operation. Thus the windows 87–90 in the control panel 85 display the last style entered. If the Zero option had been chosen during the Set Up Mode of operation, the windows 87–90 of the control panel 85 would display all zeros. In the LESTY state, the control panel 85 has the Auto Learn touch pad 118 illuminated, the Slew touch pads 132–139 illuminated and made active to enable an operator to vary the display in the windows 87–90, and the Enter touch pad 130 illuminated and made active, so that selected digits may be stored in the memory of the computer 72. A Style request 169 is illuminated by the computer 72 advising an operator that the digits displayed in the windows 87–90 and entered in the memory of the computer 72 are the first part of an address to the memory for a sewing cycle which will be learned by the machine. As in most other states of the sewing system 40, the Quit touch pad 142 is illuminated and made active in order to enable an operator at any time to revert to the MENTRY state.

The operation of the Enter touch pad 130 in the LESTY state is somewhat modified by the computer 72 in order to facilitate the placing of information in a desired location in the memory of the computer. If the Enter touch pad 130 is touched by an operator while the sewing system 40 is in the LESTY state, the computer 72 initiates a routine setting a timer to measure the duration of touching of the Enter touch pad. If the time duration exceeds an amount of approximately one second, the duration becomes a condition requesting the computer 72 to initiate a routine to search for the next style in the memory, and to initiate a routine setting a timer to display the style so found. If the Enter touch pad 130 continues to be touched by an operator, the process is repeated with the digits displayed in the windows 87–90 of the control panel 85 indicating all styles existing in the memory of the computer 72. This process is indicated in the state chart of FIG. 8 by the progression from the LESTY state to the LHSTY state during which the touched time duration is being measured, and if the touched time duration exceeds a specified time A, the computer 72 initiates a routine to search for the next style and a routine to display the next style for a timed duration B. If the Enter touch pad 130 continues to be touched by an operator, the sewing system 40 is in the LSSTY state wherein the windows 87–90 continue to display digits of styles already in the memory of the computer 72. If an operator ceases to touch the Enter touch pad 130, symbolically indicated by $\overline{STY}$, the particular digits displayed in the windows 87–90 of the control panel 85 at that time, will remain on display. The sewing system 40 is then in the LESTY state. The operator may slew the digits displayed in the window 90 of the control panel 85 by use of the appropriate Slew touch pads 132–139. If the Enter touch pad 130 is touched momentarily, symbolically indicated by $\overline{STY}$, the sewing system 40 progresses from the LESTY state to the LHSTY state, and because the time duration A has not been exceeded, the sewing system proceeds to the LEOPR state.

In the LEOPR state, the computer 72 removes the illumination from the Style request 169, and illuminates an Operation request 171, requesting an operation address for the memory of the computer 72. The control panel 85 will appear substantially as shown in FIG. 11 except that the Operation request 171 will be illuminated and the Style request 169 will not be illuminated. The selection of digits representative of the operation to be learned is made identically to the selection of the style digits. In FIG. 8, the OPR indicates the condition of the Enter touch pad 130 being touched by an operator. The condition $\overline{OPR}$ symbolizes an Enter touch pad 130 which had been touched by an operator for less than a time duration A, or which had the touching thereof ceased. When the correct digits are displayed in the windows 87–90 of the control panel 85, a momentary touch of the Enter touch pad 130 by the operator will place the sewing system 40 in the LESIZ state shown in FIG. 8. The control panel 85 appears as is shown in FIG. 11, except that the Style request 169 is not illuminated, and a Size request 173 is illuminated by the computer 72. Selection of size is identical to the selection of style described above. Where the Enter touch pad 130 is momentarily touched by an operator, a condition symbolically indicated by $\overline{SIZ}$ in FIG. 8, the computer 72 enters the size displayed and initiates a routine for requesting backtack information, and for setting the displays in the windows 89–90 of the control panel 85 according to the selected LAST/ZERO request by Display request 158 during the Set Up Mode of operation described above.

When the desired size information is entered into the memory of the computer 72 in a fashion similar to that discussed above for the entry of style information, a complete address to the memory of the computer 72 has been supplied; and the sewing system 40 is in the LEFT state shown in FIG. 8. The control panel 85 with the sewing system 40 in the LEFT state will appear as shown in FIG. 11 with however the illumination removed from the Style request 169 and with a First Tack request 175 illuminated by the computer 72. Also, only the Slew touch pads 138 and 139 will be illuminated and made active by the computer 72 and the windows 89–90 will display digits according to the LAST/ZERO selection made in the Set Up Mode described above. The number of initial locking stitches desired may be displayed in the windows 89–90 of the control panel 85 as explained above, with entry into the memory of the computer 72 achieved by touching of the Enter touch pad 130 by the operator. Upon entry of the first tack (FT) information of the memory of the computer 72, the computer advances the sewing system 40 into the LELT state. In this state the control panel 85 has a Last Tack request 177 illuminated by the computer 72 in place of the First Tack request 175, thereby requesting of an operator the number of final locking stitches desired. When this information is entered into the memory of the computer 72 by an operator touching the Enter touch pad 130, the sewing system 40 enters the LTACT state, wherein the foot treadle 65 is active to control the operation of the sewing machine 50. Referring to FIG. 8, the sewing machine in the LTACT state may be brought to a LPFTUP state by actuation of the presser foot switch 77 thru the knee shift device 80, or by a heel condition of the foot treadle 65, both of which conditions initiate routines in the computer 72 to raise the presser foot 53 of the sewing machine 50 and to debounce the switch by time delay as explained above, to prevent false readings thereof. The sewing system 40 stays in the LPFTUP state as long as the presser foot switch 77 is actuated or as long as the heel condition of the foot treadle 65 is maintained, as symbolized by the loop from and returning to the LPFTUP state. If the heel condition of the foot treadle 65 is removed, or the actuation of the presser foot switch 77 is removed, symbolized by $\overline{\text{HEEL}}$ or $\overline{\text{PFTSW}}$, respectively, the computer 72 initiates a routine to lower the presser foot 53. As explained in the Manual Sew Mode above, a heel condition of the foot treadle 65 is not effective to initiate termination of a sewing cycle unless at least one stitch has been sewn. Therefore, a heel condition of the foot treadle 65 may be utilized before stitching to raise the presser foot 53 of the sewing machine 50.

Figure 12:
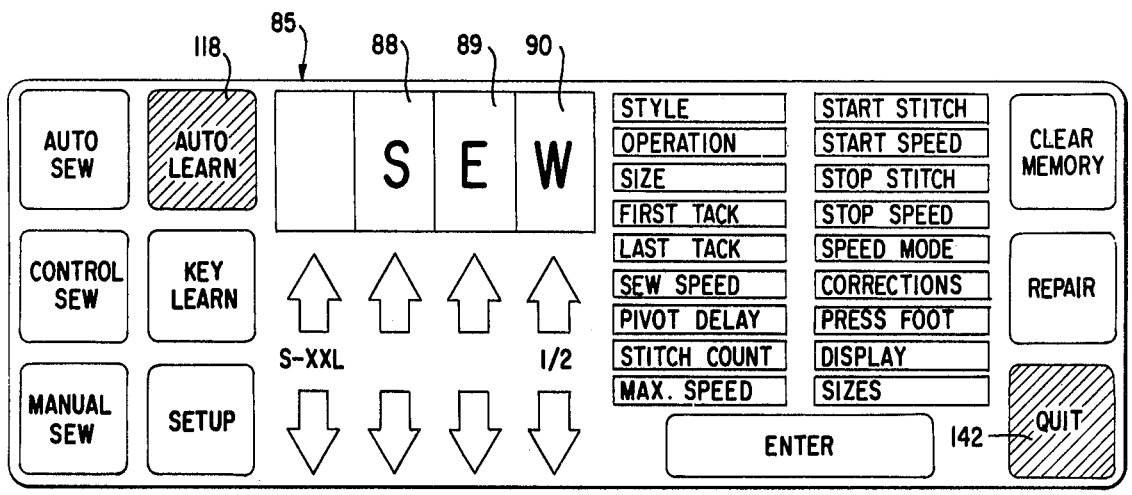
FIG. 12 is an elevation of the control panel while in the Auto Learn mode and after the selection of last tack, indicating the active portions thereof.

With the sewing system 40 in the LTACT state, the control panel 85 would appear as is shown in FIG. 12. The windows 88–90 of the control panel 85 display the word "SEW". The Quit touch pad 142 is illuminated and made active to permit an operator at any time to revert to the MENTRY state. Referring to FIG. 8, it can be seen that forward depression of the foot treadle 65, symbolically indicated by TRD, causes the computer 72 to initiate routines serially for lowering the presser foot 53 of the sewing machine 50, for placing the sewing needle 52 thereof in a down position from which all stitching begins, for stitching the series of locking stitches requested as first tack, for initializing values of pivot delay and sew speed and stitch count, and for opening a temporary memory (library). The sewing system 40 is now in the LSEW state. On continued forward rotation of the foot treadle 65, the sewing system 40 remains in the LSEW state and the computer 72 initiates routines activating the sewing machine drive system, reading the speed demanded by the foot treadle 65, limiting speed to Max Speed specified in the Set Up Mode, and monitoring speed to obtain an approximation of the actual speed profile of the sewing machine 50. The speed of the sewing machine 50 is monitored in the Copy Mode and recorded in steps of number of sewing stitches performed within a speed range which is one of many ranges in a speed table covering the total sewing machine speed capability. The various ranges of the speed table are impressed in the memory of the computer 72, along with an algorithm which is responsive to the speed sensor of the drive system to select the proper range for recording. In this way, if the "COPY" option was selected in the Set Up Mode of operation described above, later automatic reproduction of the sewing cycle may be accomplished at a copy of the speed profile learned in this the learning cycle. If the "PEAK" option is selected, the computer 72 effects automatic reproduction of the sewing cycle at the peak speed range attained for each segment.

Figure 24:
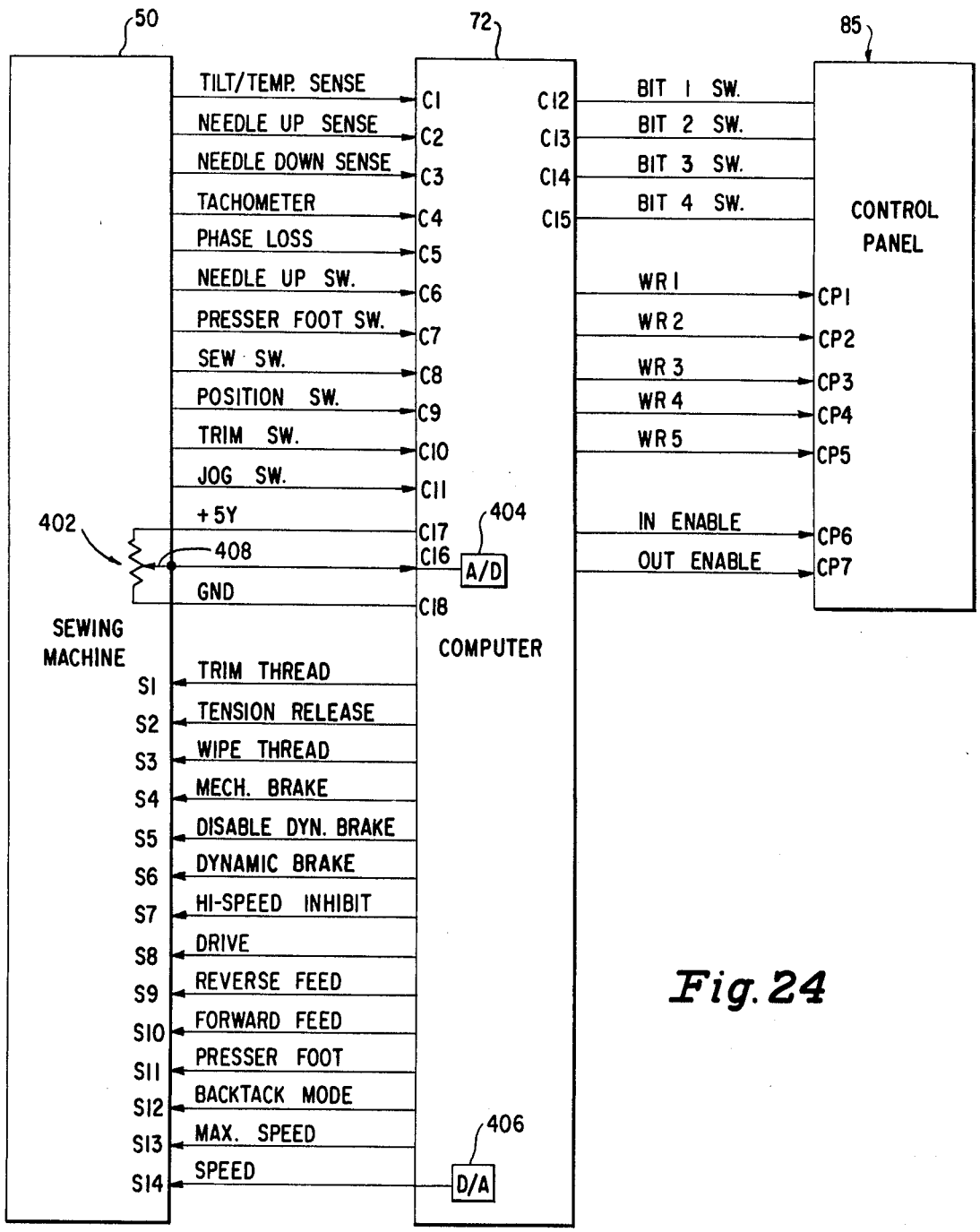
FIG. 24 is a representation of the sewing system in block diagram form indicating the interconnections between the sewing machine, computer and control panel thereof.

The variable speed profile recording algorithm is part of the computer 72 software that is described hereinbelow and made part of this application as an appendix. Reference to FIG. 24, which is described hereinbelow in detail, shows a potentiometer 402 the wiper arm 408 of which is coupled to and actuated by the treadle 65. Accordingly, actuation of the treadle 65 produces an analog voltage at the wiper arm 408 that is proportional to the desired sewing speed. This analog voltage is coupled to the computer 72 by way of the computer 72 terminal C16. As will be apparent to those skilled in the art, the time constant of the sewing machine 50 drive motor prevents the actual sewing speed from corresponding exactly to changes in the desired sewing speed as evidenced by movement of the treadle 65. In other words, the actual sewing speed will generally lag the desired sewing speed when the treadle 65 is moved.

The basic rules of the variable speed profile recording algorithm are that when the speed of the sewing machine drive motor causes the actual sewing speed to become essentially the same as the then desired treadle 65 sewing speed, the speed is recorded for a psuedo segment just ended; and if successive desired treadle sewing speed values do not differ by some suitable quantum when the actual sewing speed is essentially the same, a new pseudo segment is not formed. A pseudo segment therefore, is the number of complete sewing stitches that occur between the time the treadle sewing speed value changes significantly (a change of 1 in a scale of 1 to 15, for example.) from a previously recorded speed and until the actual sewing speed is essentially the same as the then significantly changed treadle sewing speed. The recorded sewing speed for any pseudo segment is a constant and is the sewing speed at the end of the pseudo segment when the actual sewing speed corresponds to the then treadle sewing speed value. This is accomplished in accordance with the present invention by the programmed computer 72 which utilizes a software digital filter to simulate the actual speed of the sewing machine 50 drive motor (and, therefore, actual sewing speed) in response to the voltage magnitude on the wiper arm 408, which corresponds to the desired sewing speed. The programmed computer 72 will then compare the actual sewing speed with the desired sewing speed and, when they are essentially the same, record the speed at the end of the pseudo segment and the number of sewing stitches in the pseudo segment if, as described above, a significant treadle speed change has occurred since the last speed recorded.

As will now be apparent, the first pseudo segment of any sewing segment will be the number of sewing stitches that occur between the time that sewing starts and until the actual sewing speed is essentially the same as the then treadle sewing speed value. The recorded speed for this first pseudo segment is the sewing speed at the end of the first pseudo segment i.e. the sewing speed at which actual sewing speed was essentially the same as the then treadle value of sewing speed. A subsequent pseudo segment being recorded is dependent upon actual sewing speed being essentially the same as the then treadle value of sewing speed that is significantly different from the sewing speed recorded for the first pseudo segment. As will now be apparent, the sewing speed profile is stored in the computer 72 as a number (at least one) of pseudo segments with each pseudo segment including a fixed sewing speed and a number of sewing stitches. The number of pseudo segments needed to record the speed profile of any sewing segment depends upon the sewing speed characteristics of the operator performing the sewing segment. However, the algorithm described above enables complex sewing speed profiles to be recorded with relatively few pseudo segments thereby minimizing the memory capacity within the computer 72 needed to store these speed profiles. In the Auto Sew Mode of operation described below, the stored sewing speed profile is automatically reproduced. Even though the speed profile is stored in the computer 72 as discreet speed values, by applying these stored values to a digital to analog converter 406 (FIG. 24) and then applying the resulting analog signal to the sewing machine 50 drive motor by way of the sewing machine 50 terminal S14, the actual sewing speed profile performed in the Auto Learn Mode is substantially faithfully reproduced in the Auto Sew Mode of operation.

The appended program listing is described in detail hereinbelow. For those interested, however, the speed profile algorithm can be found in the program listing beginning at program statement number 1000.78 (Motor Speed Simulation) and ending at program statement number 1000.129, and beginning at program statement 5000.792 (Speed Monitor Routine) and ending at program statement number 5000.906.

Where forward depression of the foot treadle 65 ceases from the LSEW state, symbolically indicated by $\overline{\text{TRD}}$ in FIG. 8, the computer 72 initiates routines to dynamically brake the sewing machine 50 to a speed of approximately 400 RPM and when this is accomplished, as detected by speed sensors in the drive system, to mechanically brake the drive system of the sewing machine 50 with the needle 52 thereof in a down position. The sewing system is then in the LPAUS state shown in FIG. 8. As described above in the Manual Sew Mode of operation, the needle-up positioning switch 70 may be activated by the toe of an operator to bring the sewing needle 52 of the sewing machine 50 to an up position and place the sewing system 40 in the LNUP state shown in FIG. 8. The jog switch 68 may also be activated by the toe of an operator to cause the sewing machine 50 to place a single stitch in the LJOG state shown in FIG. 8. In the Auto Learn Mode of operation of the sewing system 40, however, actuation of the jog switch is recorded in the memory of the computer 72 as an additional stitch count. Actuation of the presser foot elevating switch 77, by an operator manipulating knee shift device 80, causes the computer 72 to initiate routines to raise the presser foot 53 and to measure the time duration of the presser foot 53 in the raised condition. The sewing system 40 is in the LDELAY state of FIG. 8. Discontinuance of actuation of the presser foot elevating switch 77, indicated symbolically in FIG. 8 by a $\overline{\text{PFTSW}}$, causes the computer 72 to initiate routines to compute the elapsed time and to lower the presser foot 53 of the sewing machine 50. The sewing system 50 reverts to the LPAUS state as shown in FIG. 8. If the foot treadle 65 is reactivated from the LPAUS state shown in FIG. 8, a condition indicated by the TRD in FIG. 8, the computer 72 initiates routines adding the previous temporarily recorded information of sewing machine component operation, time duration, stitch counts and speeds to the permanent memory in the computer, and resetting the pivot delay and sew speed values to nominal values and the stitch count to zero. The sewing system 40 is once again in the LSEW state shown in FIG. 8 where further stitching operations may be performed. When the sewing system 40 is in the LPAUS state shown in FIG. 8, and the foot treadle 65 is placed in a heel condition, there having been at least one stitch made, the computer 72 initiates routines adding the temporarily recorded stitch counts, sew speeds, time delays and other sewing machine component operations into the permanent memory of the computer and preventing access of other information to the memory at that address, and initiates the other routines explained in the Manual Sew Mode of operation above which direct the sewing machine 50 to stitch the last tack, cut the threads and raise the presser foot 53 to an elevated condition. The sewing system 40 is in the LHEEL state shown in FIG. 8.

The lines from the LPAUS state and the LHEEL state marked with the condition TOOFUL, indicate a condition at that address of the memory of the computer 72 of insufficient storage capability to accept further information for a segment. The sewing system 40 will, in that case, revert to the LEARNE state shown in FIG. 9.

Figure 13:
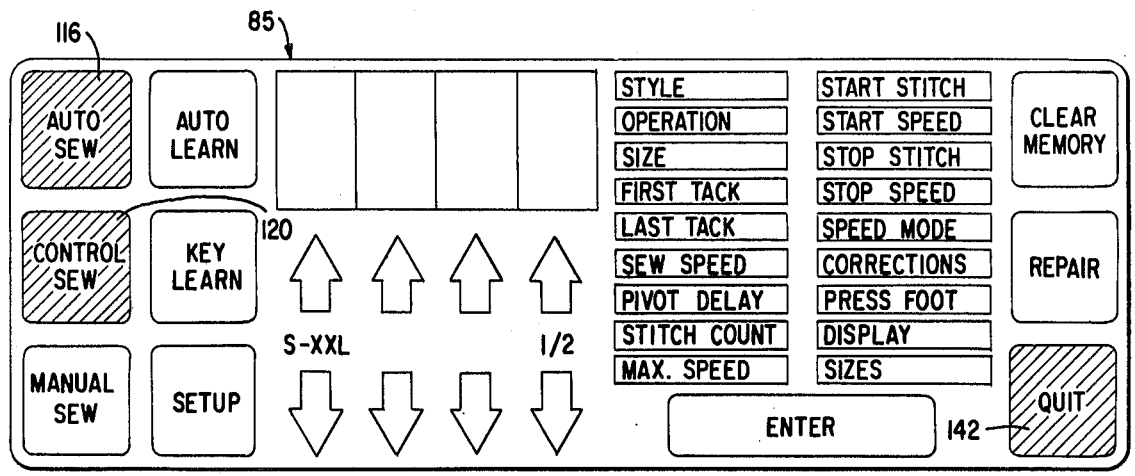
FIG. 13 is an elevation of the control panel indicating the active portion thereof after the completion of the Auto Learn cycle.

With the sewing system 40 in the LHEEL state shown in FIG. 8, where the Up option for the presser foot 53 was selected in the Set Up Mode of operation described above, the presser foot is raised to an elevated condition and the control panel 85 appears as is shown in FIG. 13 with the Auto Sew touch pad 116, the Control Sew touch pad 120 and the Quit touch pad 142 illuminated and made active by the computer 72, to permit an operator to select either of those modes of operation or to quit and revert to the MENTRY state shown in FIG. 2. The sewing system 40 is in the SEWSEL state shown in FIG. 10. Similarly, where the Up option for the presser foot 53 had not been selected, the computer 72 initiates a routine to lower the presser foot, the control panel 85 still appearing as shown in FIG. 13.

Thus, in the Auto Learn Mode of operation, an operator specifies to the memory of the computer 72 an address location where a series of component operations, time delays, stitch counts and speed ranges at which effected, may be entered. The sewing system 40 is arranged so that the computer 72 is responsive to conditions of operator actuated control of the sewing system, including those on control panel 85, to initiate commands for further internal actions in the computer or external actions for component operation. In the Auto Learn Mode, the sewing system 40 may be operated by an operator as a normal industrial sewing machine, without regard for the various states in FIG. 14 in which the sewing system is placed. However, the sewing system 40 "learns" all those things performed by an operator in completing a sewing cycle, except for the actual guiding of the work material. At the completion of the sewing cycle, the sewing system 40 is in the SEWSEL state shown in FIG. 10 from which a selection of Auto Sew or Control Sew Modes of operation may be made.

KEY LEARN MODE OF OPERATION

Figure 14:
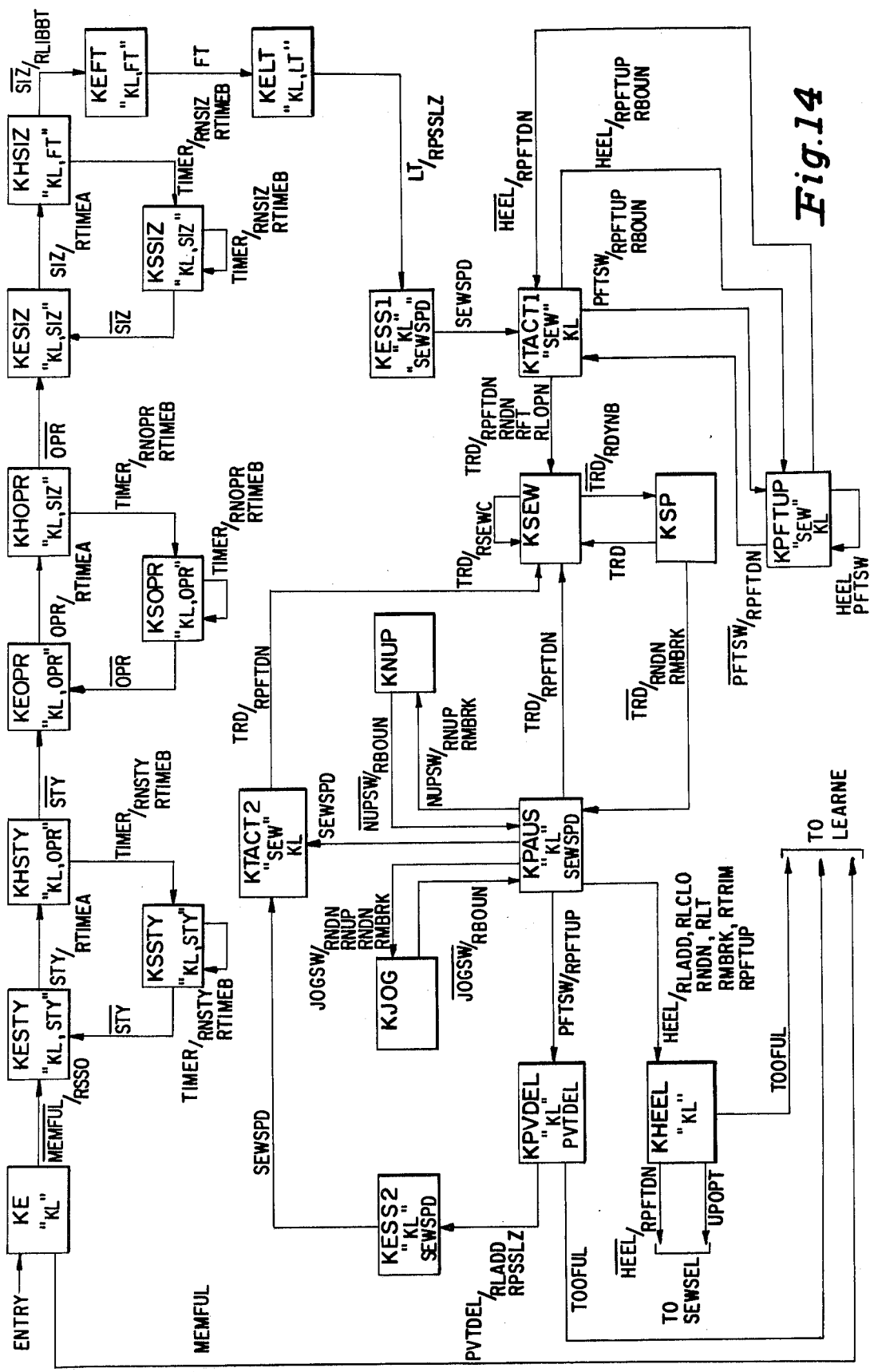
FIG. 14 is a state chart of a sewing system in the Key Learn mode.

In FIG. 14 is shown the state chart of the sewing system 40 in the Key Learn Mode of operation. The Key Learn Mode of operation is entered from the MENTRY state shown in FIG. 2 by an operator touching the Key Learn touch pad 122 of the control panel 85 while in the MENTRY state, where the control panel 85 appears as shown in FIG. 3. The Key Learn Mode of operation of the sewing system 40 is similar to the Auto Learn Mode of operation with the provision, however, for an operator to enter a desired sewing speed into the memory of the computer 72 directly and without regard to the actual speed of the stitching operation. An operator may also specify pivot delay time, that is, the amount of time during which the sewing needle 52 is in a down position extending through a work material, and the presser foot 53 is in an elevated state away from the work material, permitting the operator to rotate cloth about the needle preparatory to laying a new line of stitching. The Key Learn Mode of operation, therefore, permits an operator to perform the actual stitching operations at a slower rate of speed during which a high degree of care may be exercised while obtaining automatic playback at a faster rate of speed. Conversely, a rapid execution by a skilled operator may be played back at a slower rate for a trainee.

Figure 15:
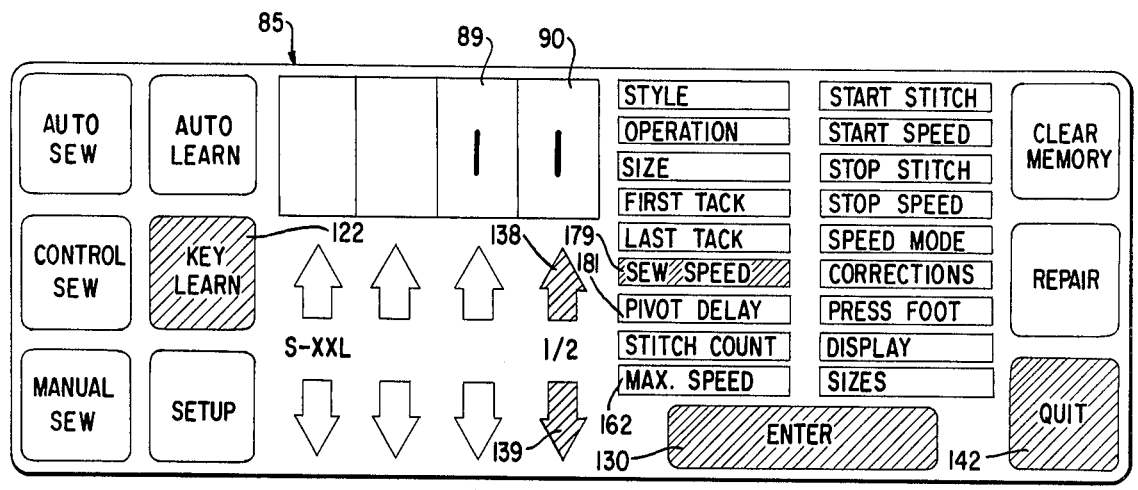
FIG. 15 is an elevation of the control panel with the sewing system in the Key Learn mode indicating those portions thereof which are active prior to selection of sew speed.

By a comparison of the Key Learn state chart of FIG. 14 with the Auto Learn state chart of FIG. 8, it will be noted that there are two treadle active states, KTACT1 and KTACT2, in the Key Learn Mode of operation. Associated with the two treadle active states, KTACT1 and KTACT2, there are the states, KESS1 and KESS2, wherein an operator is requested to select sew speed. There is also a KPVDEL state wherein an operator is requested to specify the pivot delay time by the computer 72 for the memory thereof. Thus, after the last tack information is entered in the KELT state, corresponding to the LELT state in the Auto Learn Mode of operation, the sewing system 40 is in the KESS1 state shown in FIG. 14 wherein the control panel 85 appears as is shown in FIG. 15. The Key Learn touch pad 122 and a Sew Speed request 179 are illuminated by the computer 72. The Quit touch pad 142 is also illuminated and made active by the computer 72 so that an operator may at any time revert to the MENTRY state. The "D" Slew touch pads 138, 139 are illuminated and made active by the computer 72, so that an operator may increment or decrement digits displayed in windows 89-90 of the control panel 85. The digits in the windows 89-90 of the control panel 85 are indicative of a proportion of the sewing machine speed up to the maximum speed selected by an operator in response to the Max Speed request 162 in the Set Up Mode of operation described above. The sew speed displayed in the windows 89-90 of the control panel 85 is entered into the memory of the computer 72 by touching the Enter touch pad 130, which is also illuminated and made active by the computer, or, when an operator activates the foot treadle 65 of the sewing system 40. The operation of the sewing system 40 in the KESS2 state shown in FIG. 14, or in the KPAUS state where sew speed is also requested by illumination of the Sew Speed request 179, is similar to that described for the KESS1 state; however, entering of the sew speed places the sewing system 40 in the KTACT2 state because the computer 72 is not required to initiate routines to implement the first tack or opening of the memory (library) in the computer. Where the presser foot switch 77 is activated by operator manipulation of the knee shift device 80, the sewing system 40 goes to the KPVDEL state. The control panel 85 appears as is shown in FIG. 15, except that the Sew Speed request 179 has the illumination removed therefrom by the computer 72, which illuminates a Pivot Delay request 181; requesting of an operator the desired pivot delay time to be entered into the memory of the computer. When the desired pivot delay time is entered into the memory of the computer 72 by the operator touching the Enter touch pad 130, the computer initiates routines to enter the previous sewing information into the memory of the computer and to set all display values for pivot delay, sew speed and stitches to nominal values.

Thus, as was explained above, the sewing system 40 in the Key Learn Mode of operation may have values for sewing speed and pivot delay artificially entered into the memory of the computer 72 for a predetermined playback speed irrespective of the actual speed of operation in this Key Learn Mode. In this fashion a skilled operator may rapidly prepare a complete sewing cycle which may be used in the Automatic Mode of operation by relatively unskilled operators. After the completion of a sewing cycle in the Key Learn Mode of operation, the sewing system 40 is in the SEWSEL state shown in FIG. 10.

AUTO SEW MODE OF OPERATION

Figure 17:
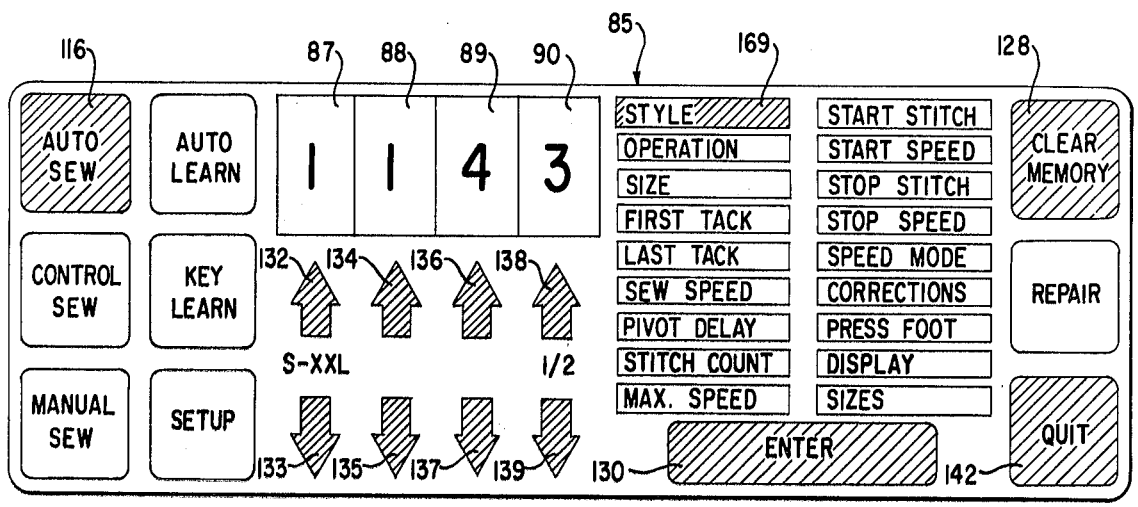
FIG. 17 is an elevation of the control panel while the sewing system is in one state in the Auto Sew mode indicating those portions thereof which are active.
Figure 16A:
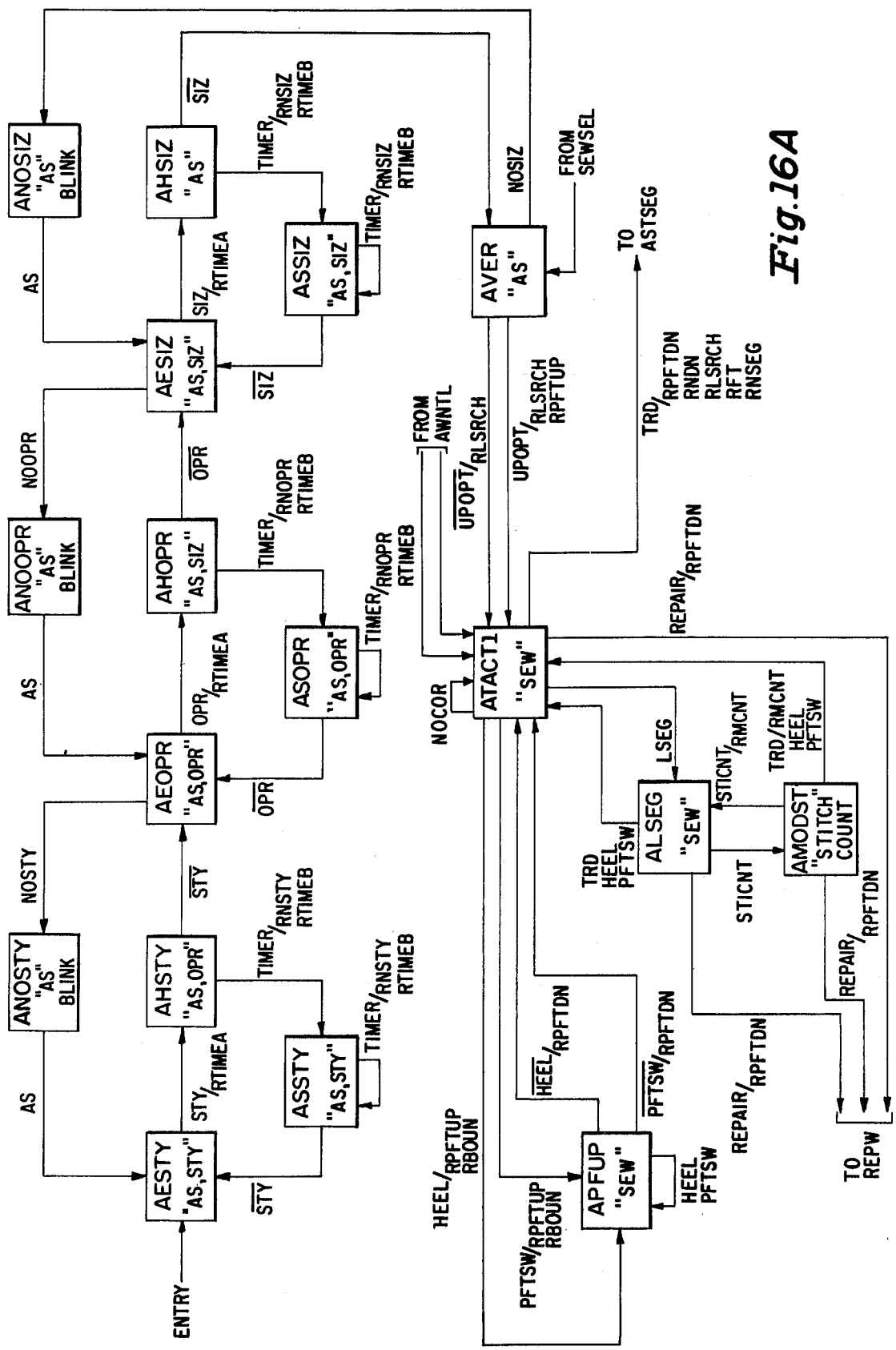
FIG. 16A–C is a state chart of the sewing system in the Auto Sew mode.
Figure 16B:
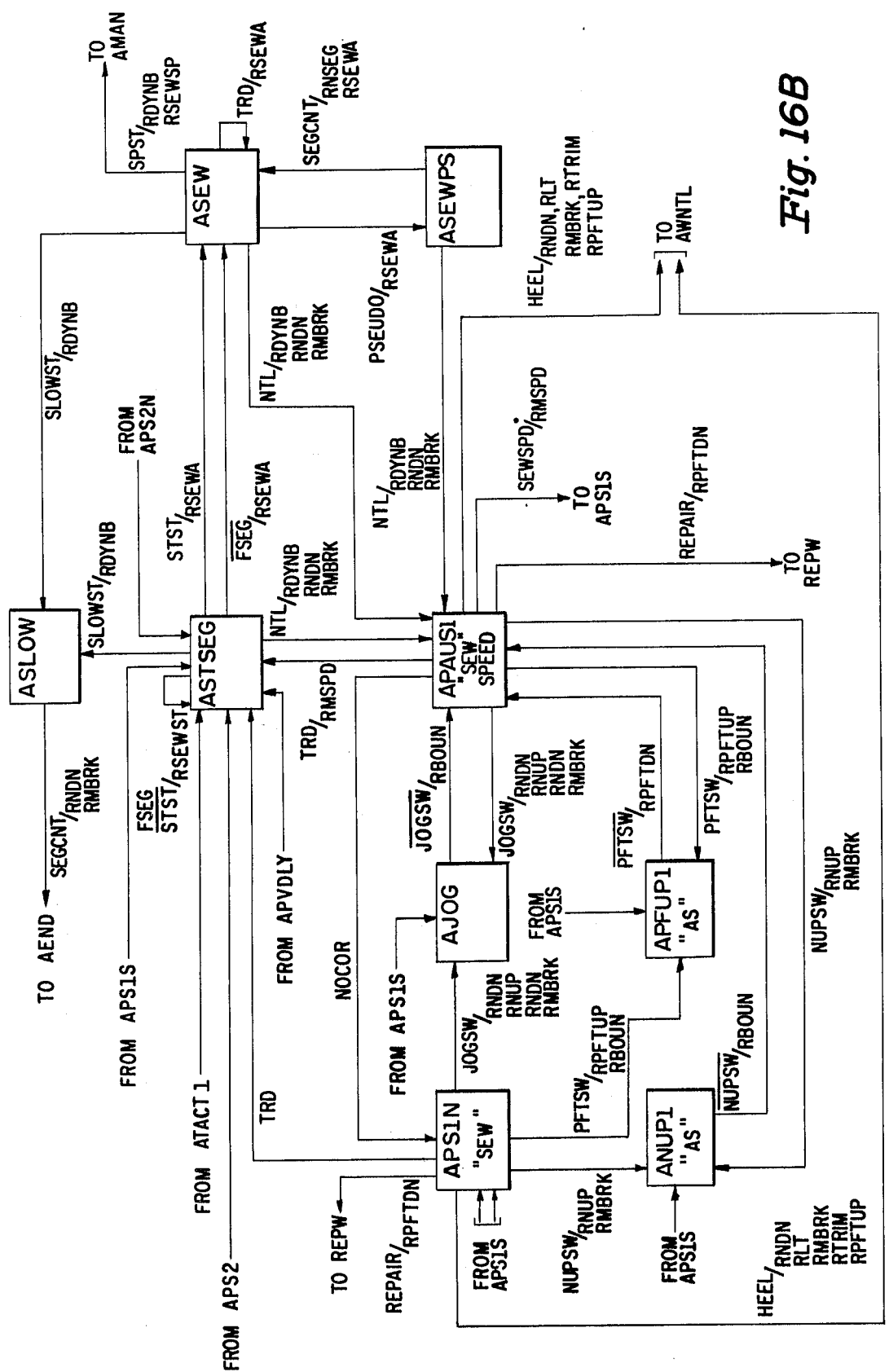
Figure 16C:
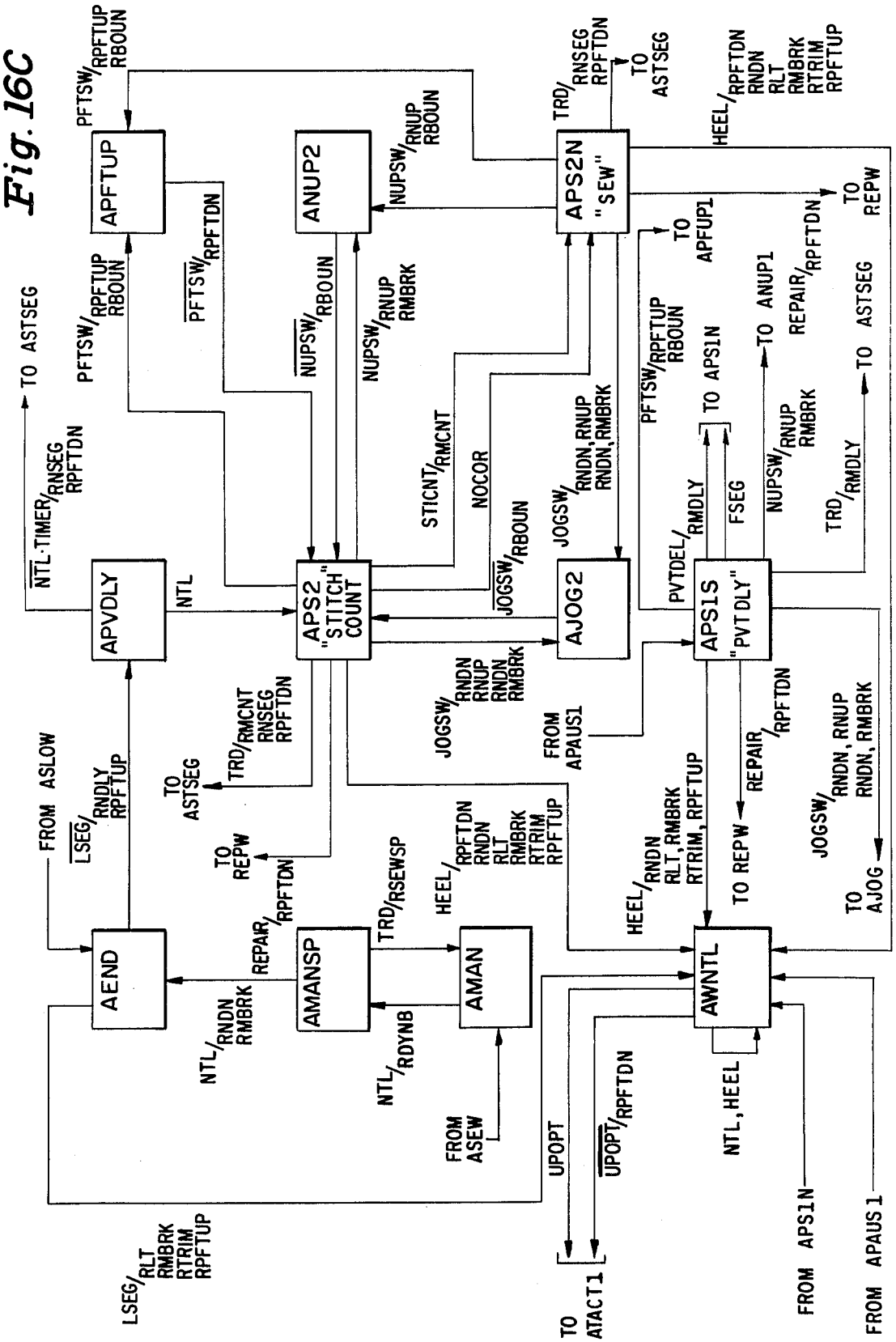

In FIGS. 16A through C, there are the state charts of the sewing system 40 in the Auto Sew Mode of operation. Entry into the Auto Sew Mode of operation is obtained from the MENTRY state shown in FIG. 2, wherein the control panel 85 appears as is shown in FIG. 3; or from the SEWSEL state after the completion of a sewing cycle in the Auto Learn or Key Learn Modes of operation. When the control panel 85 appears as is shown in FIG. 3, the sewing system 40 may be placed in the Auto Sew Mode of operation by an operator's touching the Auto Sew touch pad 116. As shown in the Initialization Mode Entry state chart of FIG. 2, the condition of touching the Auto Sew touch pad 116 causes the computer 72 to initiate a routine to initialize search values for style, operation and size according to the Last or Zero option chosen during the Set Up Mode described above. Where the Last option was chosen in the Set Up Mode, the control panel 85 may appear as is shown in FIG. 17, wherein the windows 87-90 of the control panel display a style number most previously used. The computer 72 has illuminated the Auto Sew touch pad 116 and the Style request 169. The computer 72 has also illuminated and made active the Slew touch pads 132-139, the Enter touch pad 130, the Clear Memory touch pad 128 and the Quit touch pad 142. Thereby an operator may increment or decrement the digits displayed in the windows 87-90 of the control panel 85 by touching of the Slew touch control pads 132-139, and may enter the style so displayed by momentarily touching the Enter touch pad 130, or may revert to the MENTRY state by touching the Quit touch pad 142 or may go to the Erase Mode of operation to be described below, by touching the Clear Memory touch pad 128.

By reference to the state chart of FIG. 16A, it is apparent that after touching the Auto Sew touch pad 116 from the MENTRY state of FIG. 2, the sewing system 40 is in the AESTY state. As explained above, a touching of the Enter touch pad 130 is indicated symbolically by STY in the state charts, and cessation of touch is symbolized by $\overline{STY}$. The selection of style, operation, and size is as explained above with, however, an additional state, ANOSTY. wherein the Auto Sew touch pad 116 is caused to blink on and off by the computer 72 to indicate a condition of no such displayed style in the memory of the computer. This state of the sewing system 40 is required to indicate to an operator that there is no data in the memory of the computer 72 corresponding to that specific style which could be used to operate the sewing system 40. Similar states exist for selection of operation (ANOOPR) and for selection of size (ANOSIZ).

Figure 18:
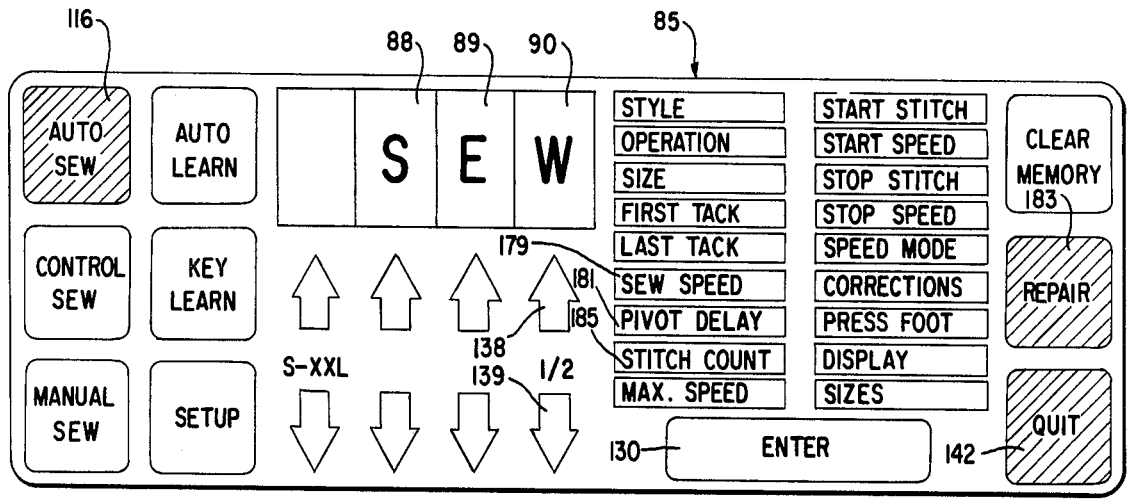
FIG. 18 is an elevation of the control panel while in another state in the Auto Sew mode.

Assuming a desired style, operation and size exist and are recorded in the memory of the computer 72, and have been selected in a process identical to that discussed above for the Auto Learn Mode of operation, the sewing system 40 enters the AVER state. The AVER state may also be entered from SEWSEL shown in FIG. 10 and deriving from the Auto Learn Mode of operation or the Key Learn Mode of operation. The computer 72 initiates a routine searching the memory (library) for an address entry matching the style, operation, and size values and to obtain the backtack values entered during the Auto Learn Mode of operation or the Key Learn Mode of operation. If the Up option for the presser foot 53 had been selected in the Set Up Mode of operation, the computer 72 will also initiate a routine to raise the presser foot to an elevated position. The sewing system 40 is now in the ATACT1 state shown in FIG. 16A. In the ATACT1 state the control panel 85 appears as is shown in FIG. 18 with the windows 88-90 thereof displaying the word "SEW". The computer 72 has illuminated the Auto Sew touch pad 116, and illuminated and made active the Quit touch pad 142 as well as a Repair touch pad 183. The Repair touch pad 183 permits an operator to leave the Automatic Auto Sew Mode and go into a Manual Sewing Mode for complete manual control of all sewing instrumentalities in order to repair or finish an article, and to return to the Auto Sew state from which entry was achieved. The Repair Mode of operation will be more fully described below.

In the ATACT1 state, the foot treadle 65 becomes an ON-OFF switch on forward depression thereof, for operator control of the sewing system 40. Forward depression of the foot treadle 65 places the sewing system 40 under the control of the computer 72 according to information placed in the memory thereof in the Set Up, Auto Learn and Key Learn Modes of operation. By returning the foot treadle 65 to a neutral position, an operator may cease automatic operation of the sewing system 40, to take any required action as will be explained below.

From the ATACT1 state, by placing the foot treadle 65 in a heel condition or by activation of the presser foot switch 77, by means of the knee shift device 80, an operator may raise the presser foot 53 to an elevated state for insertion of a work material. The sewing system 40 is then in the APFUP state shown in FIG. 16A. The presser foot 53 may be lowered by returning the foot treadle 65 to a neutral position or by forward depression thereof, symbolically indicated by $\overline{HEEL}$, or by releasing the presser foot switch 77, symbolized by $\overline{PFTSW}$. With the sewing system in the ATACT1 state shown in FIG. 16A, forward depression of the foot treadle 65 by an operator will cause the computer 72 to initiate routines to lower the presser foot 53, to place the sewing needle 52 in a down position, to search the memory of the computer for the first tack information, to implement the first tack and to obtain information for the next segment from the memory (library). The routine for the first tack activates the sewing system 40 to accomplish the number of first tack stitches requested in either the Auto Learn or the Key Learn Modes of operation described above. This routine also inhibits the high speed of the drive system of the sewing machine 50, two stitches before stitching direction is reversed.

After the first tack is accomplished, the sewing system 40 is in the ASTSEG state shown in FIG. 16B. In the ASTSEG state, the sewing system 40 responds to information stored in the first segment of the memory. For a slow stitch condition, as when coming to a stop, the computer 72 initiates a routine applying a dynamic braking to the drive system of the sewing machine 50, and the sewing system 40 is in the ASLOW state where the speed is limited to approximately 400 RPM. Where the first segment condition is not to apply, as when a second or later segment is being performed, symbolically indicated by $\overline{FSEG}$; or where the start stitches specified in the Set Up Mode have been completed, symbolically indicated by $\overline{STST}$, the computer 72 initiates a routine copying sewing speed (COPY), or running at peak sewing speed (PEAK), and the sewing system 40 is in the ASEW state. Again, as explained above, for a slow stitch condition the computer 72 initiates a routine to dynamically brake the drive system, and the sewing system 40 is again in the ASLOW state. With the condition of a low segment count, i.e., all stitches in this segment have been sewn, the computer 72 initiates a routine setting the needle 52 in a down state and activating the mechanical brake to stop the drive system of the sewing machine 50 there, placing the sewing system in the AEND state shown in FIG. 16C. As explained above, a segment terminates when the presser foot 53 of the sewing machine 50 is elevated to an up condition.

The condition of this not being the last segment of the sewing cycle, symbolized by $\overline{LSEG}$ in FIG. 16C, causes the computer 72 to initiate routines to obtain the pivot delay value from the memory of the computer and to raise the presser foot 53 of the sewing machine 50 to an up position. The sewing system 40 is in the APVDLY state shown in FIG. 16C. The condition of forward depression of the foot treadle 65 of the sewing system 40, and of expiration of the pivot delay time causes the computer 72 to initiate routines to advance the memory thereof to the next memory (library) segment to copy the new speed and number of stitches and to lower the presser foot 53 of the sewing machine 50 to a down state. The sewing system 40 is once again in the ASTSEG state shown in FIG. 16B.

Since this is not the first segment, a condition indicated by $\overline{FSEG}$, the computer 72 will initiate a routine setting the sewing speed to the speed obtained from the memory, and the sewing system 40 will be in the ASEW state shown in FIG. 16B. If in the Auto Learn Mode, the sewing system 40 had been run at a variable speed, the computer 72 will compose pseudo segments of a fixed speed for a certain number of stitches and having a pivot delay time of zero. During the performance of the pseudo segments, the sewing system 40 is in the ASEWPS state shown in FIG. 16B. At the completion of the stitch count for the pseudo segment, the computer 72 initiates routines requesting the next segment and setting the stitch count and the sewing speed at the new values for the next segment. The sewing system 40 reverts to the ASEW state shown in FIG. 16B. If the next segment is a pseudo segment the sewing system 40 reverts once again to the ASEWPS state shown in FIG. 16B. In this fashion a "Copy" of sewing speed in the Auto Learn or Key Learn Modes of operation may be accomplished.

After the completion of the pseudo segments the sewing system 40 reverts to the ASEW state and may pass to the ASLOW state and to the AEND state in preparation for a pivot delay or for the next segment. If there is no next segment, and no stop stitches have been specified in the Set Up Mode described above, these conditions causes the computer 72 to initiate routines implementing the last tack, a mechanical braking of the drive system of the sewing machine 50, a trim operation, and a raising of the presser foot 53 of the sewing machine. The sewing system 40 is now in the AWNTL state and will revert to the ATACT1 state in readiness for another automatic sewing cycle.

Where stop stitches have been specified in the Set Up Mode described above, this condition causes the sewing system 40 in the ASEW state to initiate routines dynamically braking the drive system of the sewing machine 50 to the stop speed specified in the Set Up Mode of operation for accomplishment of the stop stitches. The sewing machine then reverts to the AMAN state in FIG. 16C when the number of stop stitches specified in the Set Up Mode of operation are accomplished. If the foot treadle 65 of the sewing system 40 is placed in a neutral position, symbolically indicated by NTL, the computer 72 initiates routines dynamically braking the drive system of the sewing machine 50 to a speed of approximately 400 RPM, and the sewing system is in the AMANSP state shown in FIG. 16C. Where the number of stop stitches specified in the Set Up Mode described above have not been accomplished, forward depression of the foot treadle 65 will cause the computer 72 to initiate a routine to have the drive system for the sewing machine 50 operate at the stop speed specified in the Set Up Mode of operation until the number of stop stitches specified in that Mode of operation is completed. Continued non-actuation of the foot treadle 65 (NTL) when the sewing system 40 is in the AMANSP state shown in FIG. 16C, will cause the computer 72 to initiate routines to mechanically brake the drive system of the sewing machine 50 with the sewing needle 52 thereof in a down position. The sewing system 40 is in the AEND state shown in FIG. 16C, and will progress to the AWNTL state and the ATACT1 state, as described above, in preparation for another sewing cycle.

Where a last segment has been stitched, representing the completion of a stitching cycle on, for example, a pocket, it may be that the number of stitches required in the last segment is different than that required during the Auto Learn Mode of operation. In order to permit an operator to vary the number of stitches specified in a last segment, the computer 72 of the sewing system 40 in the ATACT1 state, will illuminate a Stitch Count request 185 in the control panel 85, requesting of an operator modifications to the stitch count displayed in windows 89-90 of the control panel, by suitable touching of the Slew touch pads 138, 139 which are illuminated and made active by the computer. The sewing system 40 is in the ALSEG state shown in FIG. 16A. If the stitch count displayed in the windows 89-90 of the control panel 85 are satisfactory, the sewing system 40 may revert to the ATACT1 state by forward depression or heeling of the foot treadle 65, or by actuation of the presser foot switch 77, through the knee shift device 80. If the stitch count displayed in the windows 89-90 of the control panel 85 is to be modified the digits displayed may be incremented or decremented by touching of the Slew touch pads 138, 139, and the new digits displayed may be entered by touching of the Enter touch pad 130. The sewing system 40 is in the AMODST state shown in FIG. 16A, and will revert to the Repair Mode of operation to be described below, by an operators touching the Repair touch pad 183. Alternatively, an operator may enter the Repair Mode of operation from the ALSEG state without modification of the stitch count.

Referring once again to FIG. 16B, it will be noted that there is a APAUS1 state which may be reached from the ASTSEG, ASEW, ASEWPS states whenever the foot treadle 65 is returned to a neutral position. The sewing system 40 in the Auto Sew Mode is under the ultimate control of the operator, who, by placing the foot treadle 65 in a neutral position causes the computer 72 to initiate routines dynamically braking the drive system of the sewing machine 50 to an approximate speed of 400 RPM and mechanically braking the drive system with the sewing needle 52 in a down position. In the APAUS1 state, the computer 72 requests, by illumination of Sew Speed request 179, whether the operator desires to change the sew speed. Where the No Correction option was selected during the Set Up Mode of operation described above, the Sew speed request 179 is not illuminated and the sewing system 40 reverts immediately to the APS1N state shown in FIG. 16B; and, on forward depression of the foot treadle 65, will revert to the ASTSEG state.

In the APAUS1 state, an operator may, if desired and if corrections are permitted, vary the digits displayed in the windows 89-90 of the control panel 85, by touching of Slew touch pads 138, 139 to increment or decrement the digits thus displayed. The digits displayed in the windows 89-90 of the control panel 85 are entered into the memory of the computer 72 by forward depression of the foot treadle 65 which causes the computer to initiate a routine modifying the speed in the memory. The sewing machine is again in the ASTSEG state shown in FIG. 16B. If the sew speed displayed in the windows 89-90 of the control panel 85 is modified, but this information is entered into the memory of the computer 72 by an operators touching the Enter touch pad 130 instead of by forward depression of the foot treadle 65, the computer initiates a routine modifying the sew speed in the memory, and places the sewing system 40 in the APS1S state shown in FIG. 16C. In the APS1S state the Pivot Delay request 181 is illuminated by the computer 72, and Slew touch pads 138, 139 are illuminated and made active, thereby to permit an operator to vary the displayed pivot delay time. An altered pivot delay time is entered into the memory of the computer 72 by actuation of the foot treadle 65, and the sewing system 40 is once again in the ASTSEG state. In the APAUS1, APS1N, and APS1S states shown in FIGS. 16B and C, the needle-up positioning switch 70, jog switch 68 and presser foot elevating switch 77 may be actuated to accomplish the various component operations as described above. Also, from these states a heel condition of the foot treadle will terminate the sewing cycle and place the sewing system 40 in the AWNTL state in FIG. 16C. If, in the Set Up Mode of operation, the PEAK speed mode had been selected, the peak speed is proportioned according to the increase or decrease in the digits displayed, limited by the maximum speed specified in the Set Up Mode. If the COPY speed mode had been selected, the speed for the particular pseudo segment in which the APAUS1 state was entered is proportioned.

From the APVDLY state shown in FIG. 16C and described above, non-actuation of the foot treadle 65 (NTL) will place the sewing system 40 in the APS2 state. Where the No Corrections option was selected in the Set Up Mode described above, the sewing system 40 reverts immediately to the APS2N state. However, where the YES option to Corrections was selected the sewing system 40 remains in the APS2 state, wherein windows 89-90 of the control panel 85 would indicate the present stitch count, and the Slew touch pads 138, 139 are illuminated and made active by the computer 72 to permit an operator to modify the stitch count. From the APS2 state the jog switch 68, needle-up positioning switch 70 and presser foot switch 77 may all be actuated as described above. Where the stitch count is modified and entered by an operator touching Enter touch pad 130, the computer 72 initiates a routine to modify the count in the memory of the computer, and the sewing system 40 is in the APS2N state of FIG. 16C. In the APS2N state the jog switch 68, needle-up positioning switch 70 and presser foot elevating switch 77 may be actuated as described above. Upon forward depression of the foot treadle 65 in the APS2N state the computer 72 initiates routines requesting the next segment and lowering the presser foot 53 to a down position. The sewing system is then in the ASTSEG state. Where the sewing system 40 is in the APS2 state and the stitch count is modified, actuation of the foot treadle 65 will initiate routines in the computer 72 to modify the stitch count in the memory, to request the next segment and to lower the presser foot 53 to a down position, and the sewing system 40 will be in the ASTSEG state. A heel condition of the foot treadle 65 in the APS2 and APS2N states will terminate the sewing cycle, and the sewing system 40 reverts to the AWNTL state in FIG. 16C.

Thus in the Auto Sew Mode of operation, an entire automatic cycle of sewing operations is possible including first tack and start stitches at specified speeds, sewing segments terminating in a specific pivot delay with the presser foot 53 elevated and the sewing needle 52 in a down position in the work material to permit an operator to establish a new stitching direction, and provision for stop stitches in last segment and a last tack terminating in a trim operation for the stitching threads. Provision has also been made enabling an operator to modify the stitch count in any segment, and in the last segment so that succeeding sewing cycles may be more accurately made. While in the Auto Sew Mode, operator flexibility is retained by permitting the foot treadle 65 to be used to temporarily cease operations. While the foot treadle 65 is in the neutral position an operator may raise the presser foot 53 or the needle 52 to an up position, or may lay single stitch or go into a Repair Mode of operation, or in an appropriate circumstance may lay a single stitch. In the APAUS1 state, which is obtainable by a neutral position of the foot treadle 65 from the sewing states, sew speed may be modified if corrections were permitted in the Set Up Mode of operation. Entry of a new sewing speed is most readily accommodated in the APAUS1 state by forward depression of the foot treadle which also returns the sewing system 40 to a sewing state. If, however, an operator desires to vary the pivot delay time, entry of a modified sewing speed may be accommodated by touching the Enter touch pad 130, which places the sewing system 40 in the APS1S state, wherein pivot delay time may be varied. Thus, where modifications are permitted, they can be made in the most natural way with ready and obvious reentry to a sewing state.

CONTROL SEW MODE OF OPERATION

Figure 19A:
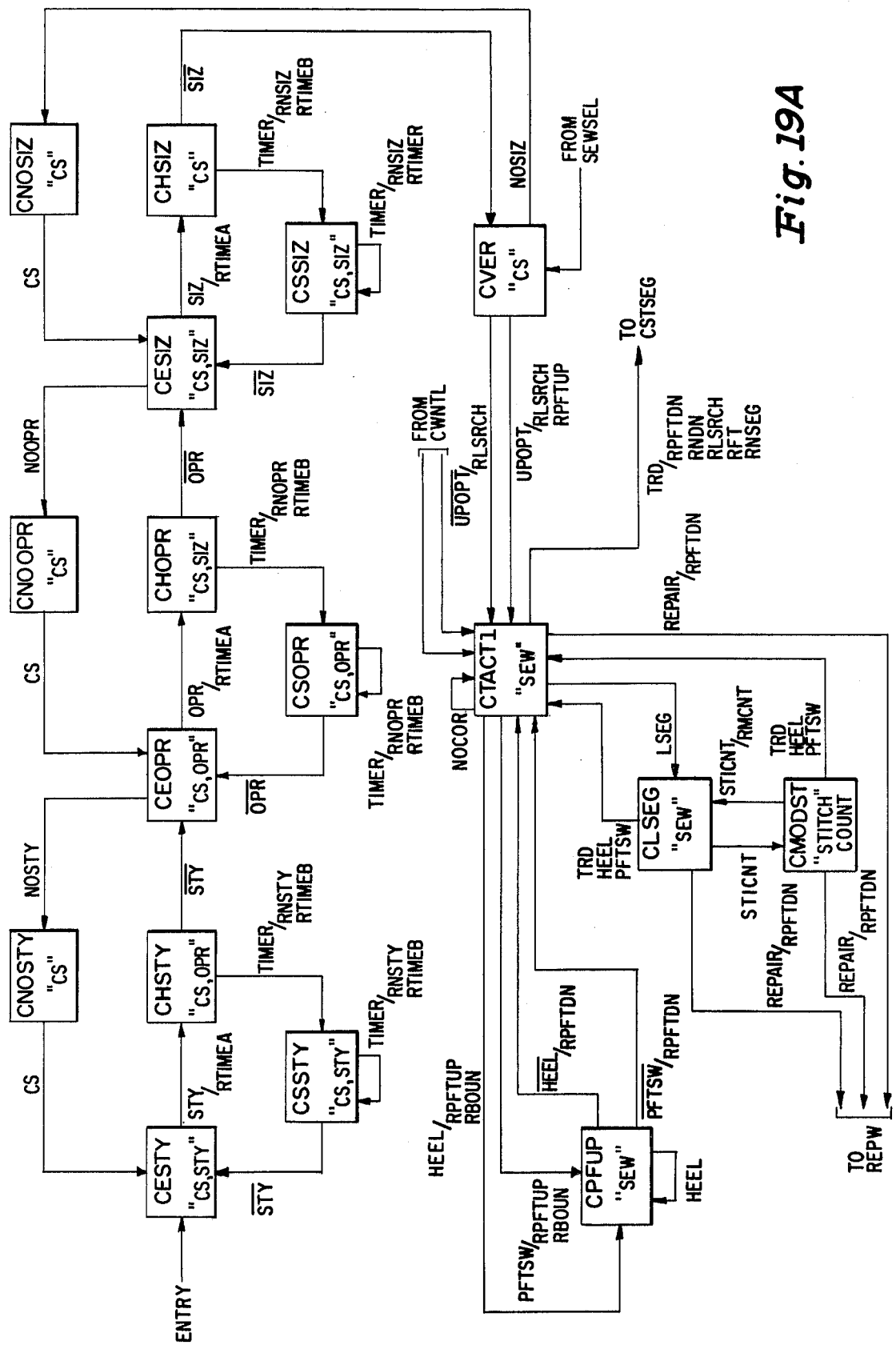
FIG. 19A–C is a state chart of the sewing system in the Control Sew mode.
Figure 19B:
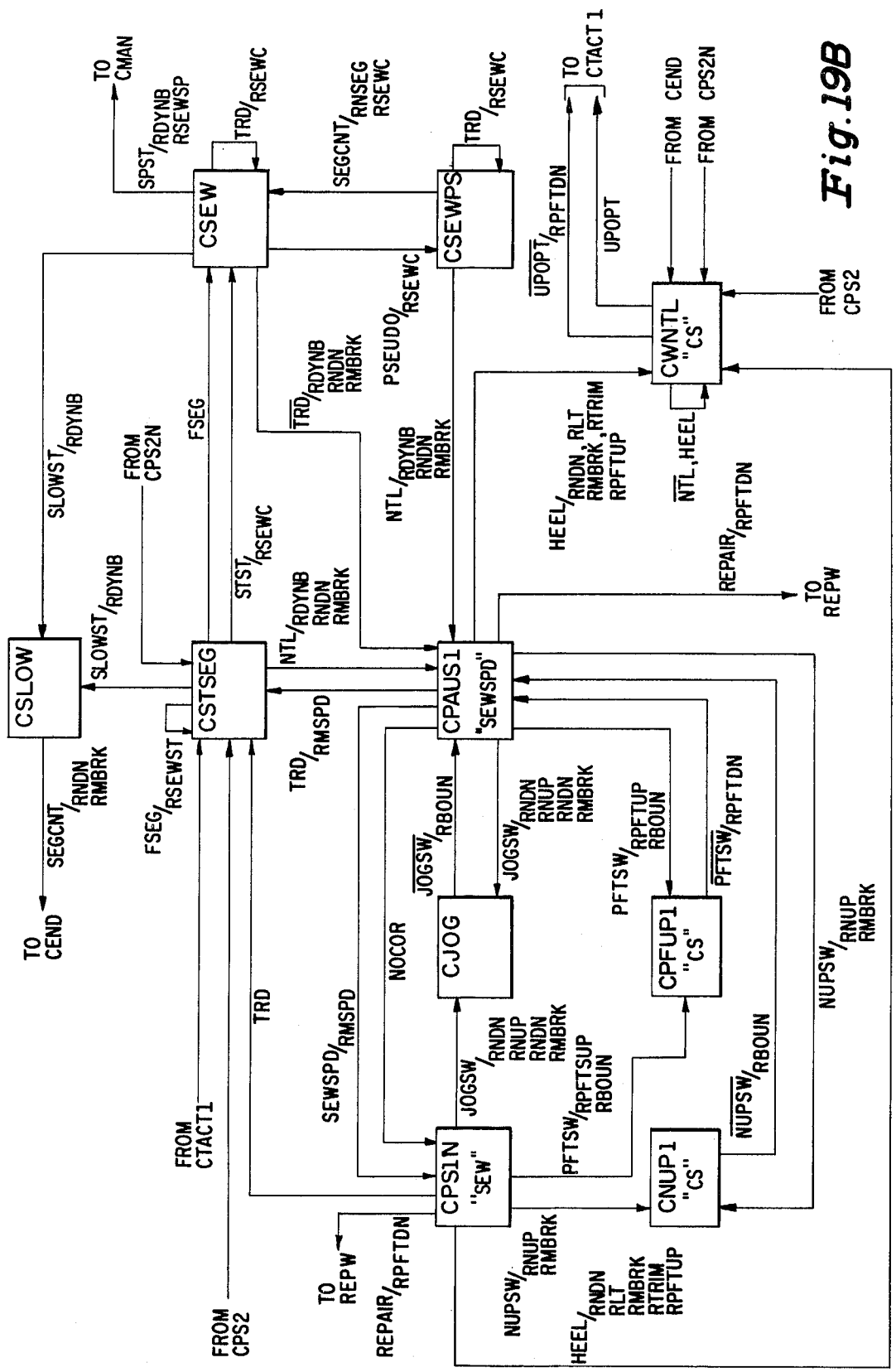
Figure 19C:
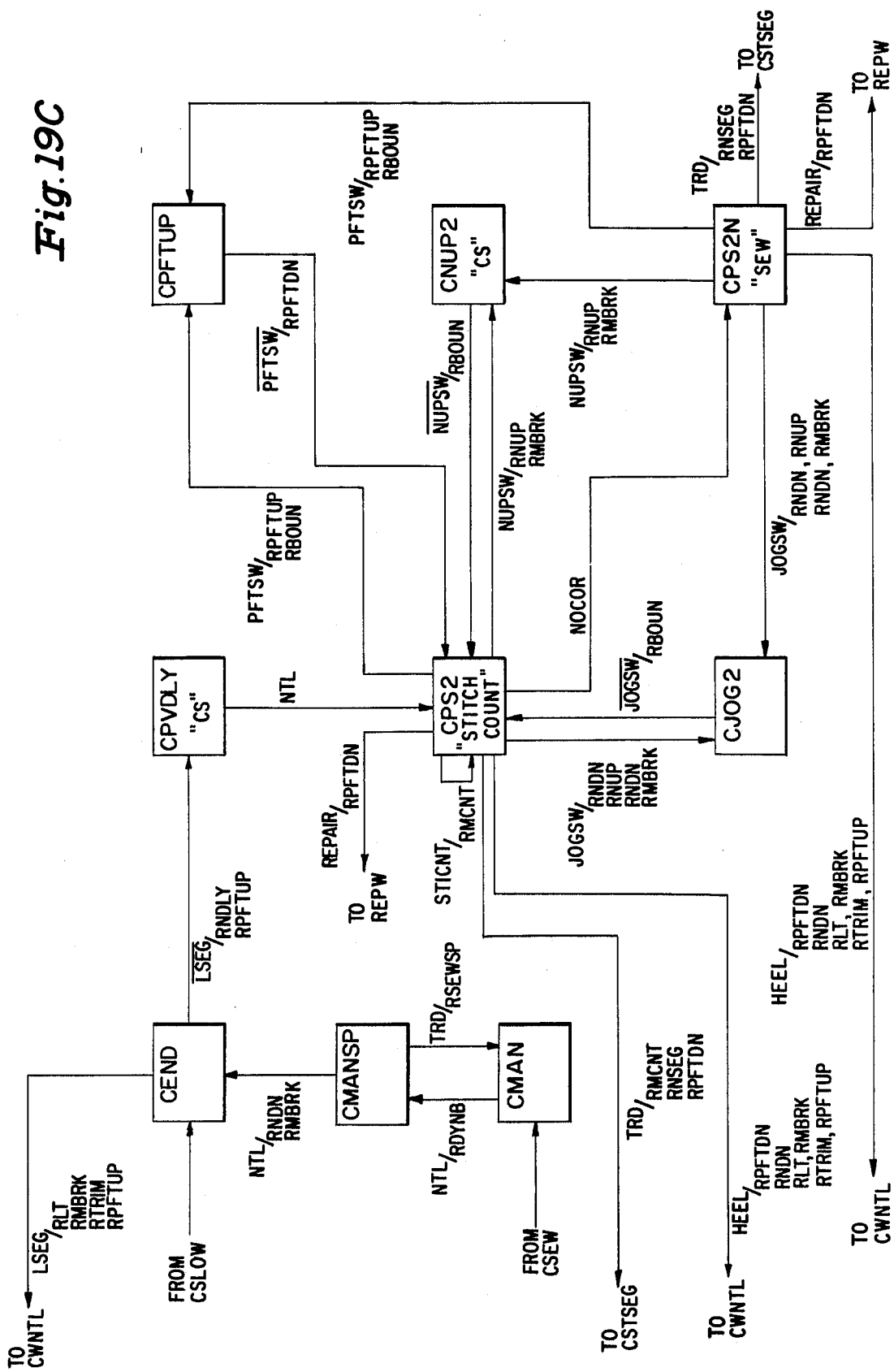

In FIGS. 19A–C are shown the state charts for the Control Sew Mode of operation. In the Control Sew Mode of operation the speed of the sewing machine 50, up to the maximum learned in any segment is controlled by an operator depending on how far the foot treadle 65 is depressed. Also, at a pivot, the sewing machine 50 automatically stops. An operator must return the foot treadle 65 to a neutral position and depress it for the machine to start on the next segment. The neutral condition of the foot treadle 65 will, as in the Auto Sew Mode, stop all automatic operation of the sewing system 40 for operator control thereof.

Figure 20:
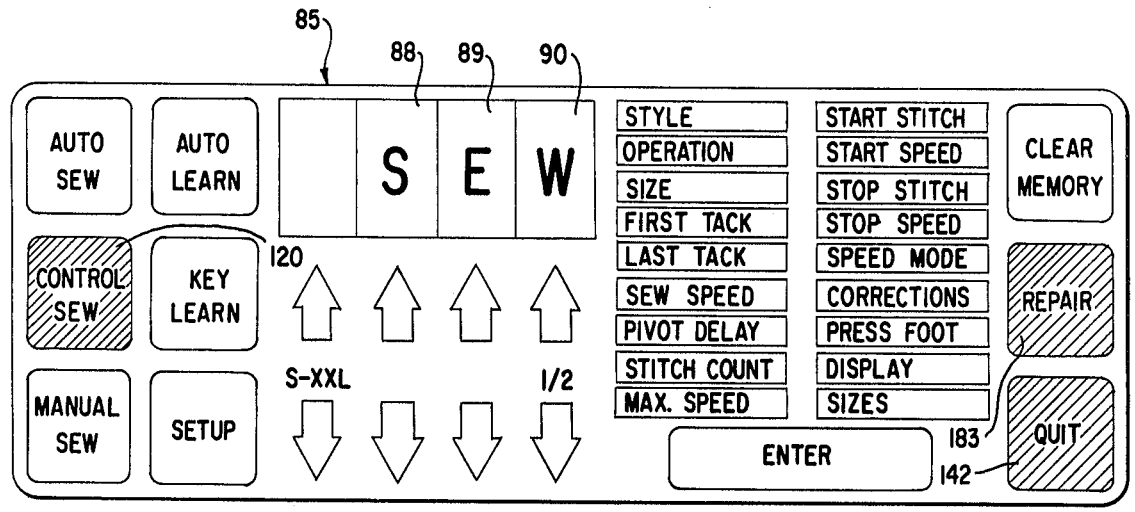
FIG. 20 is an elevation of the control panel while in the Control Sew mode.

The state charts for the Control Sew Mode of operation reflect these variations from the Auto Sew Mode of operation. Thus in FIG. 19B, with the sewing system 40 in the CSTSEG state where on the condition of start stitches having been specified in the Set Up Mode of operation described above, the computer 72 initiates a routine to read the position of the foot treadle 65 for control of the speed of the drive system of the sewing machine 50 which is limited by the maximum speed value and the recorded sewing speed value. Similar routines are initiated by the computer 72 in the CSEW state and in the CSEWPS state for effecting pseudo segments. It will be noted in FIG. 19C that there is no state corresponding to the APS1S state of FIG. 16C, described above, wherein an operator could specify new pivot delay times. Since in the Control Sew Mode of operation, the sewing machine 50 stops at a pivot point and further operator action is required to reinitiate stitching, the pivot delay period is already under operator control. Thus in the Control Sew Mode of operation additional control is given to an operator, over the Auto Sew Mode of operation, of the speed at which the sewing machine 50 operates. Otherwise, the sewing system 40 operates quite similarly to the Auto Sew Mode in the Control Sew Mode. In FIG. 20 is shown an elevation of the control panel 85 with the sewing system 40 in the CTACT1 state of FIG. 19A.

CLEAR MEMORY MODE OF OPERATION

Figure 21:
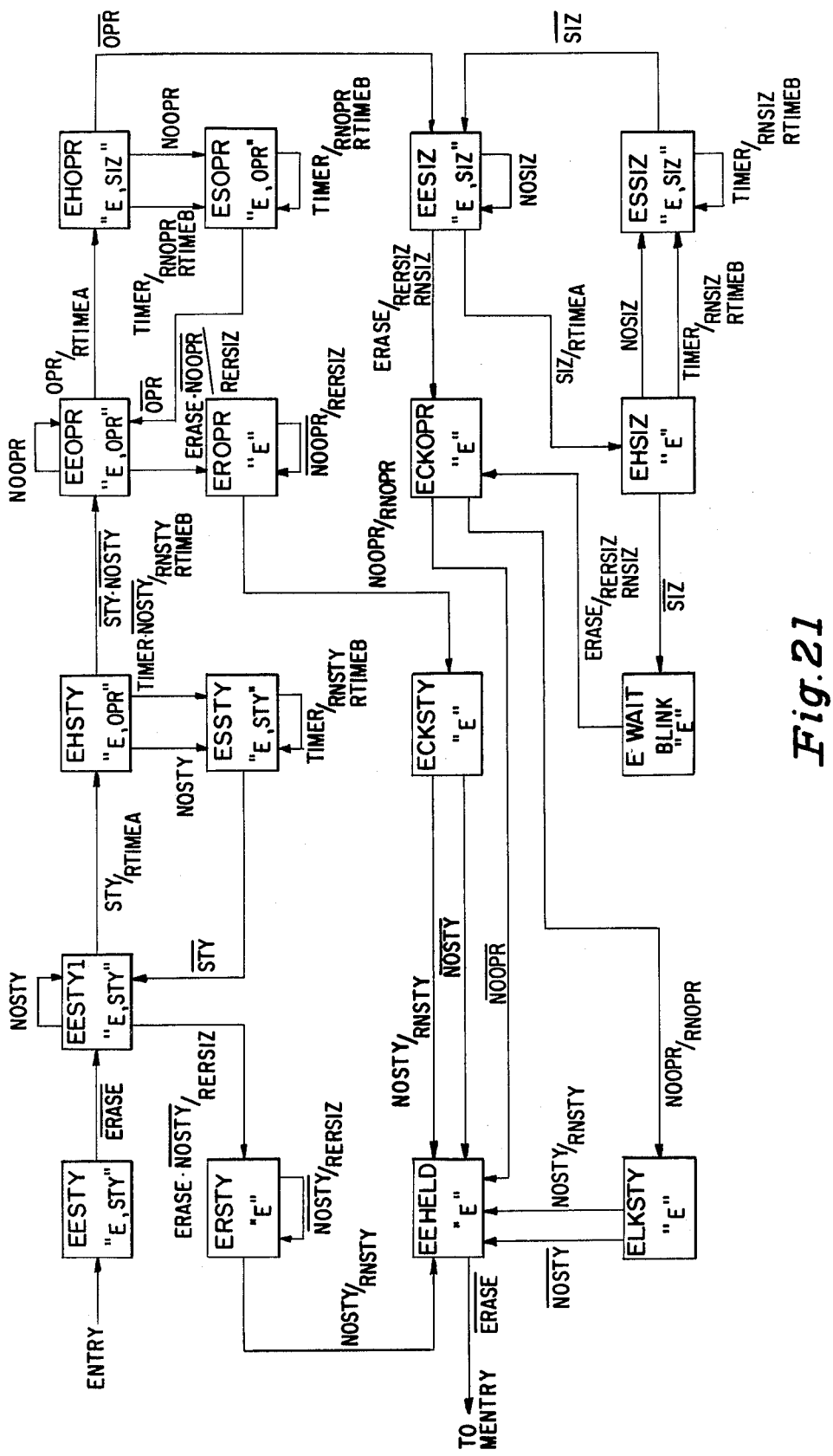
FIG. 21 is a state chart of the sewing system in the Clear Memory or Erase mode.

In FIG. 21 is shown a state chart of the sewing system 40 in the Clear Memory or Erase Mode. Entry to the Erase Mode of operation is achieved from the MENTRY state of FIG. 2, by touching the Clear Memory touch pad 128 of the control panel 85 shown in FIG. 3. The necessity for entering the Erase Mode of operation is indicated by the LEARNE state of FIG. 9, the state to which the sewing system 40 reverts for a MEMFUL condition or a TOOFUL condition. The MEMFUL condition exists when there is no room in the memory of the computer 72 for another program. A TOOFUL condition exists when the memory of the computer 72 has insufficient room to store another segment. A MEMFUL condition or TOOFUL condition may exist during the Auto Learn or the Key Learn Modes of operation, and these conditions are shown in the state charts of FIGS. 8 and 14. In the LEARNE state the control panel 85 displays in the windows 87-90 thereof the word FULL. The Clear Memory touch pad 128 is illuminated and made active, and a buzzer is activated to give audible indication of this state. Entry to the Erase Mode of operation is achieved by touching the Clear Memory touch pad 128 in either the MENTRY state or the LEARNE state, and the control panel appears as is shown in FIG. 11 except that the Clear Memory touch pad 128 is illuminated in place of the Auto Learn touch pad 118. Clearing of the memory of the computer 72 may be obtained in a hierarchy, that is, if a particular style is erased all operations and sizes existing in the memory under that style will be erased. In FIG. 21, when an operators finger is removed from the Clear Memory touch pad 128 in the initial selection of the Clear Memory or Erase Mode of operation, the sewing system 40 is in the EESTY1 state, where the last style used by the operator may be displayed in the windows 87-90 of the control panel 85. If the operator desires to erase that style and all operations and sizes thereunder, the condition of a touching of the Clear Memory touch pad 128 by an operator, will cause the computer 72 to initiate a routine to erase from the memory of the computer all operations and sizes under that style number. The sewing system 40 is in the ERSTY state shown in FIG. 21, where the condition of there being patterns in the memory having the specified style, symbolized by NOSTY, will reinitiate the erase command until all operations and sizes under that style are erased. The sewing system 40 will then be in the EEHELD state and will revert to the MENTRY state only after an operators finger is removed from the Clear Memory touch pad 128. The condition of no pattern in the memory having the specified style (NOSTY) causes the computer 72 to initiate a routine to search the memory for the next style in the EESTY state.

Selection of a particular style, operation or size to be cleared from the memory of the computer 72, proceeds as described above in the Auto Learn Mode of operation. Thus, an operator may continuously touch the Enter touch pad 130 in order to scan the memory of the computer 72 for all available styles therein. The condition of an operators touching of the Enter touch pad 130 (STY) causes the computer 72 to initiate a routine setting a timer for a one second period. The sewing system 40 is in the EHSTY state, and the conditions of the expiration of the one second period (TIMER) and presence of pattern information in the memory of the computer 72 (NOSTY) causes the computer to initiate routines to search the memory for the next style and display for half second intervals. The sewing system 40 is in the ESSTY state shown in FIG. 21. The sewing system 40 will also revert to the ESSTY state if an attempt was made to further specify an operation for a style having no pattern present in the memory (NOSTY). In the ESSTY state the computer 72 displays in the windows 87-90 of the control panel 85 those styles that are present in the memory, in half second intervals. Where an operator removes her finger from the Enter touch pad 130, a condition symbolized by STY, the sewing system 40 reverts to the EESTY1 state, wherein the windows 87-90 of the control panel 85 display the last style scanned. If an operator then touches the Enter touch pad 130 momentarily, a condition symbolized by STY, .NOSTY, the sewing system passes into the EEOPR state wherein an operator may, in a similar fashion as explained above, erase in a hierarchy all sizes under the style previously displayed and the operation presently displayed. With the sewing system 40 in the EEOPR state, the conditions of a touching of the Clear Memory touch pad 128 and the presence of a pattern in the memory having the specified style and operation will cause the computer 72 to initiate a routine to erase all sizes having that style and operation address. The sewing system 40 is in the EROPR state shown in FIG. 21. On the condition that no pattern is present in the memory having the specified style and operation address, the sewing system 40 reverts to the ECKSTY state shown in FIG. 21. In the ECKSTY state the computer 72 checks the memory thereof for further styles. The sewing system 40 then reverts to the EEHELD state, and will revert to the MENTRY state when an operator discontinues touching the Clear Memory touch pad 128.

Where a style and operation has been selected and a size is displayed in the windows 87-90 of the control panel 85, a touching of the Clear Memory touch pad 128 will erase the particular size displayed for the style and operation specified, and the sewing system 40 will revert to the ECKOPR state shown in FIG. 21. If further operations exist in the memory for the specified style, symbolically indicated by NOOPR, the sewing system 40 will revert to the EEHELD state. Where no further operations exist for the specified style, the sewing system 40 will revert to the ELKSTY state where the computer 72 will search for more styles. The sewing system then reverts to the EEHELD state shown in FIG. 21, and will revert to the MENTRY state when an operator ceases touching the Clear Memory touch pad 128.

REPAIR MODE OF OPERATION

Figure 22:
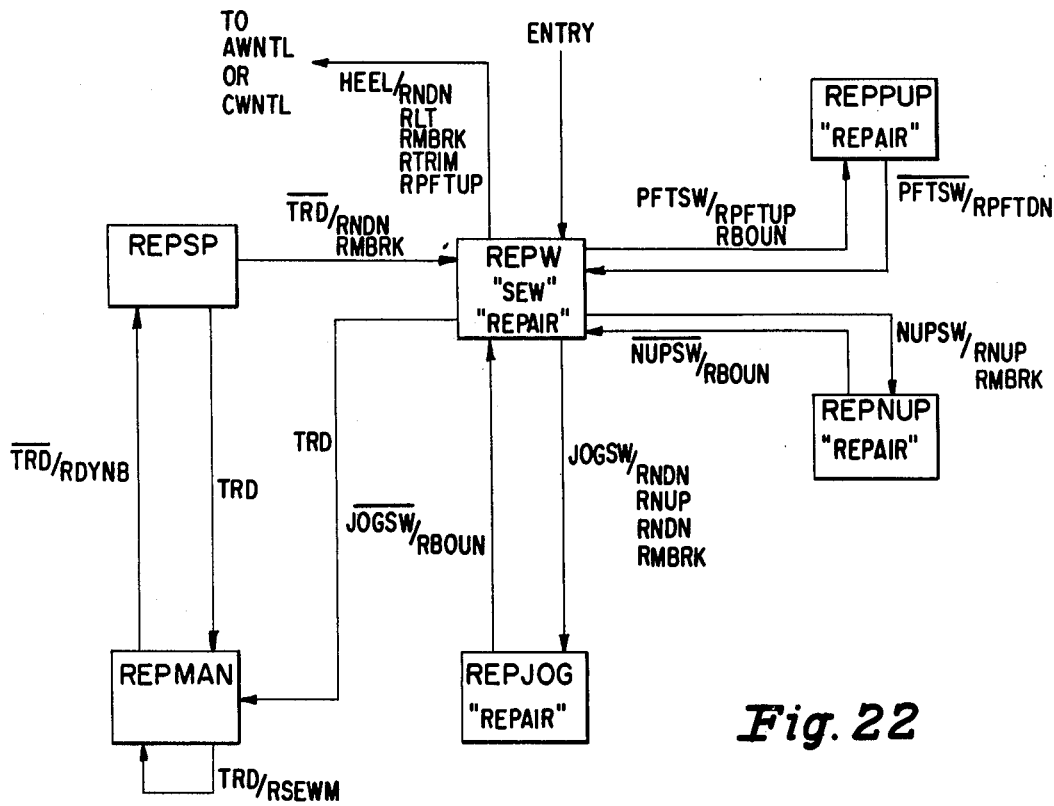
FIG. 22 is a state chart of the sewing machine in the Repair mode.
Figure 23:
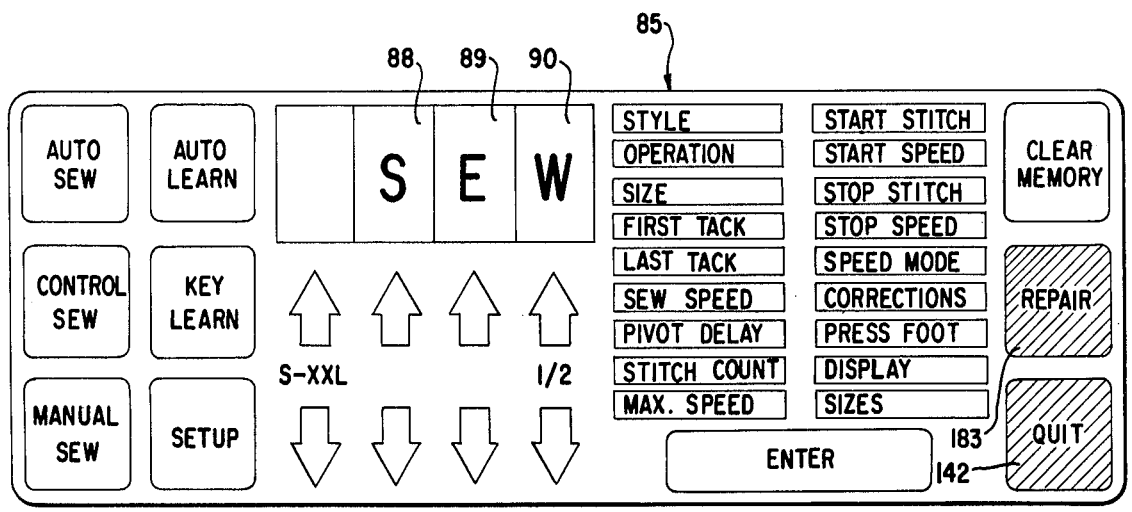
FIG. 23 is an elevation of the control panel with the sewing system in the Repair mode indicating those portions thereof which are active.

In FIG. 22 there is shown a state chart for the sewing system 40 in the Repair Mode of operation. Entry to the Repair Mode of operation is from the Auto Sew or Control Sew Modes of operation, whenever the Repair touch pad 183 is illuminated and made active by the computer 72. In general, the Repair touch pad 183 is illuminated and made active and the Repair Mode is accessible at the start and at the end of every segment. The possibility of entering the Repair Mode of operation provides an operator with the flexibility required to perform a repair operation prior to automatic stitching, or to repair a seam inappropriately stitched due to, for example, thread run out or breakage. Thus, where an operator touches the Repair touch pad 183 at, for example, the end of a segment, the sewing system 40 enters the REPW state shown in FIG. 22. The control panel 85 appears as is shown in FIG. 23 with the windows 88-90 of the control panel displaying the work SEW, the Repair touch pad 183 illuminated and the Quit touch pad 142 illuminated and made active by the computer 72 to permit reversion to the MEMTRY state. From the REPW state, an operator may actuate the jog switch 68 for a stitch by stitch repair, actuate the needle-up positioning switch 70, and actuate the presser foot elevating switch 77, by manipulation of the knee shift device 80. By actuation of the foot treadle 65, the sewing system 40 enters the REPMAN state and may be operated as a manual machine. The condition of no forward depression of the foot treadle 65, symbolically indicated by TRD, causes the computer 72 to initiate a routine dynamically braking the drive system of the sewing machine 50, and the sewing system enters the REPSP state. This condition continued (TRD), causes the computer 72 to initiate routines mechanically braking the drive system of the sewing machine 50 with the needle 52 thereof in a down position through a work material. If the foot treadle 65 is placed in a heel condition, the computer 72 initiates routines to perform a last tack, mechanically brake the drive system of the sewing machine 50, trim the sewing threads and raise the presser foot 53 to an elevated position. The sewing system 40 reverts to the AWNTL state or to the CWNTL state in either the Auto Sew or Control Sew Modes of operation, respectively, from which it came. On further actuation of the foot treadle 65, the sewing system 40 will proceed with the next segment as though the repair operation had not taken place.

The operation and features of the sewing machine system described hereinabove are achieved by the use of the programmed computer 72, the control panel 85 and the sewing machine 50 which are electrically interconnected in a manner as illustrated in FIG. 24. As illustrated, the computer 72 receives various electrical signals representative of various sewing machine component operations from the sewing machine 50 on terminals C1 - C11 and C16, the sewing machine receives various electrical signals for controlling various sewing machine component operations from the computer on terminals S1 - S14, the computer receives various sewing control signals from the control panel 85 on the terminals C12 - C15 and the control panel receives various electrical display and illuminates signals from the computer on terminals CP1 – CP5 and input and output control signals on terminals CP6 and CP7, respectively.

A signal appears on terminal C1 of the computer 72 whenever the sewing machine 50 exceeds a predetermined tilt angle or whenever the temperature of the sewing machine drive motor of the drive system exceeds a predetermined temperature. The signal on the terminal C1 is derived from a mercury switch (not shown) fixedly mounted within the sewing machine 50 for detecting the physical position thereof and, when present, prevents the sewing machine from being actuated, such as when repairs are being made and the like. The signal on terminal C1 is also derived from a thermocouple (not shown) mounted on the drive motor of the drive system to provide a signal which, when present, disables the sewing machine 50 when the drive motor becomes overheated. A signal appears on the terminal C2 of the computer 72 whenever the sewing needle is in a down position. These signals are derived in a well known manner by a pair of slotted discs (not shown) mounted on the drive shaft of the sewing machine 50 which causes a light path between a light source and a light detector to be uninterrupted when the sewing needle 52 is in the up and down position, respectively. The signal appearing on the terminal C4 of the computer 72 indicates the speed of the sewing machine drive motor and comprises a series of pulses that are derived from a slotted disc (not shown) mounted on the drive shaft of the sewing machine 50 and which interrupts a light beam (not shown) in a well known manner. In one embodiment of the present invention which was constructed, these pulses were utilized by the computer 72 when the sewing machine 50 was being stopped to determine when the sewing speed had decreased to the point where dynamic braking was disabled with subsequent activation of mechanical braking. A signal appears on terminal C5 of the computer 72 whenever any one, or more, of the three phases of input power to the sewing machine 50 is lost and, when present, results in the sewing machine being disabled. The signal is obtained by comparing a reference level with the average level of rectified voltage obtained from the three phase power source. As long as all three phases are present, the rectified level average exceeds the reference level and no signal appears on terminal C5. However, if one or more phases are lost, the average rectified level falls below the reference level thereby providing a signal at terminal C5 that results in the sewing machine 50 being turned off. A signal appears on the terminal C6 of the computer 72 whenever the needle-up positioning switch 70 is actuated and results in rotation of the drive shaft of the sewing machine 50 until the sewing needle 52 is in its up position which, as described above, is indicated by a signal at terminal C2. A signal appears on terminal C7 of the computer 72 whenever the presser foot elevating switch 77 is actuated and results in the presser foot 53 being raised. A signal appearing on terminal C11 due to operator actuation of the jog switch 68 causes the sewing maching to sew one stitch. A three position switch (not shown) is coupled to the sewing machine foot treadle 65 and provides a signal on terminal C8 of the computer 72 whenever the foot treadle is actuated into a forward sewing position, provides a signal on terminal C9 whenever the foot treadle is in the neutral position and provides a signal on terminal C10 whenever the foot treadle is heeled. Also coupled to the foot treadle 65 is the potentiometer 402 having wiper arm 408. Operating potential across the potentiometer 402 can be supplied from terminals C17 and C18 of the computer 72. As the foot treadle 65 is actuated during a sewing operation, the wiper arm 408 is moved by movement of the foot treadle to provide a DC voltage level on terminal C16 that is proportional to the sewing speed. The computer 72 contains conversion means 404 therein to convert the analog signal appearing on terminal C16 into digital signals which are stored within the computer in a manner as described above, as pseudo segments.

Whenever a thread trim and wipe operation is to be performed; either as a result of an operator heeling the foot treadle 65 or as a result of a stored program in the computer 72, three signals are simultaneously provided on terminals S1, S2 and S3 of the sewing machine 50 by the computer. The signal on terminal S1 actuates the sewing machine 50 thread trimmer, the signal on the terminal S2 actuates the sewing machine thread tension release solenoid and the signal on terminal S3 actuates the wiper thread mechanism, to perform a complete thread trim operation.

The sewing machine 50 is stopped by first dynamically braking the drive system to a speed of about 400 RPM followed by mechanical braking. The computer 72 provides a signal on terminal S6 of the sewing machine 50 to initiate dynamic braking of the drive system. Once the speed of the drive system is reduced sufficiently (as described above, the computer utilizes the pulses appearing on terminal C4 to determine drive motor speed), a signal appears on terminal S5 to disable dynamic braking after which a signal appears on the terminal S4 to actuate mechanical braking of the drive motor to completely stop the drive system.

A signal on terminal S7 of the sewing machine 50 from the computer 72 provides a drive motor control signal to result in a fixed sewing speed of about 400 stitches per minute, i.e., the position sewing speed. As long as this inhibit signal is present on terminal S7, operation of the foot treadle 65 has no effect on sewing speed. A signal on terminal S9 causes the direction of motion of the material being sewn to move toward the operator (reverse feed), whereas a signal on terminal S10 causes the direction of motion of the material being sewn to move away from the operator (forward feed). A signal appearing on terminal S11 causes the sewing machine 50 presser foot 53 to be raised. A signal appearing on terminal S12 provides a drive motor control signal that causes the sewing machine 50 to sew at a fixed rate of about 1000 stitches per minute. A signal appearing on terminal S13 provides a drive motor control signal that limits the sewing speed to the rate set as the maximum sewing speed of the sewing machine 50 in the Set Up Mode of operation described above.

Whenever a signal appears on the terminal S8, the sewing speed can be controlled by operator actuation of the foot treadle 65 in the Manual Mode of operation. This results in an analog signal having a level that is proportional to the desired speed appearing on terminal S14, after being derived from the potentiometer 402. In an Automatic Sew Mode of operation, the analog signal level appearing on terminal S14 can be derived from the pseudo segment digital speed values, described hereinabove, which are stored in the computer 72. Conversion means 406 convert these stored digital signals into an analog voltage. As described hereinabove, the stored digital signals may correspond directly to the speed profile of the operator or the speed of the pseudo segments may be increased or decreased by way of the control panel 85.

The control panel 85 includes, as described above, a plurality of touch pads that are manually actuated. Actuation of any of these touch pads results in a four bit binary signal, that identifies the actuated touch pad, being coupled from the control panel 85 to terminals C12, C13, C14, and C15, respectively, on the computer 72. The transfer of such data from the control panel 85 to the computer 72 can only take place if an enable out signal from the computer appears on control panel terminal CP7. Circuit means for deriving a milti bit binary coded signal that identifies an actuated one of a plurality of touch pads is fully disclosed in copending application Ser. No. 732,228 entitled CHARGE RATE CAPACITIVE SWITCH SYSTEM, filed Oct. 14, 1976 and assigned to the assignee of the present invention. The disclosure of this patent application is incorporated herein by reference.

As described hereinabove, the control panel 85 includes display means as well as means for selectively back illuminating portions of the control panel. Signals for actuating various segments of the display and the illuminating means are provided by the computer 72 to terminals CP1, CP2, CP3, CP4 and CP5 of the control panel. These signals have no effect on the display means or the illuminating means unless an enable signal is present on terminal CP6 from the computer 72. Control and actuation circuit means for a segmented display, alphabetic or numeric, and back illuminating means are well know in the art and need not be described herein for a complete and detailed description of the present invention.

As will be apparent to those skilled in the art, the signals discussed above may include a positive or negative voltage level as well as the absence of a voltage i.e., ground potential. Additionally, a common ground connection (not shown) couples the sewing machine 50, the computer 72 and the control panel 85. As is now apparent to those skilled in the art, the signals generated by the computer 72 and appearing on terminals S1 – S14 are generated in response to manual operation of the sewing machine 50 or in response to a sewing pattern stored in the computer 72.

Figure 26:
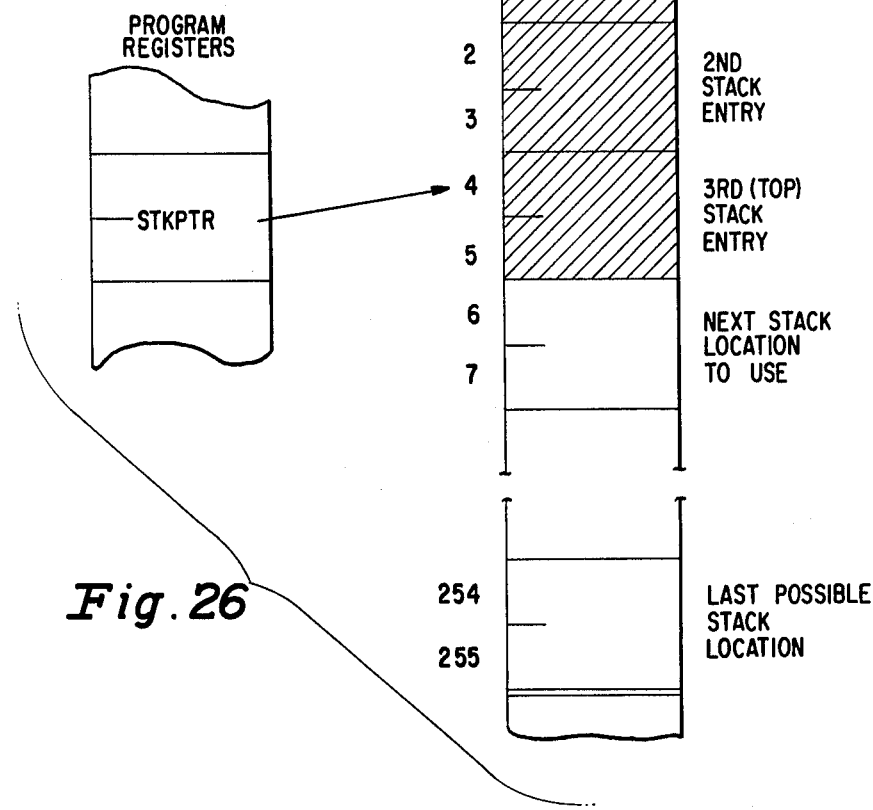
FIG. 26 is a representation in block form of the stack structure of the program registers.
Figure 27:
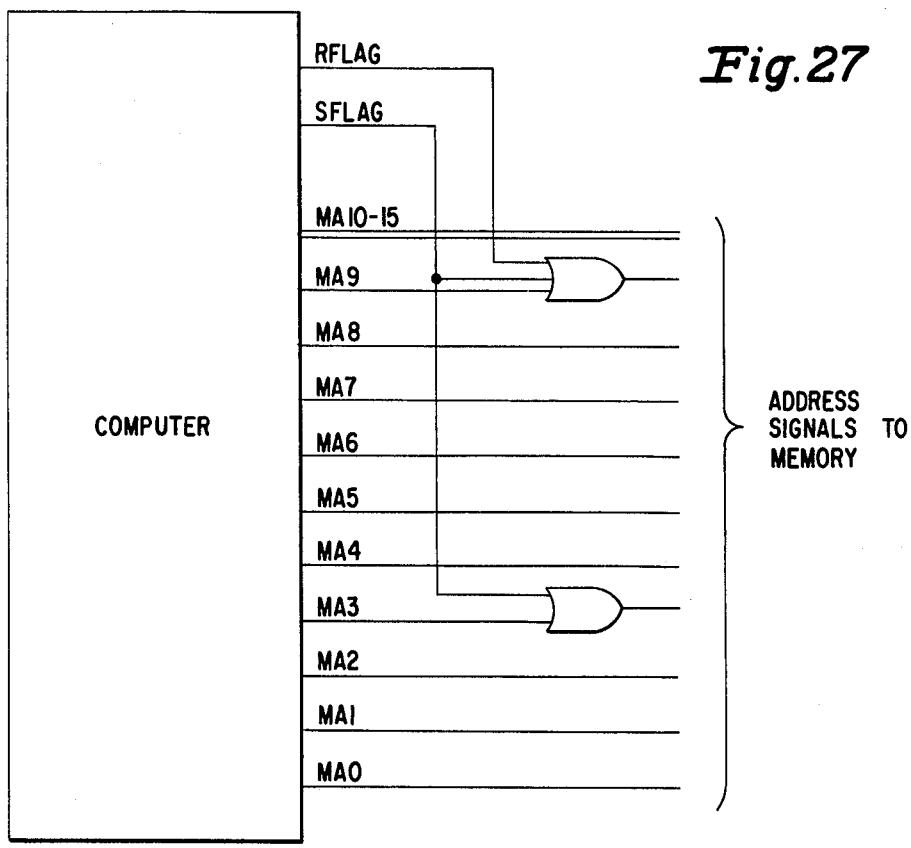
FIG. 27, illustrates simple addressing circuitry external to the computer for addressing the registers.
Figure 28:
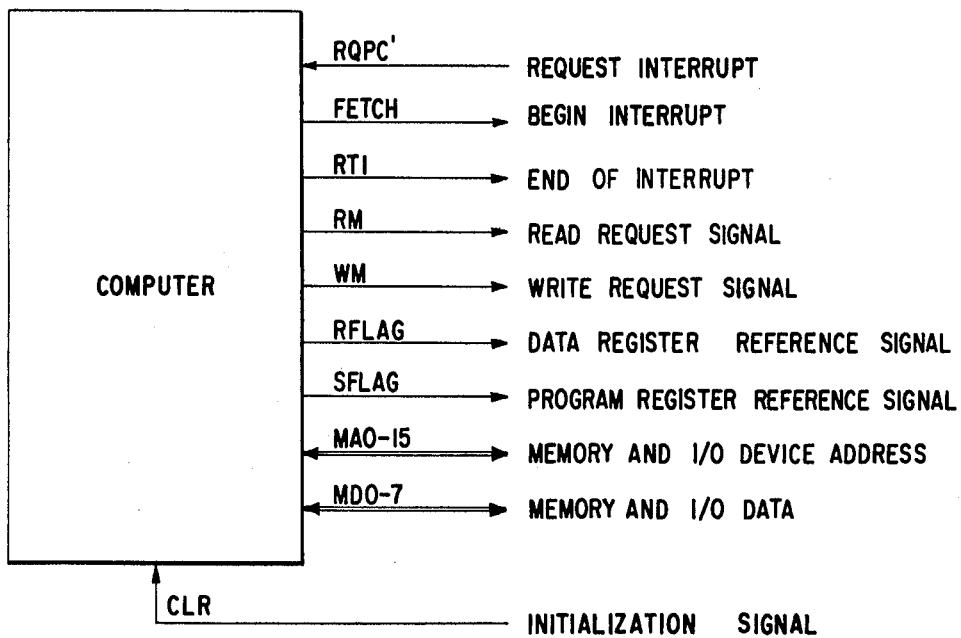
FIG. 28, illustrates some of the input and output signals for the computer that are utilized for interrupt processing.

The computer 72 utilized in one embodiment of the present invention that was constructed, comprised a microcomputer developed by The Singer Company. This microcomputer is fully described in a manual entitled "ABO Microcomputer" copyrighted 1974 by The Singer Company of Thirty Rockefeller Plaza, New York, New York, the contents of which are hereby incorporated by reference. Set forth below, however, in conjunction with FIGS. 26 to 28, is a brief description of the ABO microcomputer. Those interested in a more detailed description of the ABO computer are directed to the manual described above.

The ABO Microcomputer was designed for implementation on a single MOS LS1 circuit. Its instructions and architecture were chosen to maximize its efficiency in data manipulation, communication and real-time control. Its arithmetic capabilities are therefore adequate but not powerful, although its instruction perform sixteen bit arithmetic and provide for efficient address computations.

In addition, there were three specific design objectives for the instruction set: (1) shortest possible instructions to minimize cost of memory for program storage; (2) efficient interrupt processing; and (3) powerful memory and i/o device addressing. As a result, the memory required for program storage is less than that required by many other microcomputers. The interrupt and i/o capabilities of the ABO Microcomputer even exceed those of some minicomputers, and none of the common addressing problems caused by memory "page boundaries" is present. A few important terms which appear throughout are explained here:

| | |
|---|---|
| Byte | Eight binary bits of data (this is the unit of memory data addressed by the ABO Microcomputer). |
| Memory Page | Two hundred fifty six bytes of memory beginning at an address whose least-significant eight bits are 0. |
| Word Boundary | Any memory address whose least-significant bit is 0. |
| Word | To contiguous data bytes; the first byte is the most-significant and must reside at a word boundary in memory. |
| Opcode | The first eight bits of each ABO Microcomputer instruction; these identify the operation performed by the instruction. |

Figure 25:
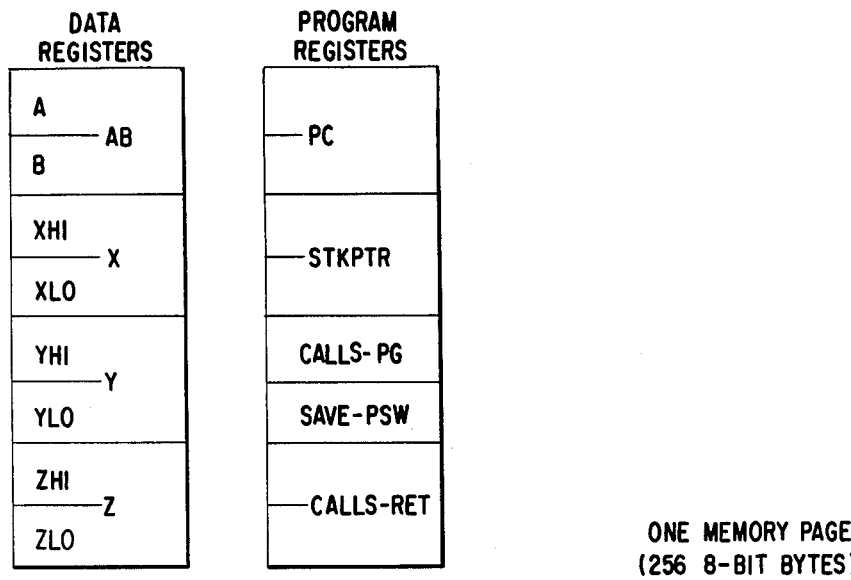
FIG. 25 is a representation in block form of the program registers and data registers which were utilized in conjunction with the computer.

The prime sign (') is used to represent logical inversion; thus is X is the name of a signal, X=0 implies X'=1. ABO Microcomputer instructions provide the user with access to eight, eight bit data registers as shown in FIG. 25. These are named A, B, XHI, XLO, YHI, YLO, ZHI and ZLO. Certain instructions (LD, SD, INCD, etc.) operate on these registers as four sixteen bit double registers; when used in this way, the double registers are named AB, X, Y and Z. The first byte of each double register is the most-significant byte; thus XHI is the most-significant byte of the X double register, and XLO is the least-significant byte. FIG. 25 also shows five additional registers, called program registers, which are used by the ABO Microcomputer to maintain various pointers and to save data and addresses. These are named PC (sixteen bits), STKPTR (sixteen bits), CALLS-PG (eight bits), SAVE-PSW (eight bits), and CALLS-RET (sixteen bits). All the data registers and program registers reside in external writable memory; they are not part of the ABO Microcomputer. By knowing the actual location of a register in memory, the programmer may reference it in the same way that he references any other memory location. This is explained later in more detail in Register Access Methods.

| Register Functions | |
|---|---|
| AB | The A or B register may supply one argument for arithmetic operations. The Rotate (ROT) and Exchange PSW (XPSW) instructions operate only on these two registers, and one argument of the And (AN) and Add (A) instructions must come from one of these two registers. Unlike X, Y and Z, the AB double register may not contain the memory address used in Load, Store, Call and Jump instructions. In other respects, however, the A and B registers may be used just |

-continued

| Register Functions | |
|---|---|
| | like the other six data registers. |
| X,Y,Z | These registers may be used for temporary data storage or for arithmetic operations; they may function as six, eight-bit registers or as three, sixteen-bit double registers. Each of the double registers may contain the memory address used in Load, Store, Call and Jump instructions; in this mode, they function as address registers. |
| PC | Program Counter: the user must load this sixteen-bit register with the address of the first instruction of the interrupt routine before interrupt servicing begins. If a higher priority interrupt occurs during interrupt servicing, the PC register is then used to save the address of the instruction to be executed when the higher priority servicing is completed. The Return From Interrupt (RTI) instruction establishes a new value for the least-significant PC register byte at the conclusion of interrupt servicing; this determines where execution begins the next time interrupt servicing is requested. The BLOCKIN and BLOCKOUT instructions also use the PC register for temporary storage of the address of the following instruction. |
| STKPTR | Stack Pointer: this sixteen-bit register always contains the memory address of the most-recently used (the "top") location of the last-in-first-out (LIFO) stack. Each stack entry contains two bytes, and the STKPTR register always addresses the most-significant (or first) byte; hence, the least-significant bit of the STKPTR register is always '0'. The contents of the STKPTR register are utilized in the Call, Return and Stack instructions (CALL, RET, STK, UNSTK, and XSD). Prior to the first execution of any of these instructions, the user must initialize the STKPTR register with the appropriate beginning stack address. While all sixteen bits of the STKPTR register are used to address the stack, only the least-significant byte changes when the stack is used; the most-significant byte always retains the original value stored there by the user. |
| CALLS-PG | CALLS Instruction Page Pointer: prior to execution of the Call Short (CALLS) instruction, the user is responsible for filling this eight-bit register with the most significant byte of the address of the subroutine table used by the CALLS instruction. The CALLS-PG register always contains the last data stored there by the user; it is not modified by the ABO Microcomputer. |
| SAVE-PSW | PSW Save Area: this eight-bit storage area is not intended for use by the programmer; it is used to save the contents of the ABO Microcomputer PSW register each time a new instruction is fetched. This is because the XSD, CALL, CALLI, BLOCKIN and BLOCKOUT value from the SAVE-PSW area. The SAVE-PSW area will not necessarily contain the correct PSW value after an instruction has executed. |
| CALLS-RET | Calls Instruction Return Address: this sixteen-bit save area is used exclusively by the Call Short (CALLS) and Return Short (RETS) instructions. After a CALLS instruction is executed, the address of the next instruction in sequence is saved in the CALLS-RET area. The RETS instruction subsequently causes this address to be used as the address of the next instruction to be executed. |

Stack Usage

The Stack instructions (STK, UNSTK and XSD) provide the programmer with access to a last-in-first-out (LIFO) stack which may be located anywhere in writable memory. In addition, the Call instructions (CALL, CALLX, CALLY, CALLZ and CALLI but not CALLS) use the same stack to save the address of the instruction which follows the Call instruction in sequence; this address is subsequently unstacked by the Return (RET) instruction.

FIG. 26 shows the structure of the stack, and illustrates how the STKPTR program register always contains the address of the most-recently used (the "top") location of the stack. The stack may contain up to 128, two byte entries; and entries must be aligned on word boundaries, and the stack must reside entirely within one memory page (see STKPTR in Register Functions). If the programmer wishes to use more than one stack, he may simply save the current contents of the STKPTR register (if necessary) and load the STKPTR register with the address of another stack. The programmer is responsible for initializing the contents of the STKPTR register before executing any Call, Return or Stack instructions. The initial value required in the STKPTR register is given by the following formulas:

| If the stack begins on a memory page boundary (as in FIG. 26): | If the stack does not being on a memory page boundary: |
|---|---|
| A + 254 | A − 2 | where A is the address of the first stack entry (the beginning of the stack). The unusual +254 factor is required because only the least-significant byte of the STKPTR register is incremented by two before addressing the first stack entry; the most-significant byte is never changed. Thus the STKPTR register will contain just the value of A after the first incrementing by two in either case. Because only the least-significant byte of the STKPTR register is ever changed, a stack which begins on a memory page boundary (see FIG. 26) and fills up (all 129, two-byte locations) will "wrap around" to the beginning of the same memory page if you attempt to stare into the next location of the stack. Thue the 129th location in the stack would be identical to the 1st location, the 130th to the 2nd, and so on.

Register Access Method

The data registers and program registers are contained in external writable memory. The ABO Microcomputer addresses the data register area by placing the register number (0-7 as shown in FIG. 25) on the three least-significant memory address output signals (MA0, MA1, MA2) and activating the output signal RFLAG. The program registers are addressed similarly; the register number (0-7) is placed on the same memory address output signals, but the output signal SFLAG is activated instead. In either case, the remaining thirteen memory address output signals are set to '0' when registers are being addressed. The RM output signal is activated to indicate a read-memory operation; the WM output signal is activated to indicate a write-memory operation. By monitoring RM, WM, RFLAG and SFLAG, external circuitry may easily determine when the ABO Microcomputer is requesting access to the register area in memory. A bias address may then be logically ORed onto the more significant memory address signals to establish the actual location of the register area anywhere in the 65,536 bytes of addressable memory. For most applications, the SFLAG signal will be logically ORed with the next higher memory address signal (MA3); this will locate the program registers in the eight memory locations immediately following the data registers. FIG. 27 shows a simple circuit which accomplishes this; RFLAG and SFLAG are also ORed with MA9 which causes the registers to reside in the first sixteen addresses of the third memory page (hex addresses 200-20F).

When the ABO Microcomputer is initialized with the CLR input signal, the first instruction which is executed is fetched from memory address 0. Thus it would be inconvenient to locate the registers in this area of memory unless there was a practical way to initialize the first 24 bits of register area so they contained a Jump instruction (for example) to the desired starting address of the program. The registers could be conveniently located, however, at the first sixteen addresses of any other memory page.

It is essential that the programmer know the actual memory addresses of the program registers because he must initialize certain of these (STKPTR and CALLSPG) before using the stack or executing the CALLS instruction. This is typically accomplished by storing the initialization date at the actual memory location which contains the register.

When the ABO Microcomputer is used in an interrupt processing mode, a unique set of sixteen register will be associated with each interrupt level. The memory locations of the registers being used at any given time will be determined by external interrupt circuitry.

The ABO Microcomputer contains an eight-bit register called the Program Status Word (PSW). The two least-significant bits are called STATUS bits; the least-significant is named NEG and the other is named ZERO. These bits are automatically set at the conclusion of each arithmetic instruction to indicate the value of the arithmetic result. The possible values for these bits and their respective meanings are set forth hereinbelow. When a double-byte arithmetic instruction is executed (INCD or AD), these bits indicate the value of the most-significant byte of the result only.

Meaning of STATUS Bits
00 Positive arithmetic result (most-significant result bit is '0' and at least one of the next most-significant seven bits is '1')
01 Negative arithmetic result (most-significant result bit is '1')
10 Most-significant eight bits of the result are '0'
11 Not used The next PSW bit is named CARRY. The Rotate and Add instructions (ROT, A, AD) cause this PSW bit to be set to '1' or '0'. The most-significant five bits of the PSW are not used by the ABO Microcomputer. The programmer may find it convenient to use these bits to store temporary data of flags. The Exchange PSW (XPSW) instruction causes the entire PSW to be swapped with the contents of the A or B register.

The PSW CARRY and STATUS bit are used to save information about arithmetic results so that subsequent Jump, Skip or Call instructions may be conditionally executed or bypassed. For example:
J SUBR1, EQZERO
is an instruction which causes a jump to the address of SUBR1 provided the last arithmetic result was zero (the PSW ZERO bit is '1'); otherwise the jump does not occur.

The XPSW instruction may be executed at any time to exchange the current contents of the PSW register with the contents of the A or B data register. This is the only way the programmer may access the most-significant five bits of the PSW. When a series of operations must be performed $n$ times in a loop, the Increment instruction (INC) is typically used to step the value in some data register from $-n$ to 0. It is convenient in this case to test the PSW NEG bit to determine when the value is no longer negative in order to exit from the loop. One use for the PSW CARRY bit occurs in extended-precision addition or substraction. If two, thirty two-bit numbers are to be added, for example, an Add Double instruction (AD) may be used to add the least-significant sixteen bits of each number and set the PSW CARRY bit if a carry is generated from the most-significant bit position. The PSW CARRY but must then be tested to determine whether an additional +1 must be included in the sum of the most-significant sixteen bits. When an interrupt occurs, the contents of the PSW register are not automatically saved. If the interrupt routine will execute instructions which change the value of the PSW bits, the old PSW must be saved first by using the XPSW instruction.

The ABO Microcomputer responds to interrupt requests with the following sequence of actions:
  the instruction in progress at the time is completed;
  the address of the next instruction in sequence is stored in the PC program register (see FIG. 25);

an output signal (FETCH) is activated to cause external circuitry to begin addressing a different set of registers in memory;

the address of the first instruction to be executed in the interrupt routine is loaded into the ABO Microcomputer from the PC register in the new register area.

At the conclusion of interrupt procession, a similar set of actions takes place in the reverse order:

An RTI instruction concludes the interrupt routine by establishing an address in the PC program register to identify where instruction execution is to begin when the next interrupt occurs;

an output signal (RTI) is activated to cause external circuitry to stop addressing the registers associated with the interrupt routine and to return to the registers associated with the next lower priority level.

the contents of the PC program register in the original register area is then loaded back into the ABO Microcomputer so that instruction execution may begin from the point where it was interrupted.

For most efficient interrupt procession, the interrupt routine shold have its own set of data and program registers (as in FIG. 25). This allows the interrupt routine to immediately begin procession the interrupt using appropriate addresses and data that had been previously loaded into its various registers; the registers associated with the instruction which was interrupted are automatically saved because they are located elsewhere in memory. It is possible for the interrupt routine to share the eight data registers with the interrupted routine; the interrupt routine must have its own program registers, however, since the PC register cannot be shared.

The programmer is responsible for initializing the PC register which the interrupt routine will use before the first interrupt occurs; every time thereafter, the RTI instruction in the interrupt routine re-initializes its PC register. If the interrupt routine will execute any Call or Stack instructions, the programmer must also initialize the interrupt STKPTR register, the interrupt routine may or may not share the same stack with the interrupted routine according to the discretion of the programmer. If the interrupt routine will execute the Call Short (CALLS) instruction, the programmer must initialize the CALLS-PG register.

The PSW register within the ABO Microcomputer contains arithmetic status information about the interrupted routine which is not automatically saved when an interrupt occurs. It is possible to create simple interrupt routines which do not execute arithmetic instructions and therefore do not destroy the PSW register contents; in the case the interrupt routine need not save the PSW register. Otherwise Exchange PSW (XPSW) instructions must be executed at the beginning and end of the interrupt routine to swap the PSW register with the A or B register belonging to the interrupt routine.

Transfer of i/o data between the ABO Microcomputer and i/o device takes place in exactly the same way that data is transferred between the ABO Microcomputer and memory. Specific decodings of the sixteen memory address output signals (MA0-15) must be reserved to signify that the programmer is addressing an i/o device rather than memory. I/O data and memory data share the same eight bidirectional data signals (MD0-7) passing into and out of the ABO Microcomputer.

If less than 32,769 bytes of memory will be used, the most-significant memory address bit (MA 15) may be used to indicate to external circuitry whether memory or an i/o device is being addressed. A '0' on MA 15 could indicate that memory was being addressed; a '1' on MA 15 would indicate that an i/o device was being addressed. The remaining fifteen memory address signals could then be used by the programmer to identify the specific i/o device in question in any convenient way.

The programmer may cause eight bits of input data to be read into a data register and stored at a specific memory location with the following instructions:

| | | |
|---|---|---|
| | L A, dev-add | (Load the A register) |
| | S A, mem-add | (Store the A register) |
| where | | |
| dev-addr | is a sixteen-bit (direct) address which follows the Load opcode and identifies the specific input device in question (the most-significant bit of this address would be '1' if the addressing scheme suggested earlier was used); | |
| mem-addr | is the sixteen-bit (direct) address of the memory location where the input data is to be placed. | |

A similar pair of Load and Store instructions may be used to transfer data from a memory location to an output device. If Load Double and Store Double (LD and SD) instructions are used, sixteen bits of data will be transferred instead of eight bits.

Figure 29:
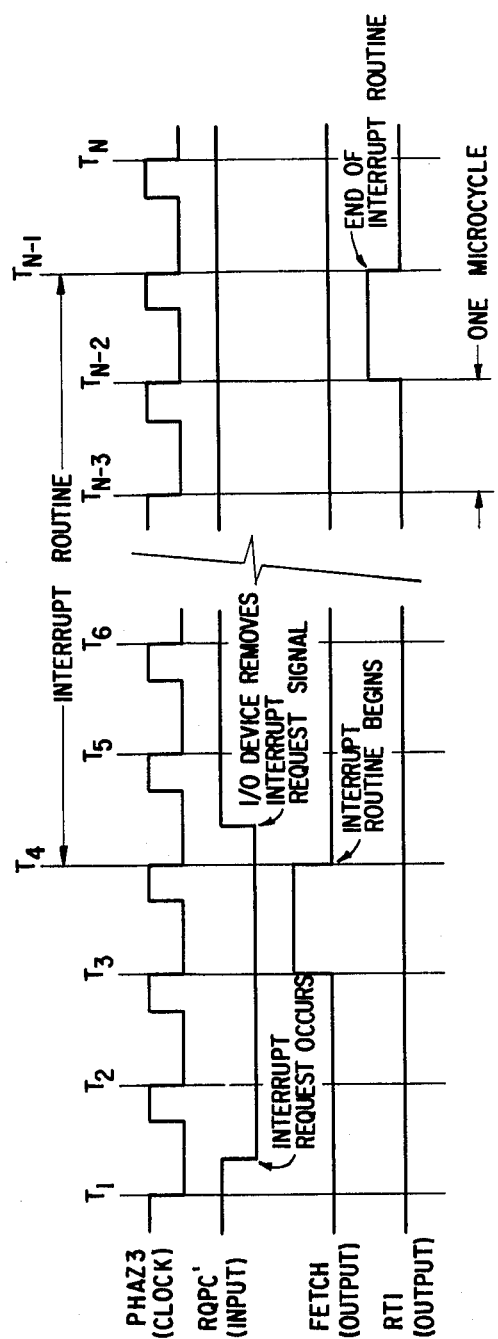
FIG. 29, illustrates idealized waveshapes for interrupt timing signals.

FIG. 28 shows some of the input and output signals which pertain to interrupt processing. Each of these signals is active when it is high except RQPC'; RQPC' is normally high and must be made low to indicate a request for interrupt. If interrupts are not used, RQPC' must be fixed high constantly. I/O data transfer actually occurs when external circuitry recognizes a specific device address on the memory address signals (MA0-15). If the RM signal is high at this time, data must be gated onto the data input/output signals (MD0-7) to be read by the ABO Microcomputer. If the ABO Microcomputer wishes to write data to a device, the WM signal will be high and the data will be present sent on the same data input/output signals (MD0-7). RM and WM will never both be high. FETCH and RTI are output signals which indicate when the interrupt routine is beginning and ending. The trailing edge of FETCH is coincident with the beginning of the microcycle at which external circuitry must start addressing the registers associated with the interrupt routine. The trailing edge of RTI coincides with the beginning of the microcycle at which the registers of the interrupted routine must be addressed again. FIG. 29 illustrates the time relationship between ROPC', FETCH and RTI. PHAZ3 in this diagram is an ABO Microcomputer clock input which is active at the end of every microcycle.

The execution of an instruction normally begins with the microinstruction named FETCH at hex address 7F in the ABO Microcomputer ROM.

If the interrupt request signal (RQPC') is active (low) at this time, the microinstructions at ROM addresses 7E and 40 (IRPT* and IRPT1) occur instead. These two microinstructions cause the contents of the ABO Microcomputer CPC register (the address of the next instruction) to be saved in the PC program register; the microinstruction at ROM address 40 also activates the FETCH output signal to indicate that interrupt processing will begin on the next microcycle (see FIG. 29).

The interrupt routine then begins with the two microinstructions at ROM addressed 19 and 1F (IRPT2 and IRPT3). These cause the ABO Microcomputer CPC register to be loaded from the PC program register associated with the interrupt routine; this will be the address of the first instruction to be executed. The first instruction in the interrupt routine is then executed; this begins with the FETCH microinstruction at ROM address 7F as usual.

A BYTEIN instruction is designed to be used in a high-speed interrupt routine to read a single byte of data from a specific input device and store it in an input data area in memory. Each interrupt causes another byte to be read and stored at a successively higher memory address. Included in the instruction is a test to determine whether a specified number of bytes have been read and stored yet. A BYTEOUT instruction performes the same function for an output device. Neither instruction changes the value of the PSW register.

The interrupt routine which utilizes BYTEIN or BYTEOUT requires only two instruction executions:
   BYTEIN or BYTEOUT
   RTI
   .
   .
   .
other instructions to be executed when the last byte of data has been transferred.
   .
   .
   .
The interrupt routine begins directly with BYTEIN, for example, and terminates with the RTI instruction which immediately follows it. When the specified number of bytes have been read and stored in memory, the BYTEIN instruction causes the RTI instruction to be skipped and other instructions may then process the block of data which was read from the input device.

Set forth below are the source statements of the actual sequence of microinstructions which occurs in an interrupt routine containing BYTEIN and RTI. The first four microinstructions (ROM addresses 7E, 40, 19, 1F) are the overhead associated with saving the address of the interrupted instruction and reading the contents of the PC program register for the interrupt routine. It can be seen that the BYTEIN and RTI instructions require twenty additional microcycles; thus the total interrupt servicing time for an eight-bit data transfer is twenty-four microcycles (thirty-six usec. if the cycle time is one and half usec.)

|         | 7E-IRPT*   | CPCLO→, PCLO, IRPT1         | Enter IF (RQPC . RAR = 7F = FETCH) |
|---------|------------|-----------------------------|------------------------------------|
|         | 40-IRPT1   | CPCHI→, PHCHI, IRPT2        | FETCH SIGNAL                       |
|         | 19-IRPT2   | PCLO,→ CPCLO, IRPT3         |                                    |
|         | 1F-IRPT3   | PCHI,→ CPCHI, FETCH         |                                    |
| 09 BYTEIN | 7F-FETCH | M(CPC),→ I, FETCH1          | LOADS MARLO SIMULTANEOUSLY (CALL SHORT) |
|         | 78-FETCH1  | PSW→, SPSW, IC, ADDRESS=X'00 | BRANCH TO MICRO ROUTINE           |
|         | 16-IN*     | XHI,→ MARHI IN1             | DEVICE ADDR                        |
|         | 43-IN1     | XLO,→ MARLO, IN2            |                                    |
|         | 49-IN2     | M,→ OP, IN3                 | INPUT DATA                         |
|         | 4B-IN3     | A,→ MARHI, IN4              | READY FOR STORE                    |
|         | 4D-IN4     | B,→ MARLO, COUNT            |                                    |
|         | 21-COUNT   | OP→, M, COUNT1              | OUTPUT/STORE AFTER INPUT           |
|         | 7C-COUNT1  | ZHI,→ ALU (+1), JIFNC, NOCA | SKIP2                              |
|         | 7C-COUNT1  | ZHI,→ ALU (+1), JIFNC, NOCA | SKIP2                              |
|         | 35-NOCA    | OP→, ZHI, INCD*             |                                    |
|         | 08-INCD*   | GR1+1,→ ALU(+1), JIFNC, NOC | INCD1                              |
|         | 2B-NOC     | OP→, GR1+L, JTRCKY, ADDRESS=X'79 | (INCD=NOC1, IN/OUT= FETCH)    |
| 46 RTI  | 7F-FETCH   | M (CPC,→ I, FETCH1          | LOADS MARLO SIMULTANEOUSLY (CALL SHORT) |
|         | 78-FETCH1  | PSW→, SPSW, IC, ADDRESS=X'00 | BRANCH TO MICRO ROUTINE           |
|         | 3C-RTI*    | M(CPC),→ OP, IC, RTI1       |                                    |
|         | 41-RTI1    | OP→, PCL0, IRPT2            | RESET INTERRUPT SIGNAL             |
|         | 19-IRPT2   | PCLO,→ CPCLO, IRPT3         |                                    |
|         | 1F-IRPT3   | PCHI,→ CPCHI, FETCH         |                                    |

The total time required to respond to and service an interrupt must also include the latency associated with waiting for the current instruction to be completed before the interrupt routine may begin. The average instruction execution time is approximately seven microcycles. Thus the total interrupt response and service time (average) is approximately forty-one usec. for a cycle time of one and half usec. when the high-speed BYTEIN/BYTEOUT interrupt routine is used.

Many instruction are called "double" (Load Double-LD, Store Double-SD, etc.) because they operate on two contiguous bytes of data in memory. These two-byte data must each be aligned on a word boundary; in other words, the most significant byte of data must reside at an even-numbered address. This same work alignment rule applies to any two bytes in memory, other than those contained in an instruction, which are used by the ABO Microcomputer as an address.

A similar alignment rule applies to registers in memory: the first data register (the A register) and the first program register byte (the PC register) must each reside at an address whose three least-significant bits are '000'.

As explained previously, every stack must be contained entirely within one page of memory. Each byte stack entry must be aligned to a word boundary. Every stack may contain up to 128, two-byte entries, however, regardless of which work in the memory page contains the first stack entry (the beginning of the stack).

Both bytes of the two-byte address in the Jump (J) instruction must reside in the same page of memory (in other words, the address portion of the Jump instruction must not straddle a page boundary). This restriction does not apply to any other instruction.

Negative number are represented in 2's complement form in the ABO Microcomputer (0 is '00000000', −1 is '11111111', −2 is '11111110', etc). This permits any decimal number from −128 to +127 to be stored in one byte of memory or in a single data register. Two memory bytes or a double data register may store numbers from −32768 to +32767. The PSW NEG bit (see FIG. 25) is set to '1' to indicate a negative value whenever an arithmetic instruction produces a result whose most-significant bit is '1' (only the most-significant byte of 2-byte results is checked). The Add an Increment instructions follow the usual rules of 2's complement arithmetic.

In certain instances the programmer may elect to use no negative number. One memory byte may then represent any number from 0 to +255, and two bytes (sixteen bits) may represent any number from 0 to +65535. Memory addresses are always treated as sixteen-bit positive numbers.

Set forth hereinbelow are simple sequences of ABO Microcomputer instructions which perform various arithmetic and logic operations. These operations cannot be performed by single ABO Microcomputer instructions because all possible 256 instruction codes are already utilized for other functions.

SUBTRACT

B is subtracted from XHI; the result remains in XHI:

| COM | B | (Complement) |
| INC | B | (Increment) |
| A | B, XHI | (Add) |

If the PSW CARRY bit is '0', the result is negative; otherwise the result is positive. No check is made for overflow or underflow. This method of subtraction is only valid for signed numbers in 2's complement form (maximum positive value of +127).

LOGICAL OR

The logical OR of B with XHI replaces XHI:

| COM | B | (Complement) |
| AN | B, XHI | (And) |
| COM | B | (Complement) |
| A | B, XHI | (Add) |

SHIFT LEFT

B is shifted left 1 bit; a '0' is shifted into the least-significant bit position:

A B, B (Add)

The most significant bit of B replaces the PSW CARRY bit.

In certain cases the number of cycles is followed by a second number enclosed in parentheses. For arithmetic instructions, the parenthetical value specified the number of cycles required for the case when carries are generated from the most-significant bit positions of both bytes in an Add Double (AD) or Increment Double (INCD) instruction. For BYTEIN and BYTEOUT instructions, the parenthetical value applies to the case when the last byte of data is transferred. For Jump, Skip and Call instructions, the parenthetical value applies if the specified condition is not true and the action specified by the instruction does not take place.

In the ABO Microcomputer instructions, certain lower case letters are used to indicate data which must be supplied by the programmer. These are explained below:

| rrr | Three bits specifying one of the eight-bit data registers; the following mnemonics are used:<br>000 A 100 YHI<br>001 B 101 YLO<br>010 XHI 110 ZHI<br>011 XLO 111 ZLO |
| dr | Two bits specifying one of the sixteen-bit pairs of data registers:<br>00 AB 10 Y<br>01 X 11 Z |
| a | One bit specifying either the A or B data register:<br>0 A<br>1 B |
| addr | Sixteen bits specifying the memory address to be used by the instruction. |
| short-addr | Eight bits specifying only the least-significant byte of the address to be used by the RTI or JS instruction. |
| data | Sixteen bits of data to be used by the LDI instruction. |
| short-data | Eight bits of data to be used by the LI instruction. |
| cc | Two bits specifying the condition which must be satisfied if the instruction is to be carried out. The following mnemonics are used:<br>00 UNCOND (the instruction will be carried out unconditionally)<br>01 LTZERO (The PSW NEG bit must be '1' or the instruction will be bypassed)<br>10 EQZERO (the PSW ZERO bit must be '1' or the instruction will be bypassed)<br>11 CARRY (the PSW CARRY bit must be '1' or the instruction will be bypassed)<br>The Skip instructions (SS, ST) may not be executed unconditionally (cc must not be '00') |
| ppp | Three bits specifying a binary value between 000 and 110 (0–6) to be used as a table address by the Call Short (CALLS) instruction. The decimal value is written instead of a mnemonic; for example:<br>CALLS 4 |

Attached hereto as an appendix is the detailed program listing which was used in the ABO Microcomputer to achieve the novel sewing machine system described herein. The program begins with various definitions and addresses and is followed by a listing of the program statements. As listed, the left most column contains the labels of program statements, the next column contains the operations followed in the next column by the operands which are followed by easily read comments concerning the associated program statement. The right most column contains the numbers assigned to the associated program statements. The columns of the program listing are interrupted by asterisked comments on the program statments and other information that follows below the comments. For a detailed explanation of the items in the program listing appended hereto, reference is made to the ABO Microcomputer manual described above. In addition to the information contained in the ABO manual the following definitions are helpful for a detailed understanding of the appended program:

ASSEMBLER DIRECTIVES

| EQU | Equate the Value of the Argument expression to the symbol in Column 1. |
| Org/Origin | Adjust the Memory Location to the value of the expression |
| RESERVE N | Reserve N Unused bytes of memory. |
| BOUND 2 | Adjust the memory location to the next highest address which is a word boundary. |
| DATA, N | Assemble the arguments in groups of N Bytes each. |
| $ | The value of the present memory location (when used by itself as a symbol) |
| (HOL(...) | Defines ... as ASCII characters to be assembled |

-continued

| ASSEMBLER DIRECTIVES | |
|---|---|
| H(...)/ HEX(...) | as data. Defines a Hexadecimal constant. |
| EJECT/ PAGE | Skip to a new page on the printout. |
| SPACE N | Leave N Blank lines on the printout. |

ABO MICROCOMPUTER INSTRUCTIONS

| | |
|---|---|
| COMP | Same as Com (Complement) |
| JUMP | Assembled as JS (Jump Short) if possible: otherwise as J (Jump). |
| RTN N | Store the present Memory location value at RTN$TABLE + 2 * N. |
| CALLRTN N | CALLI (Call Indirect) to RTN$TABLE + 2 * N. |
| CALLS NOT | Invert states of all PSW (Program Status Word) Bits. |
| CALLS R2 | Return from subroutine 2 Bytes beyond current stack value. |
| CALLS RI | Return from subroutine address specified by the 2 bytes located at the address contained in the stack. |

As will now be apparent, the appended program listing, the state charts described above and the ABO manual identified above not only constitute a complete description of the computer 72 but also constitute a complete and detailed description of the function and cooperation between the computer, the control panel 85 and the sewing machine 50 to achieve the results of the present invention.

Having thus set forth the nature of the invention, what is sought to be claimed is:

1. A programmable sewing machine adapted to perform a series of sequential operations on a work material, said programmable sewing machine comprising:
   a sewing machine frame;
   a sewing needle supported by said frame for selectively repeated movement from a down position through a work material to an up position and return to a down position;
   a looptaker supported by said frame for cooperation with said sewing needle in the formation of stitches;
   a reversible work material feed system supported by said frame and including feeding means for passing work material in a path between said needle and said looptaker;
   a single continuously variable speed drive means for selectively actuating said sewing needle, said looptaker and said work material feed system in stitch forming synchronism with each other to provide variable speed sewing;
   manual treadle means for continuously variable speed actuation of said variable speed drive means; and
   means for recording a speed profile of said variable sewing speed as generated by manual actuation of said manual treadle means.

2. The programmable sewing machine according to claim 1, wherein said recorded speed profile includes:
   a number of pseudo segments,
   each said pseudo segment having a number of sewing stitches and a fixed sewing speed associated therewith.

3. The programmable sewing machine according to claim 2, wherein
   the fixed sewing speed of each pseudo segment is defined as that speed when the actual sewing speed produced by said variable drive means become substantially the same as the desired sewing speed as evidenced by the then position of said treadle provided that the desired sewing speed differs by a predetermined amount from the speed of the preceding recorded pseudo segment.

4. The programmable sewing machine according to claim 2 wherein
   the number of sewing stitches associated with a pseudo segment is defined by the number of stitches that take place during the time required to define the fixed sewing speed of the pseudo segment.

5. The programmable sewing machine according to claim 1, further including
   a potentiometer coupled to said treadle to provide an analog voltage proportional to said desired sewing speed as evidenced by the position of said treadle, and
   computer means coupled to said sewing machine and adapted to receive said analog voltage proportional to said treadle position,
   said computer means adapted to compare the actual sewing speed with said desired sewing speed to record said speed profile.

6. The programmable sewing machine according to claim 5, wherein
   said computer is programmed to simulate said actual sewing speed in response to the magnitude of said analog voltage which is proportional to said desired sewing speed.

7. The programmable sewing machine according to claim 6, wherein
   said computer simulates said actual sewing speed by means of a digital filter programmed therein.

8. The programmable sewing machine according to claim 5, wherein
   said programmable sewing machine includes a mode of operation wherein said recorded speed profile is reproduced by driving said variable speed drive means in accordance with said recorded speed profile.

9. The programmable sewing machine according to claim 2 further including
   means coupled to said sewing machine for successively applying said recorded sewing speed values of said pseudo segments to conversion means to produce an analog voltage for driving said variable speed drive means substantially in accordance with said recorded speed profile.

10. The programmable sewing machine according to claim 5, wherein
    said computer is programmed to convert said recorded speed profile into an analog drive signal for said variable speed drive means to enable said sewing machine to reproduce the stored sewing speed profile.

11. The programmable sewing machine according to claim 5, further including
    manual control means coupled to said computer for manually changing the sewing speed of at least a portion of said recorded sewing speed profile.

12. The programmable sewing machine according to claim 2, further including
    manual input means coupled to said means for recording to change the recorded speed of selective pseudo segments.

13. A programmable sewing machine system adapted to perform
    a sequence of operations on a work material comprising:

a sewing machine including a frame;

a sewing needle supported within said frame for selectively repeated movement from a down position through a work material to an up position and return to a down position;

a looptaker supported within said frame for cooperation with said sewing needle in the formation of stitches;

a reversible work material feed system supported within said frame and including feeding means for passing work material in a path between said needle and said looptaker;

a single continuously variable speed drive means included with said sewing machine for selectively actuating said sewing needle, said looptaker and said work material feed system in synchronism with each other;

a presser device on said sewing machine selectively movable from a normal position urging said work material against said feeding means to a position out of contact with said work material;

manually actuated treadle means coupled to said sewing machine for selectively actuating said drive means at a continuously variable speed to provide variable speed sewing;

a programmable computer coupled to said sewing machine and including means for counting said selectively repeated movement of said sewing needle and means for measuring the time duration of non-actuation of said drive means with said presser device in a position out of contact with said work material and said sewing needle in said down position through said work material, in a sequence of sewing operations;

a control panel coupled to said sewing machine and including display means and a plurality of switches for entering sewing operation information into said programmable computer;

said sewing system having a first mode of operation for automatically introducing sewing parameters into said programmable computer by manual operation of said sewing machine in a directed order related with said sequence of sewing operations and including a profile of said continuously variable sewing speed.

14. The programmable sewing machine system according to claim 13, wherein said computer includes means to record said speed profile as a sequence of fixed sewing speeds with each sewing speed having a number of sewing stitches associated therewith.

15. The programmable sewing machine system according to claim 14, wherein adjacent stored sewing speeds differ from one another by a predetermined minimum amount.

16. The programmable sewing machine system according to claim 14, wherein said computer records said speed profile by having means for comparing the desired sewing speed as evidenced by the position of said treadle with the actual sewing speed as evidenced by the speed of said drive means.

17. The programmable sewing machine system according to claim 16, wherein said computer includes means to simulate said actual sewing speed by monitoring the position of said treadle.

18. The programmable sewing machine system according to claim 17, further including a potentiometer having its wiper arm coupled to said treadle for movement therewith to provide a voltage the magnitude of which corresponds to the position of said treadle; and means coupling the voltage at said wiper arm to said computer.

19. The programmable sewing machine system according to claim 14, wherein said switches on said control panel enable at least one of said recorded sequence of fixed speeds to be changed.

20. The programmable sewing machine system according to claim 14, wherein said sewing system has a second mode of operation wherein said sewing machine substantially reproduces said sewing parameters entered into said computer in said first mode of operation including said sewing speed profile.

21. The programmable sewing machine system according to claim 20, wherein said computer includes conversion means for converting said sequence of fixed speeds recorded therein into an analog voltage;

said computer includes means coupling said analog voltage to said drive means to substantially duplicate said stored sewing speed profile.

22. A programmable sewing machine system adapted to perform a series of sequential operations on work material, comprising:

a sewing machine including a frame;

a sewing needle supported within said frame for selectively repeated movement from a down position through a work material to an up position and return to a down position;

a looptaker supported within said frame for cooperation with said sewing needle in the formation of stitches;

a reversible work material feed system supported within said frame and including feeding means for passing work material in a path between said needle and said looptaker;

a single continuously variable speed drive means coupled to said sewing machine for selectively actuating said sewing needle, said looptaker and said work material feed system in synchronism with each other;

a presser device on said sewing machine selectively movable from a position urging said work material against said feeding means to a position out of contact with said work material;

manual means for actuating said drive means at a continuously variable speed to provide variable speed sewing;

a programmable computer coupled to said sewing machine; and a control panel coupled to said computer;

said control panel including display means and a plurality of manually operated switches;

said programmable sewing machine system having a first mode of operation wherein said computer is automatically programmed with a sewing operation including a series of sequential operations to be performed on a work material including recording the speed profile of said variable speed sewing by manual operation of said sewing machine and selective actuation of said switches on said control panel.

said programmable sewing machine system having a second mode of operation wherein said computer causes said sewing machine to automatically perform said sewing operation including operating said drive means substantially in accordance with said recorded speed profile;

said control panel including manually actuated means whereby a selected portion of said recorded speed profile can be changed.

* * * * *